Figure 1:
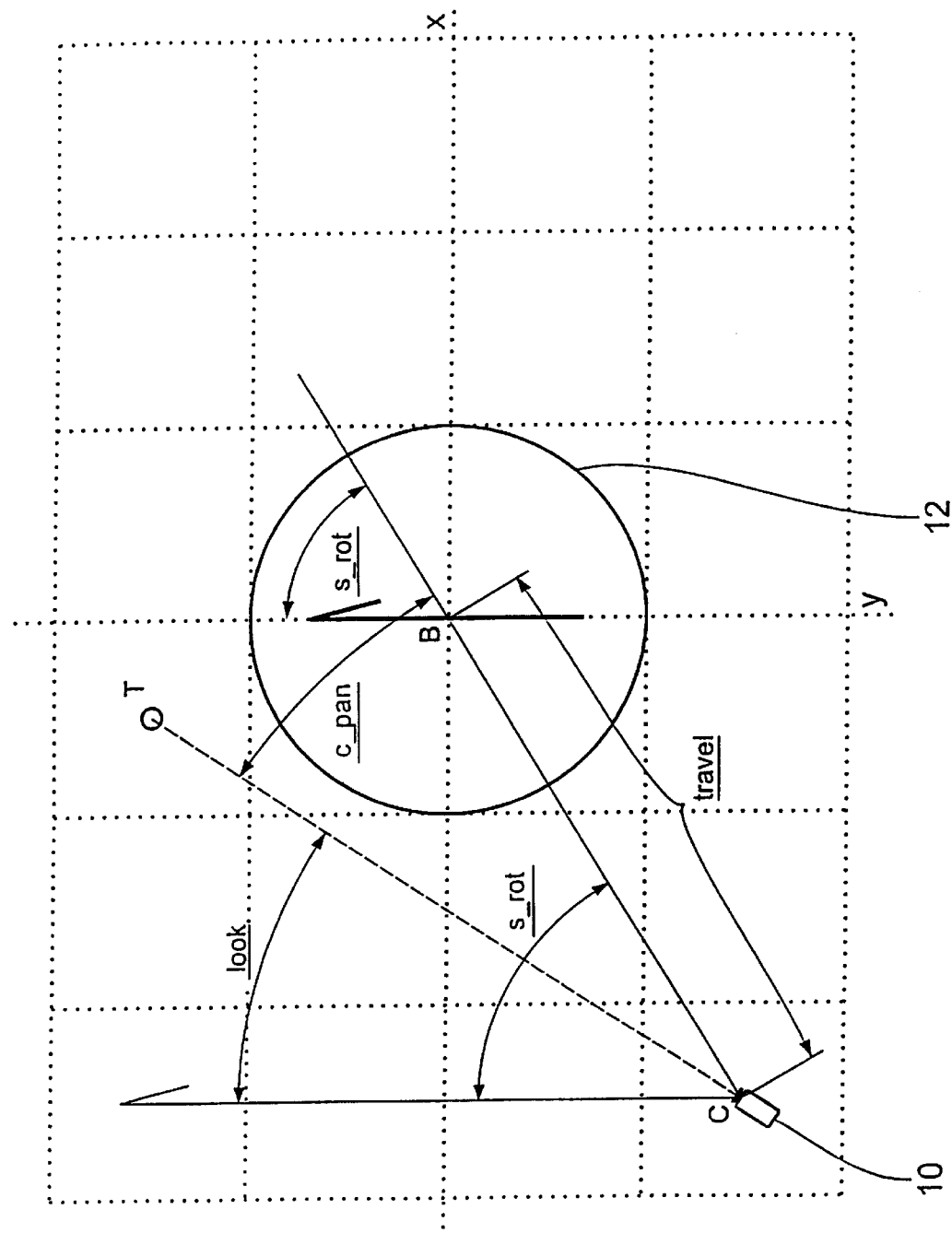

United States Patent [19]

Rybczynski

[11] Patent Number: 6,088,527
[45] Date of Patent: Jul. 11, 2000

[54] APPARATUS AND PROCESS FOR PRODUCING AN IMAGE SEQUENCE

[75] Inventor: Zbigniew Rybczynski, Berlin, Germany

[73] Assignee: Zbig Vision Gesellschaft für neue Bildgestaltung mbH, Germany

[21] Appl. No.: 08/732,770

[22] Filed: Oct. 15, 1996

Related U.S. Application Data

[63] Continuation-in-part of application No. 08/187,457, Jan. 28, 1994, abandoned.

[51] Int. Cl.[7] .............................. G03B 15/00; G03B 19/18
[52] U.S. Cl. ..................................... 396/1; 396/5; 352/48; 352/53; 352/88
[58] Field of Search ................................. 352/48, 53, 90, 352/88; 364/174, 185, 194, 525; 396/1, 3, 4, 5

[56] References Cited

U.S. PATENT DOCUMENTS

| | | | |
|---|---|---|---|
| 1,008,886 | 11/1911 | Bishop | 312/88 |
| 1,259,352 | 3/1918 | Breen | 312/7 |
| 1,391,859 | 9/1921 | Schulze | 396/5 |
| 1,797,286 | 3/1931 | Glagolin | 312/88 |
| 3,608,462 | 9/1971 | Groshong | 396/428 |
| 3,690,242 | 9/1972 | Cruickshank | 396/5 |
| 3,815,979 | 6/1974 | Collender | 312/53 |
| 4,283,766 | 8/1981 | Snyder et al. | 312/48 |

OTHER PUBLICATIONS

"Hi–Def Kafka: Metamorphosis via 'Motion Simulation,'" by Marsha Moore, *American Cinematographer*, Feb. 1993.
"Film Maker Steps Away from Videos—Turns Attention to New Visual Technology," by Jim Bessman, *Billboard Newspaper*, Sep. 11, 1993.

*Primary Examiner*—Eddie C. Lee
*Attorney, Agent, or Firm*—Londa & Gluck LLP

[57] ABSTRACT

An apparatus is provided for producing a photographic image sequence showing an apparent movement of a camera in an x-axis direction, with respect to a filmed object, without actual movement of the camera along the x-axis. The apparatus includes (a) a camera fixed on a mount, which camera is rotatable with respect to the mount in a panning action about a z-axis running through a nodal point of the camera, (b) a horizontal platform for supporting an object to be filmed, said platform being rotatable about a z-axis running through a center of the platform, the z-axis of the camera rotation and the z-axis of the platform defining a yz plane, (c) a linear track of defined length for guiding movement of the camera mount along a y-axis lying in the yz plane, and (d) software for translating a resulting image sequence showing apparent unlimited movement of the camera along the x-axis, with respect to the object to be filmed, into synchronized simultaneous positioning instructions over a time sequence, for only the following three elements:

(a) panning action rotation of the camera,
(b) rotation of the platform and
(c) a linear position of the camera mount along the linear track means in the y-direction only, without actual movement of the camera mount along the x-axis.

18 Claims, 50 Drawing Sheets

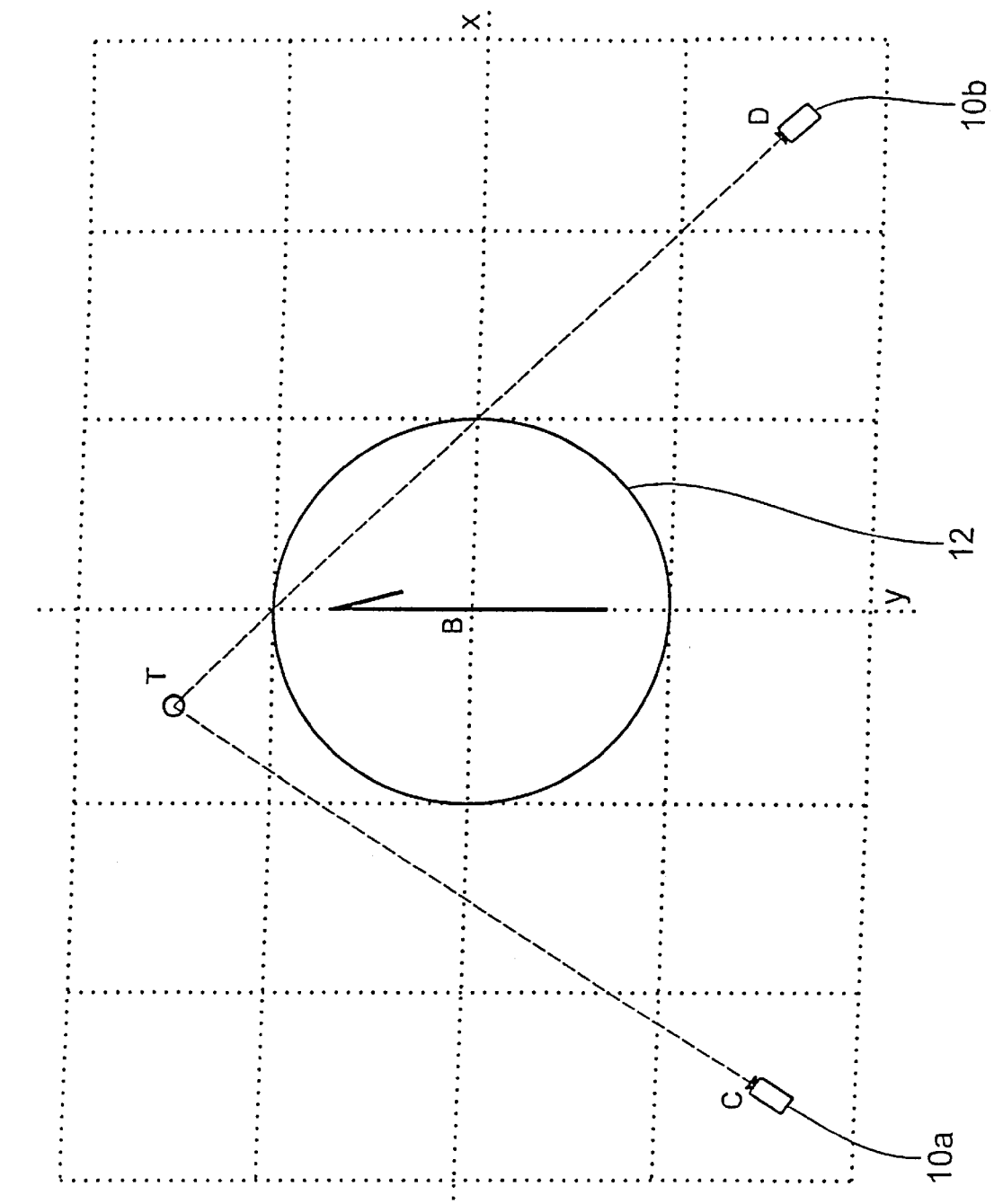

| 10a: | look= | 33,69 |
| | x_cam= | -2,50 |
| | y_cam= | -1,50 |
| | travel= | 2,92 |
| | c_pan= | -25,35 |
| | s_rot= | -59,04 |
| 10b: | look= | 14,04 |
| | x_cam= | -1,25 |
| | y_cam= | -1,50 |
| | travel= | 1,95 |
| | c_pan= | -25,77 |
| | s_rot= | -39,81 |
| 10c: | look= | -9,46 |
| | x_cam= | 0,00 |
| | y_cam= | -1,50 |
| | travel= | 1,50 |
| | c_pan= | -9,46 |
| | s_rot= | 0,00 |
| 10d: | look= | -30,26 |
| | x_cam= | 1,25 |
| | y_cam= | -1,50 |
| | travel= | 1,95 |
| | c_pan= | 9,55 |
| | s_rot= | 39,81 |
| 10e: | look= | -45,00 |
| | x_cam= | 2,50 |
| | y_cam= | -1,50 |
| | travel= | 2,92 |
| | c_pan= | 14,04 |
| | s_rot= | 59,04 |

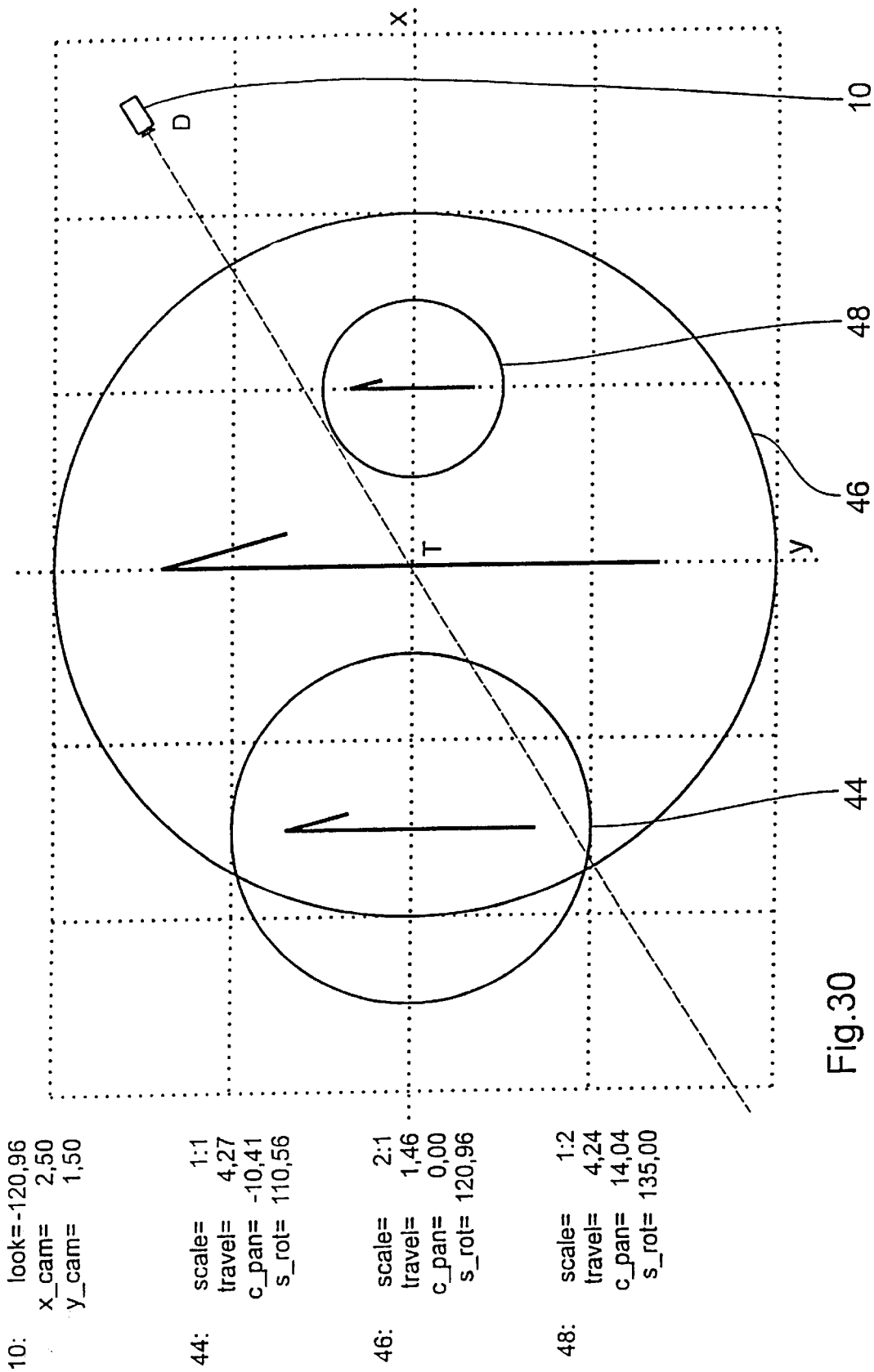

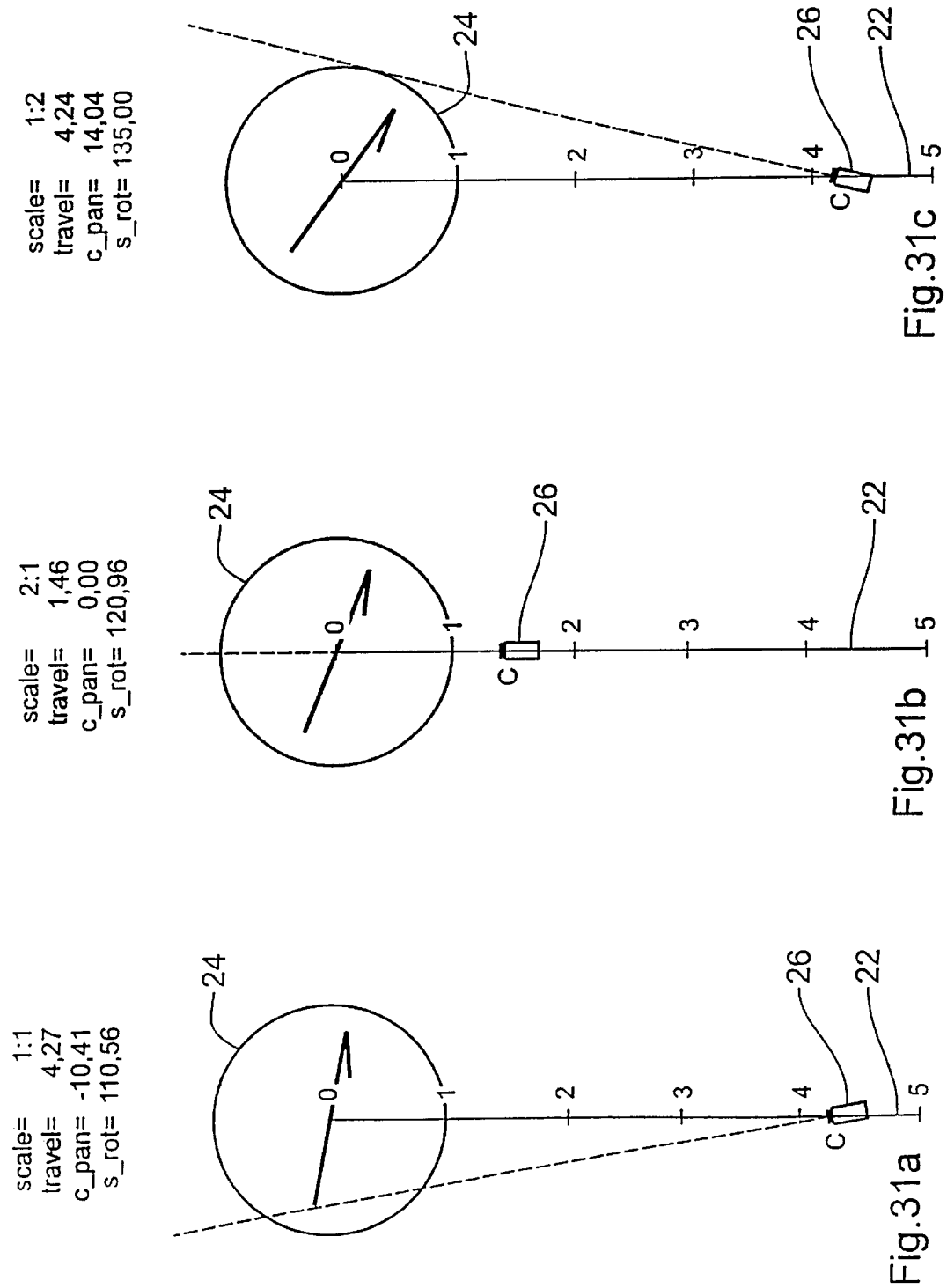

10b: look= -32,47
x_cam= 0,50
y_cam= -1,40
travel= 1,96
c_pan= -17,73
s_rot= 14,74

58a: x_board= 0,00
y_board= 0,50
walk_radius= 0,82 board_angle= 143,24
final s_rot= 157,99

APPARATUS AND PROCESS FOR PRODUCING AN IMAGE SEQUENCE

RELATED APPLICATIONS

This is a continuation-in-part to application Ser. No. 08/187,457 filed Jan. 28, 1994, entitled MOTION CONTROL SIMULATOR, now abandoned.

The motion control is used in the film and video industry to achieve precise execution and repetition of a camera's movement. The need for such precise movement (which is programmed through a computer) developed for several reasons. One of these is the automation of cameras in broadcast studios, i.e., TV news broadcasts. Another, and until now, the most important use, is in the production of special effects in multi-composite photography.

The current development of computer graphics (CG) has created the need for a connection between the worlds of "real" images photographed by a camera lens and "artificial" images generated by computers.

An illusion of three-dimensional (3-D) motion in space in a CG image is a result of mathematical calculations. Every element of the image, under consideration of the movement of the (virtual) "camera" which exists only theoretically, has to be precisely calculated on the basis of a predetermined program. A CG "camera" is free from all physical limitations, which strongly affect the motion of a real camera and the generation of images by it.

An image photographed by a real camera in motion (real time photography) is influenced by many physical disturbances. Such disturbances are partly caused by the mass and corresponding kinetic energy of the camera and by fluctuations of its path. In the case of multi-composite photography, the results of these disturbances are improper location and eventually jitter between the different components of the picture. These disturbances create an especially significant problem when photographed components represent different scales. In many cases, there is no mechanical solution to avoid these disturbances. If "real time" photography must be used—especially when photographing living objects—then the simplest of motions must be used (linear travel, smooth side to side pan) for a short duration. In this context, there is also another problem. A computer generated image cannot be built on camera position alone. Every component of the CG image has to have its own location in space (defined by an X-Y-Z coordinates). Existing motion control systems just allow for the planning and positioning of a camera (according to the X-Y-Z coordinates of the camera) but do not allow for the planning and positioning of photographed objects. This is caused by focusing solely on the motion of the camera and not on the environment the camera is photographing.

The production of special effects (when multi-composite photography has to be applied) is a very complex process. Few studios in the world can produce multi-composite special effects. Also, the production of such effects is extremely expensive. In the past, the studios developed their own motion control systems without an industry standard. Furthermore, CG software for the production of computer generated images (which become components of multi-composite images) is developed without any relation to existing or even standardized motion control system.

Therefore, it is necessary to build an integrated hardware and software system, which can "execute" the same motion in the above "worlds" and can solve the problem of jitter in real time photography.

It is especially an object of the invention to provide an apparatus and a process for producing film or video sequences, respectively, the production of which in a conventional manner requires a relatively complicated motion of the camera, by means of a simplified and therefore less jitter-sensitive camera motion.

This object is solved by an apparatus having the features of claim 1 or a process, respectively, having the features of claim 15.

A device, in accordance with the present invention, serves for simulating photographic images of an object to be photo-graphed. The device has a camera that is movable in an X-Y plane and is rotatable about an axis that extends through the camera and is substantially perpendicular to the X-Y plane. The device also includes a rotatable stage or plat-form. The stage or rotatable platform selectively rotates an object to be photographed about an object axis which is substantially perpendicular to the X-Y plane. The camera is provided on a camera mount, which mounts the camera such that the camera is at least rotatably movable along a camera axis which is substantially parallel to the object axis. Furthermore, a drive assembly is provided for reciprocally moving the camera mount along a Y axis toward and away from the plat-form. A translating means "translates" a first spatial and angular relationship between the camera which is movable in an X-Y plane and rotatable about an axis therethrough, and the object, into a second spatial and angular relationship between the camera and the object, which supposes that the camera is movably mounted on the camera mount so as to be rotatable along the camera axis and movable along the Y axis and the object is on a rotatable platform, such that a set of the second relationships will produce substantially the same photographic images as would be produced by a set of the first relationships. Controlling means is provided for controlling the drive assembly to regulate movement of the camera along the Y axis, and for controlling rotational movement of the plat-form and the camera according to the set of second relationships. The camera may also be moved along the Z-axis, perpendicular to the X-Y plane.

In an advantageous embodiment, the apparatus comprises an image processing unit for superimposing single images of plural primary image sequences which in part or completely have been produced by means of the image taking device or in a synthetic way, especially as computer graphics, for forming a resulting image sequence. This superposition of several images can be carried out using means of the film copying technology or the digital (video) image processing which are known as such. Herein, the application of the technique common be known as Blue-screen technique wherein during the takes a single-colored screen (Blue-screen) is provided as background for the take is especially useful.

For facilitating the synchronization between the several image sequences and possibly for creating computer graphics (especially e.g. "virtual reality") sequences which are fitted to the takes of real objects the apparatus in useful manner, furthermore, comprises a memory means for storing the control signals which are output to the several components of the apparatus (camera, drive of the camera mount, rotating stage or turntable, respectively, etc.) during the taking of a primary image sequence.

Its data input is connected with the output of the evaluating unit during the taking of at least one primary image sequence to store the evaluated control signals. The data output of the memory means optionally during the taking of a further primary image sequence is connectable with the control inputs of the components or an input of the evaluating unit or is connectable with an input of the image processing unit during the production of the resulting image sequence from plural primary image sequences such that the control signals are directly or indirectly read out for controlling the further takes and/or the image processing.

Especially, the evaluating unit comprises an interface for connecting it with a graphics computer for unidirectionally or bidirectionally transferring control data for the apparatus to and/or from this computer for the synchronized production of phototechnically or videotechnically generated and of synthetic image sequences.

In a further useful embodiment, the evaluating unit and/or the image processing unit comprises a scaling unit for individually adjusting the control signals for the operation of the apparatus for producing several image sequences with respect to different take conditions—especially different scale (object distance, zoom)—and/or parameters of the several images to be superimposed and originating from different image sequences. Hereby e.g. an adjustment of the relative image size, a rotation of the image plane and/or the adjustment of a corresponding image-weighing factor for the superposition (mixing) of several images can be carried out.

Furthermore, the image processing unit advantageously comprises means for the later processing of an image sequence being formed by superposition ("matting").

A further important embodiment of the apparatus is characterized in that a controllable, especially rotatable and/or luminance-controllable lighting means for the object (s) is provided which lighting means comprises a control unit being connected to an output of the evaluating unit. Hereby, it is ensured that the illumination of each object is adapted to the special filming technology according to the invention.

To be able to simply produce takes in which translational motions of humans, animals, vehicles, etc. shall be shown in or on the rotating means further means for translating or additionally rotating an object with respect to the rotating means is provided, the means for translating or additionally rotating comprising a separate drive unit and an input being connected to an output of the evaluating unit.

For the effective production of image sequences in which objects with very different size shall be shown at the same time plural rotating means of different size for plural objects of different size can be provided, which rotating means are used time-sequentially for taking plural primary image sequences and comprising a control input which is connected to an output of the evaluating unit.

The image taking device, i.e. the "camera", especially can be a film or video camera, and the rotating means can be an essentially horizontal rotating stage, and the motion apparatus can comprise a camera mount or carriage, respectively, which is guided in a horizontal and a vertical track, each track being straight.

For medical applications, the image taking device can be a medical imaging device, especially using ultrasound waves, X-rays or corpuscular rays or nuclear or electron spins for the image generation. The object is then, of course, a human being or animal which is arranged on a rotatable bed.

In both latter—as well as in further possible—applications, the image taking device comprises a support which is rotatable or pivotable, respectively about three axes.

An advantageous embodiment of the process of the invention is that single images of plural primary image sequences are superimposed to a resulting image sequence, wherein the superposition especially can be carried out in Blue-screen manner.

In a useful manner, during the process the drive data being used during the production of a primary image sequence are stored and optionally used for the production of a further primary image sequence and/or for the production of the resulting image sequence from plural primary image sequences directly or following a transformation for the image generation.

The drive data for producing different image sequences can, especially for adjusting the relative image size, for rotating the image plane and/or for adjusting an image-waiting factor for primary images for producing a resulting image be scaled and/or weighed.

Figure 2:
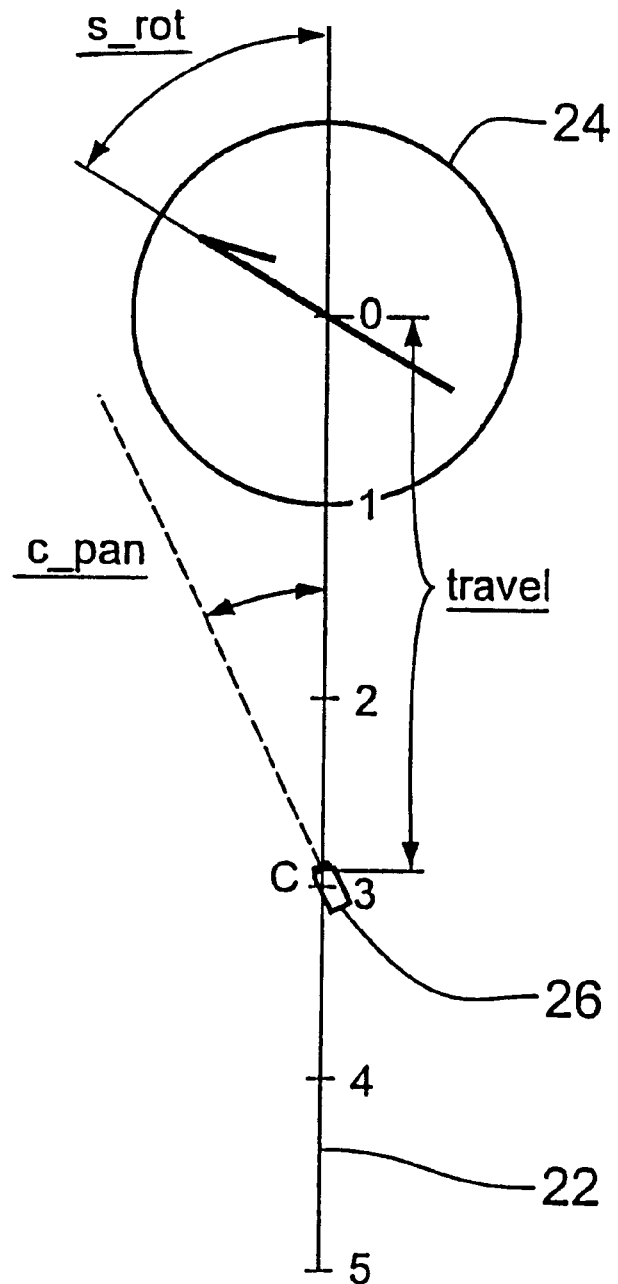
Figure 4A:
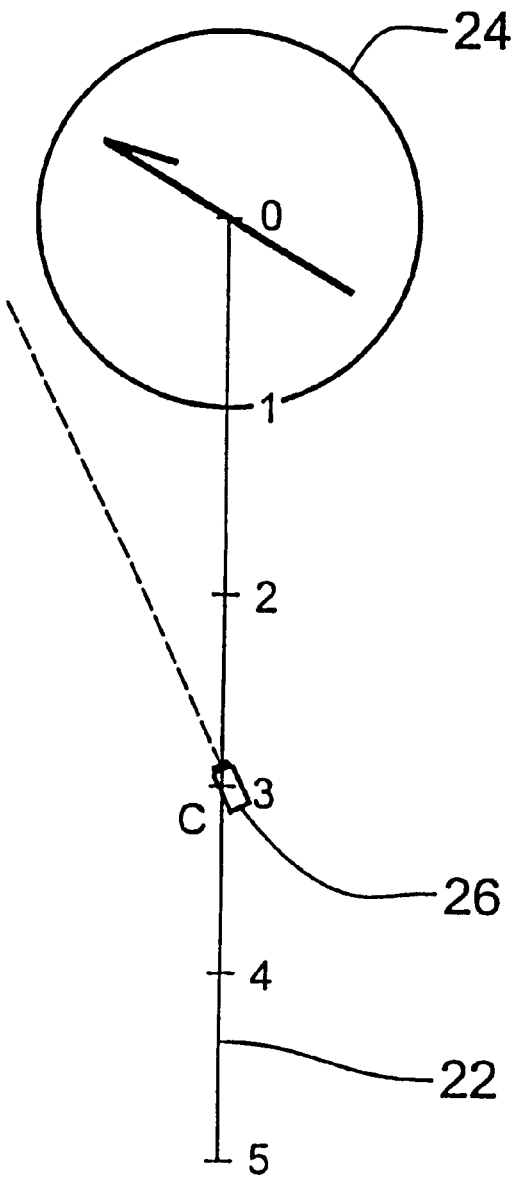
Figure 4B:
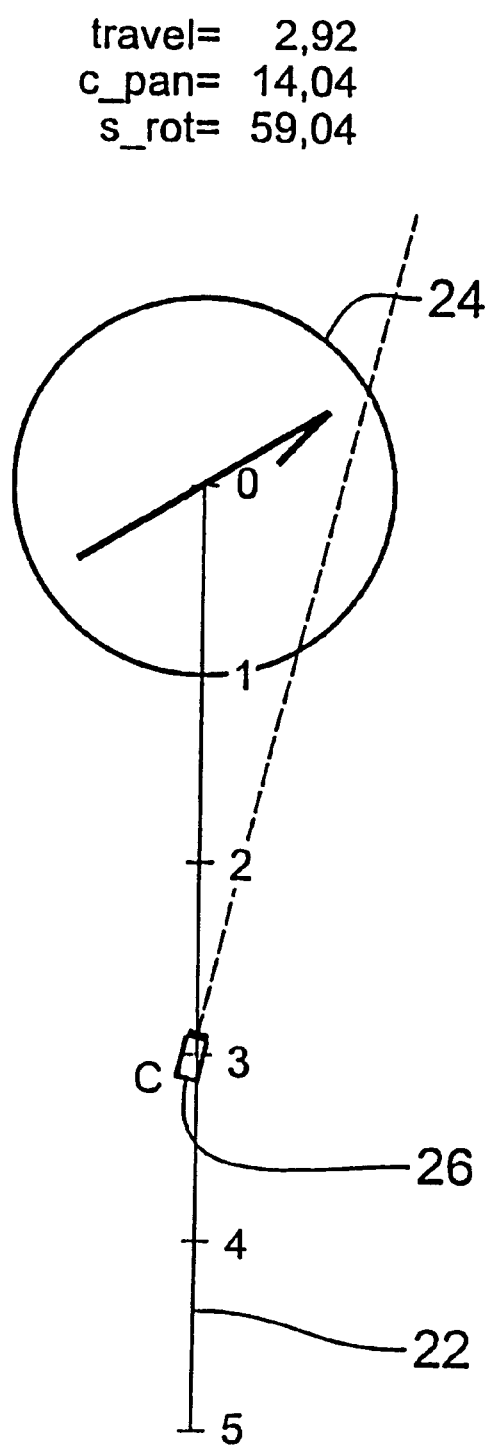
Figure 5:
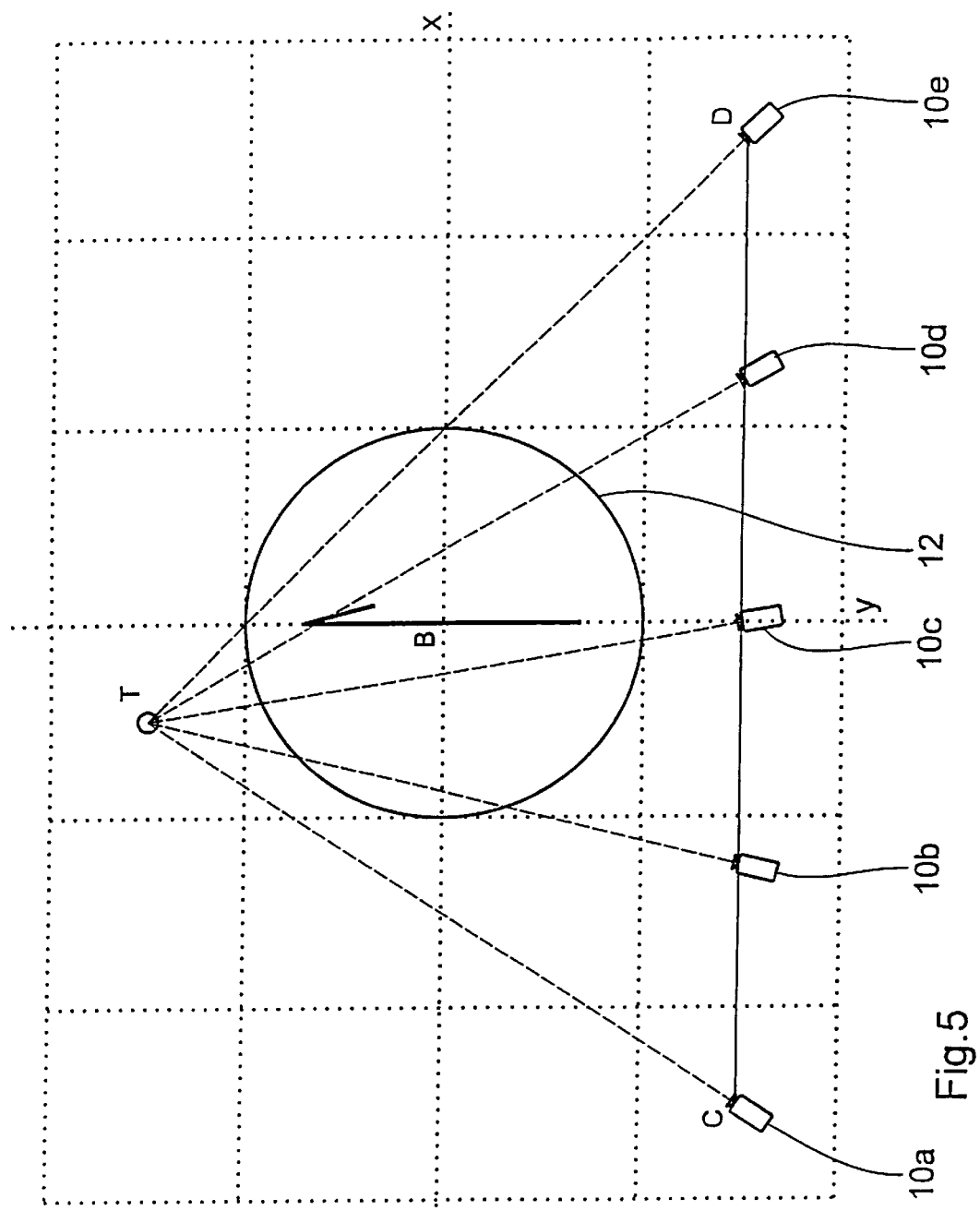

FIG. 1 is a schematic diagram representing the spatial and angular relationship between a camera location and an object providing a photograph image according to conventional photography, FIG. 2 is a schematic diagram representing the spatial and angular relationship between a camera location and an object according to an embodiment of the invention which provides the same photograph image as represented in FIG. 1, FIG. 3 is a schematic diagram representing the spatial and angular relationships between two camera locations and an object for providing photograph images according to conventional photography, FIGS. 4a and 4b are schematic diagrams representing the spatial and angular relationships between two camera locations and an object according to an embodiment of the invention which provide the same photograph images as represented in FIG. 3, FIG. 5 is a schematic diagram representing the spatial and angular relationships between five camera locations and an object for providing photograph images according to conventional photography.

Figure 6:
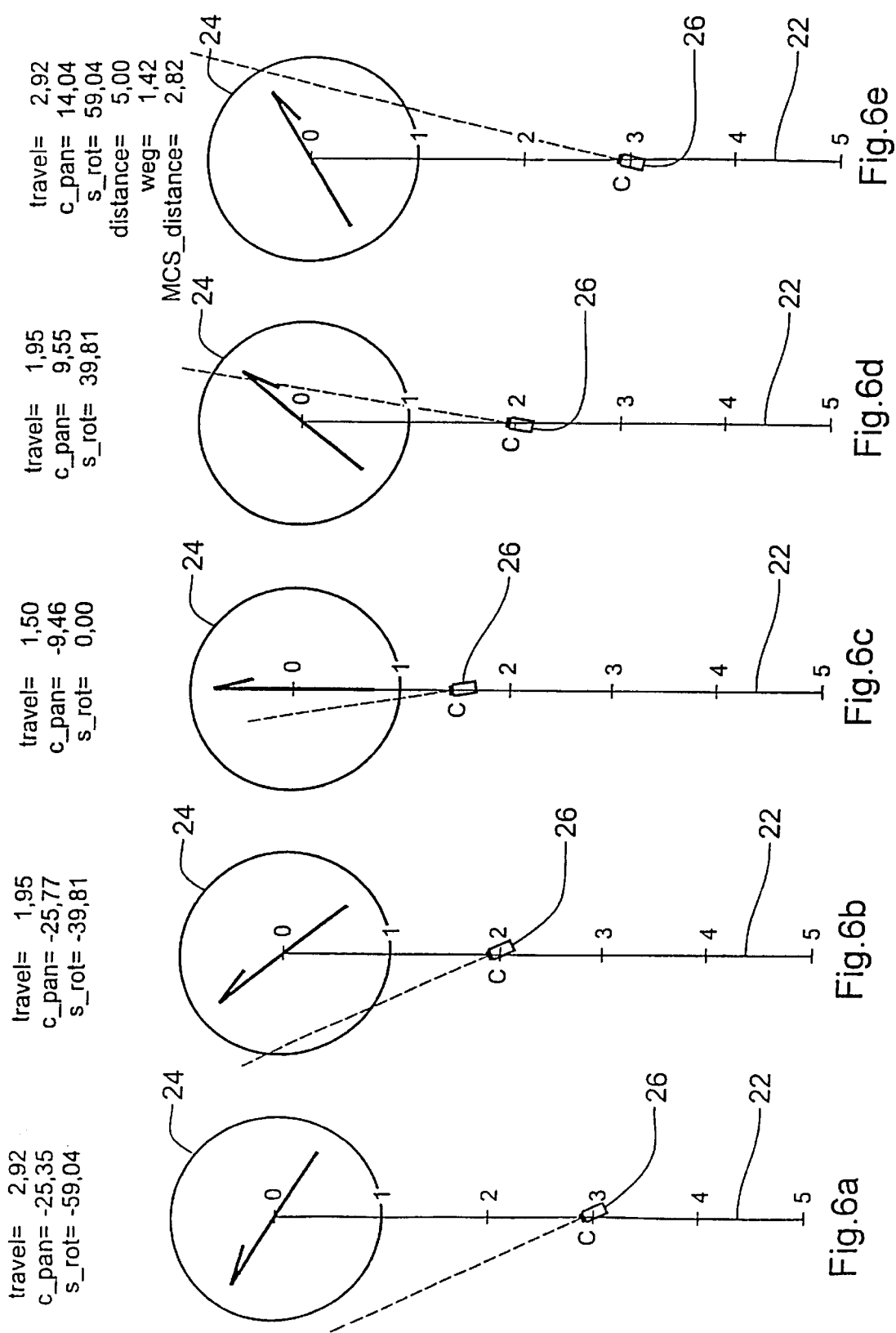
Figure 7:
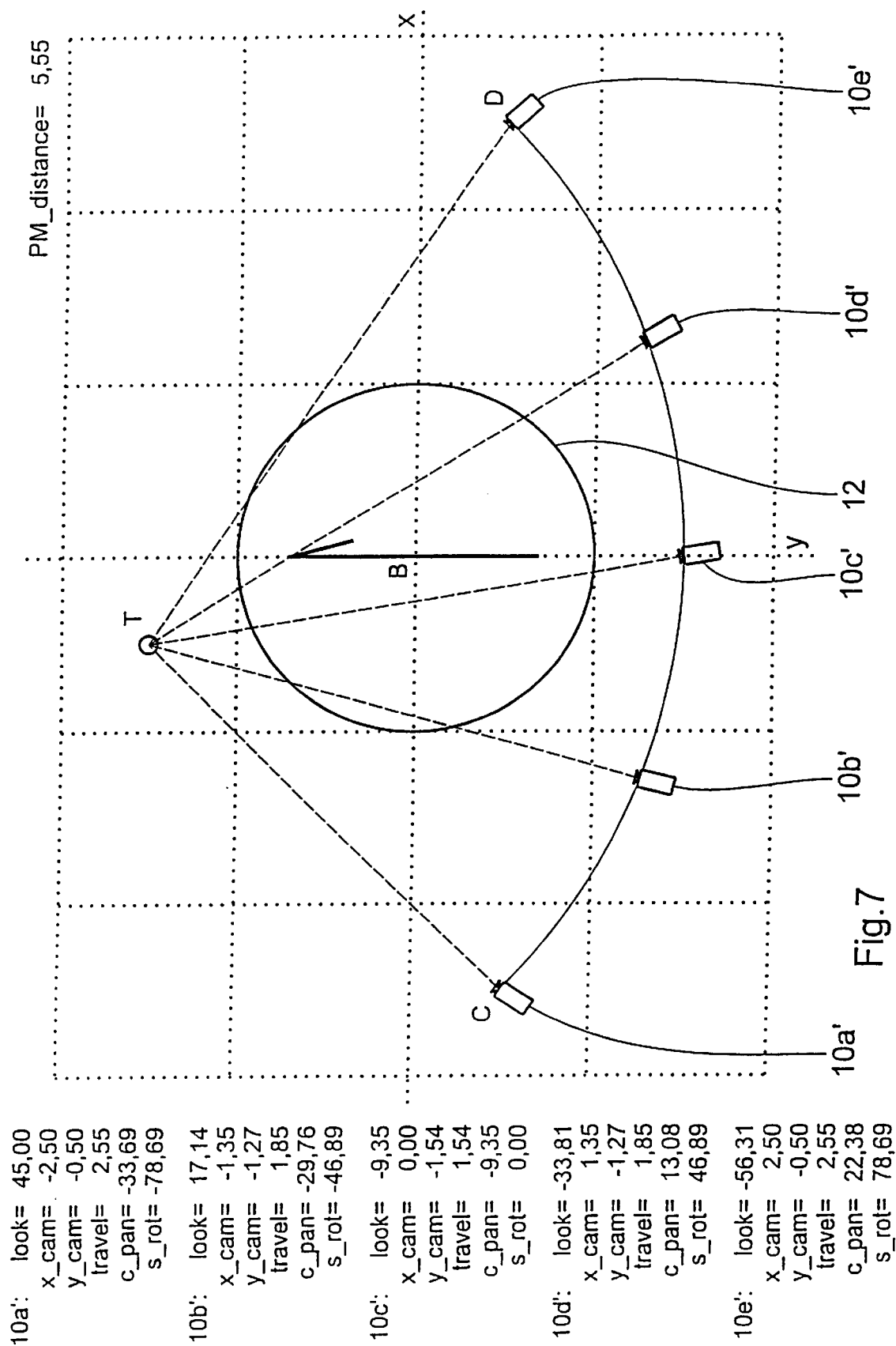
Figure 8:
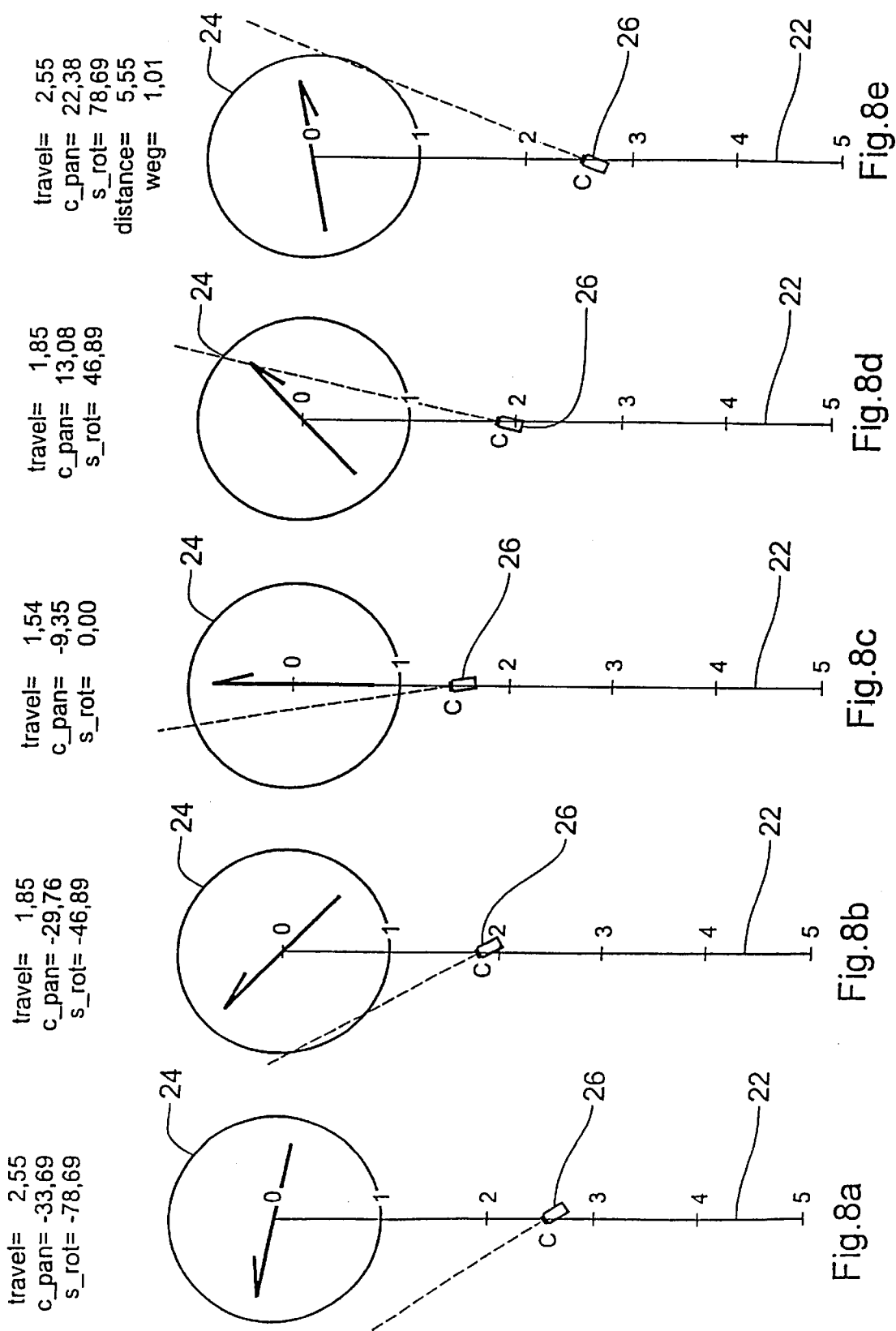
Figure 9:
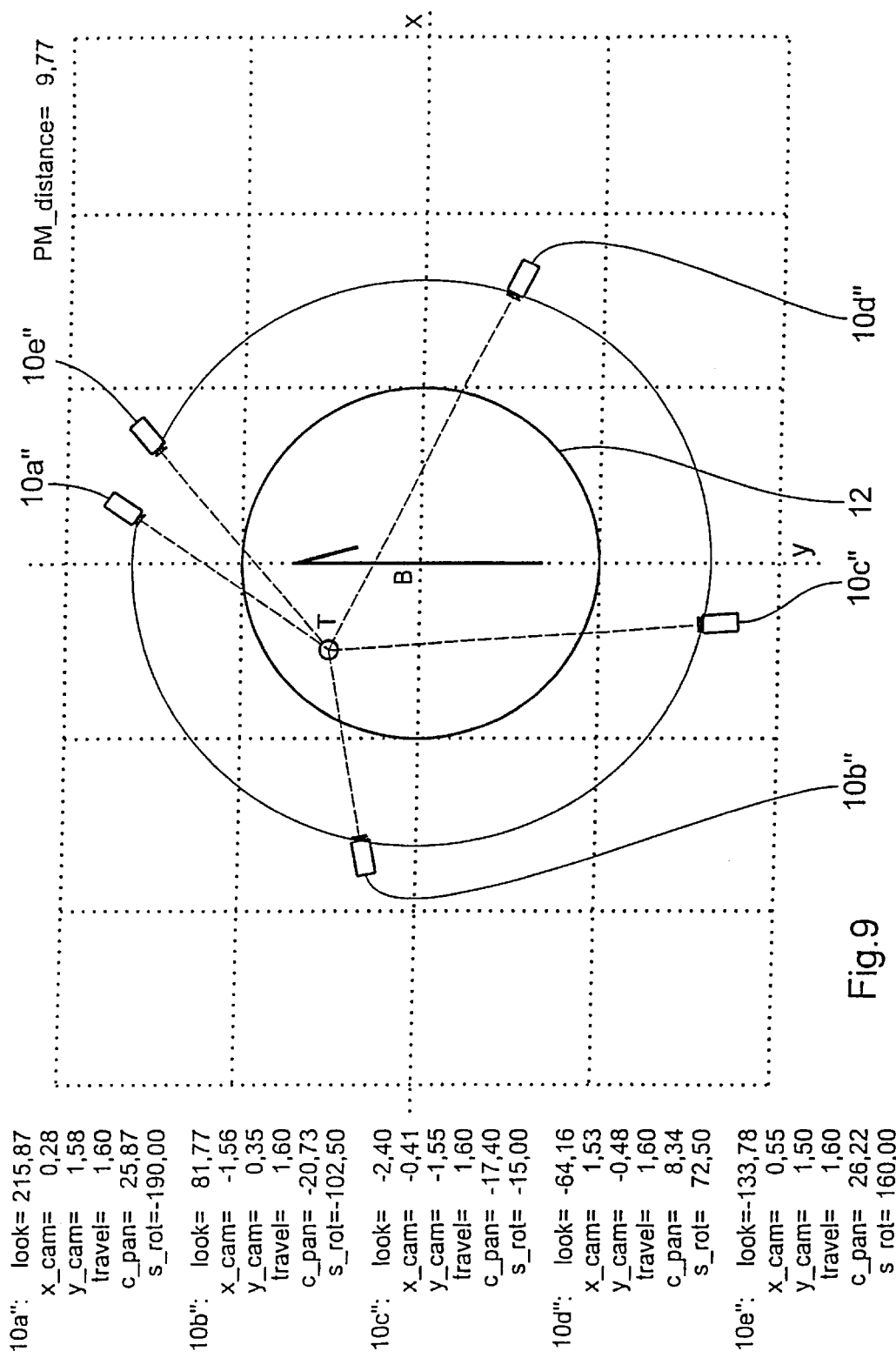
Figure 10:
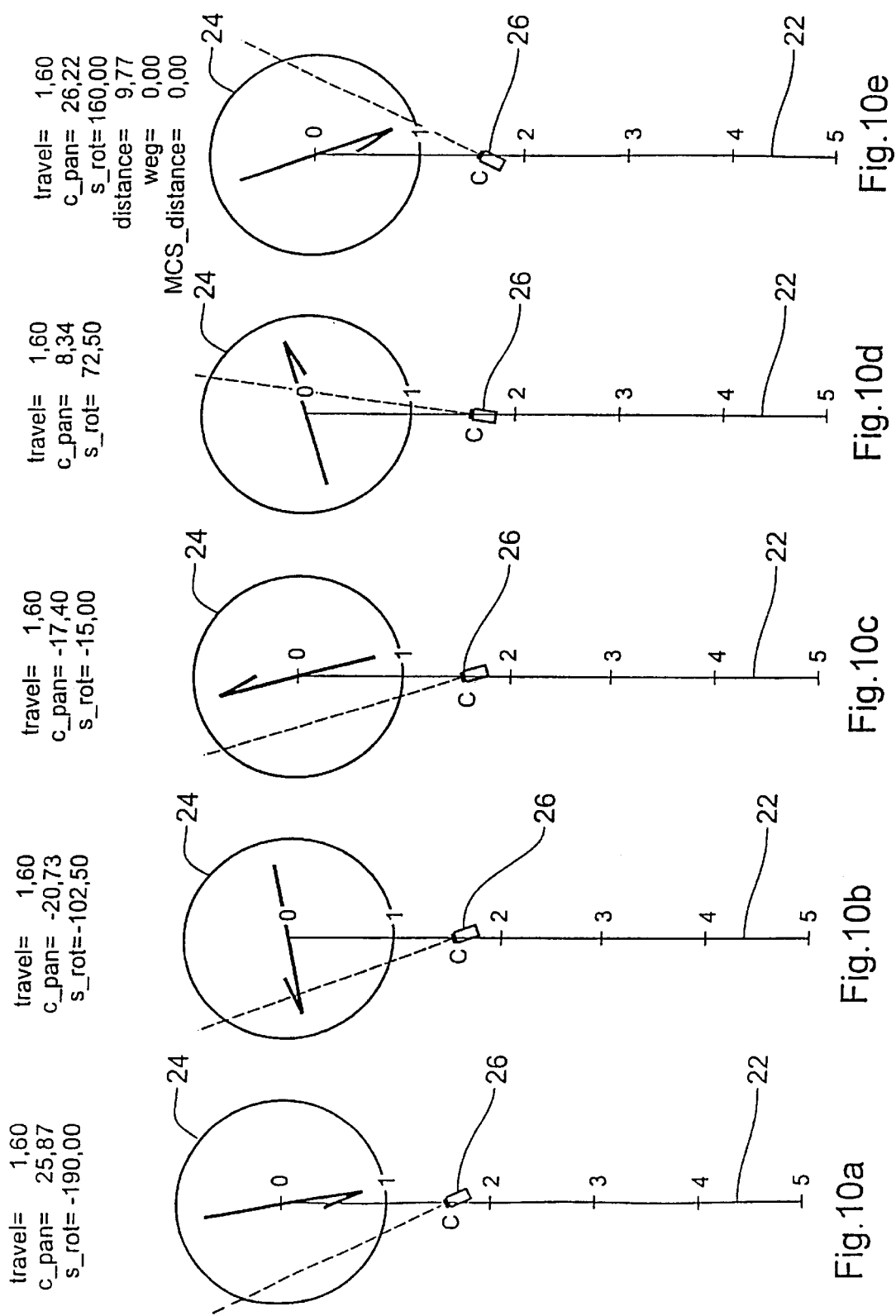
Figure 11:
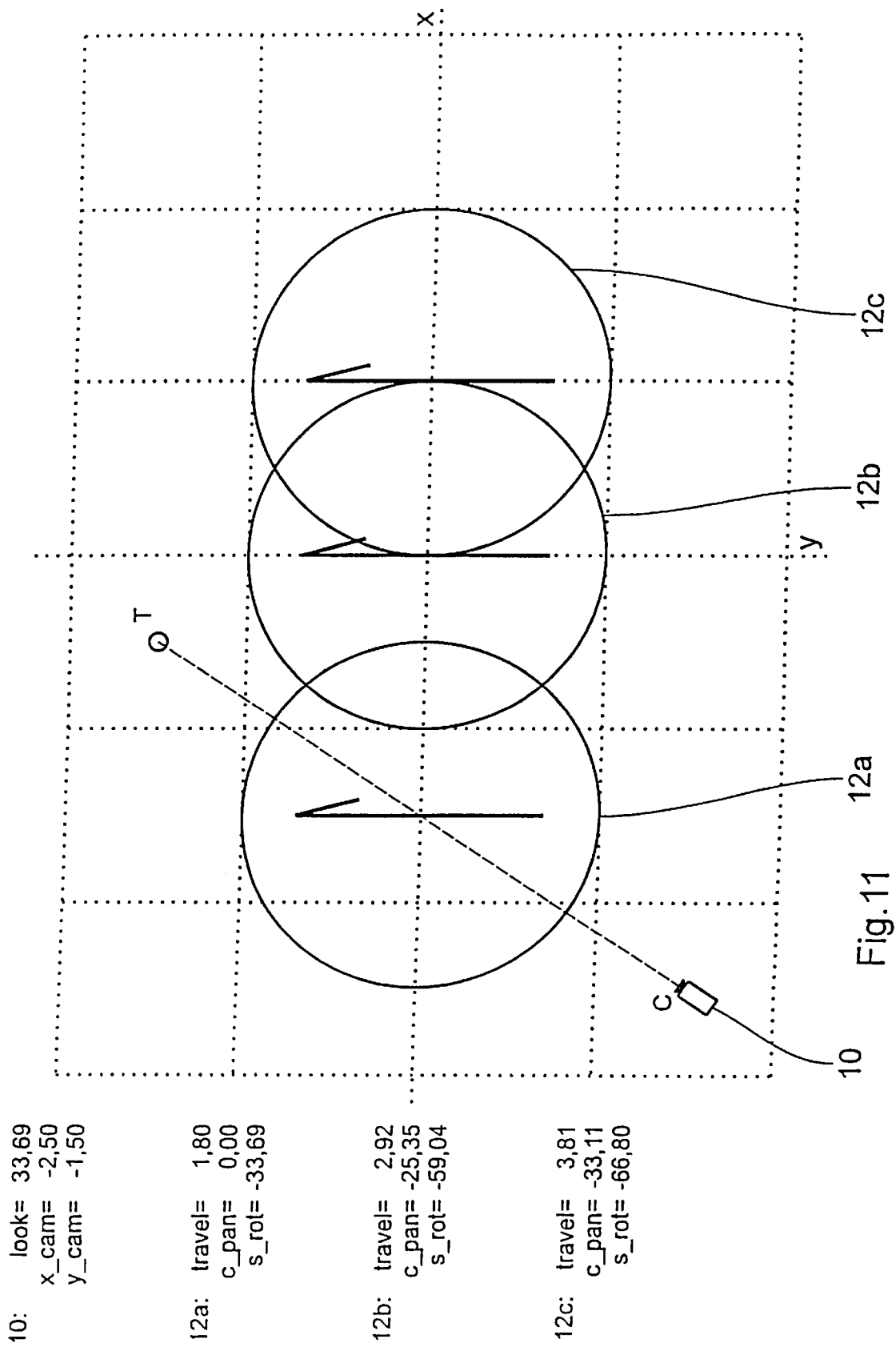
Figures 12A, 12B, 12C:
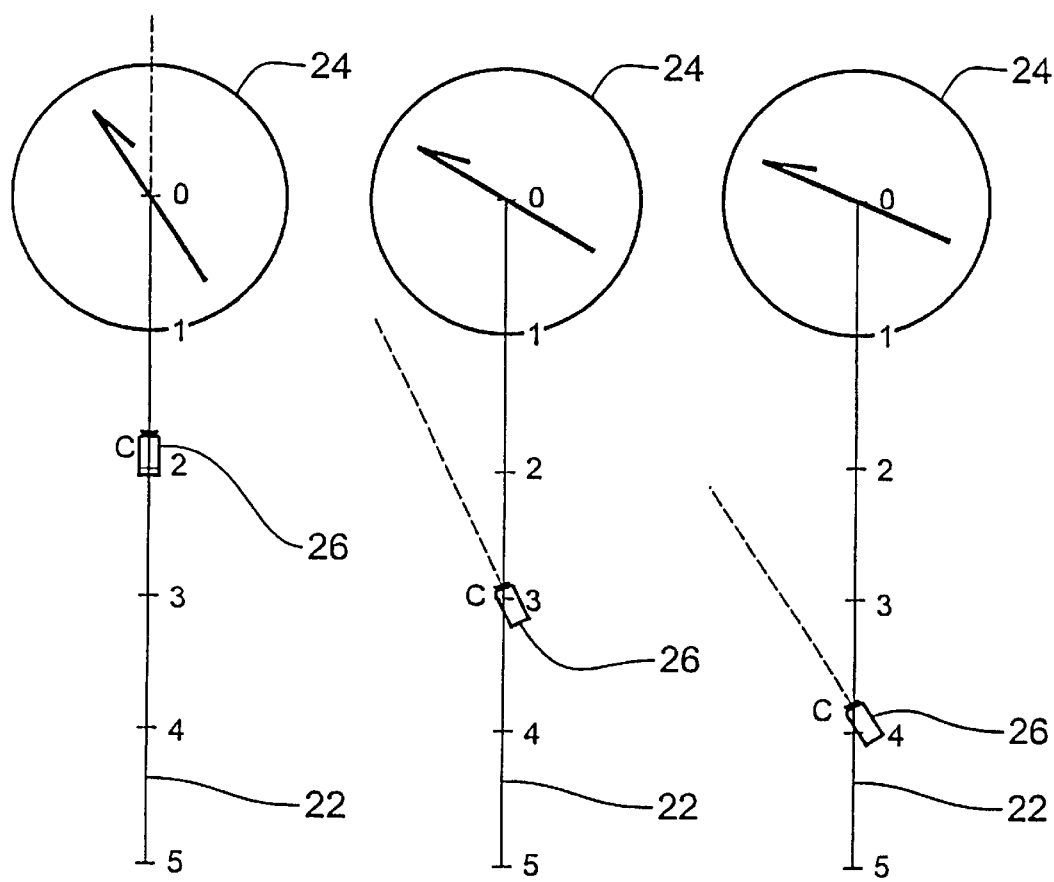
Figure 13:
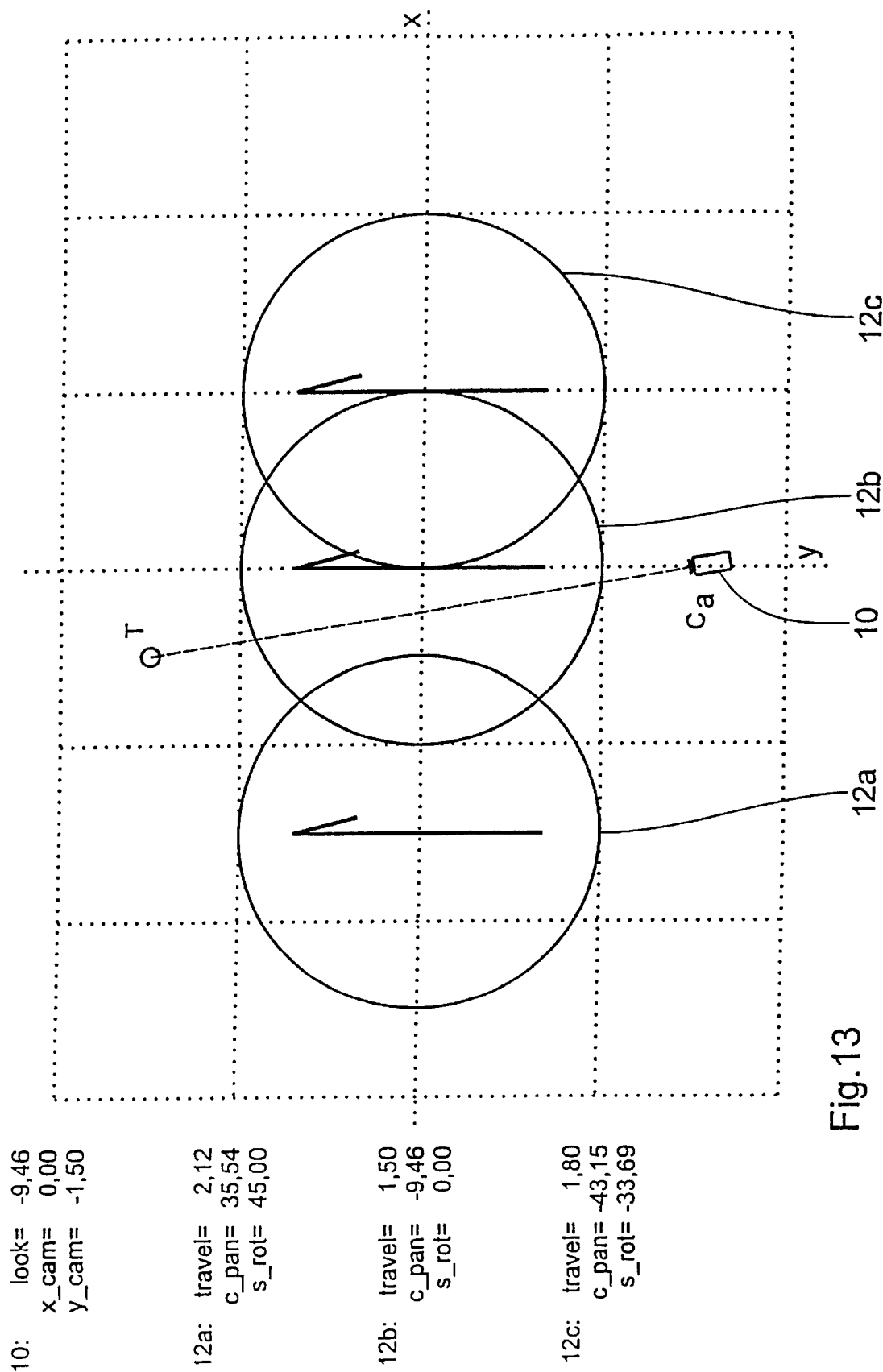
Figures 14A, 14B, 14C:
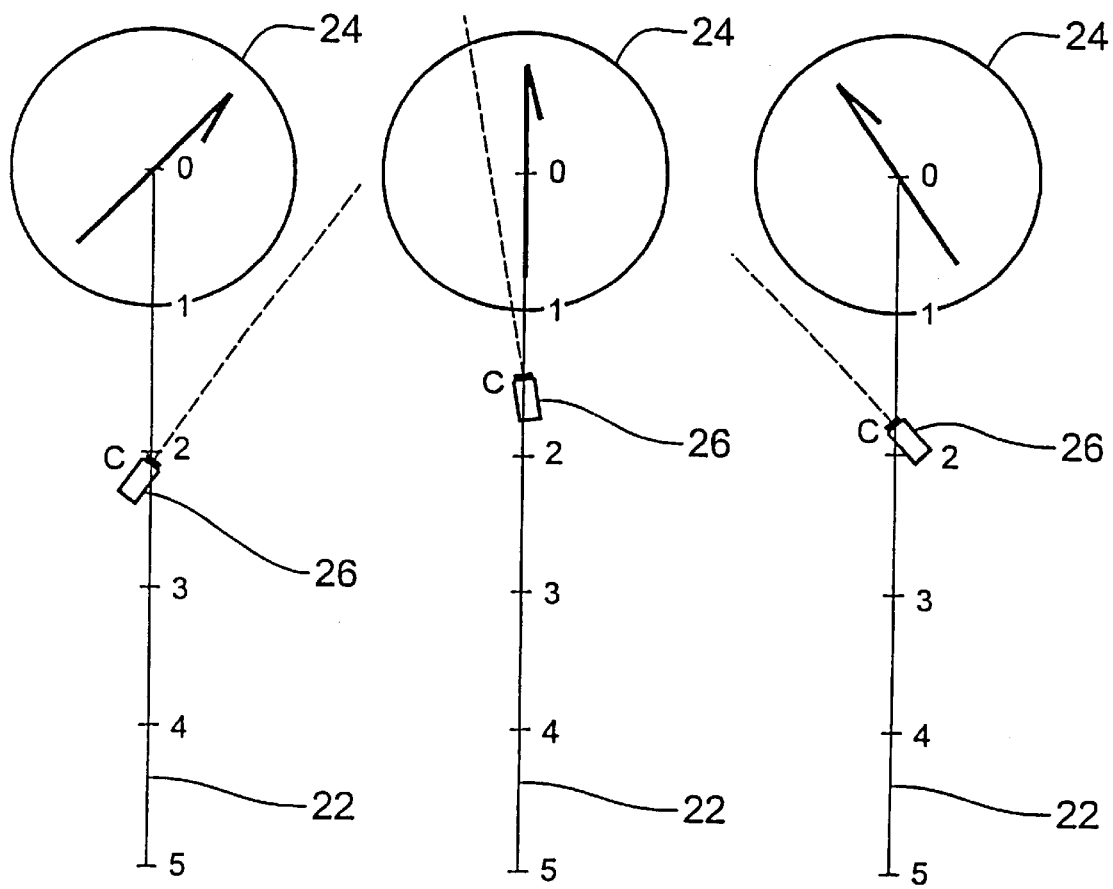
Figure 15:
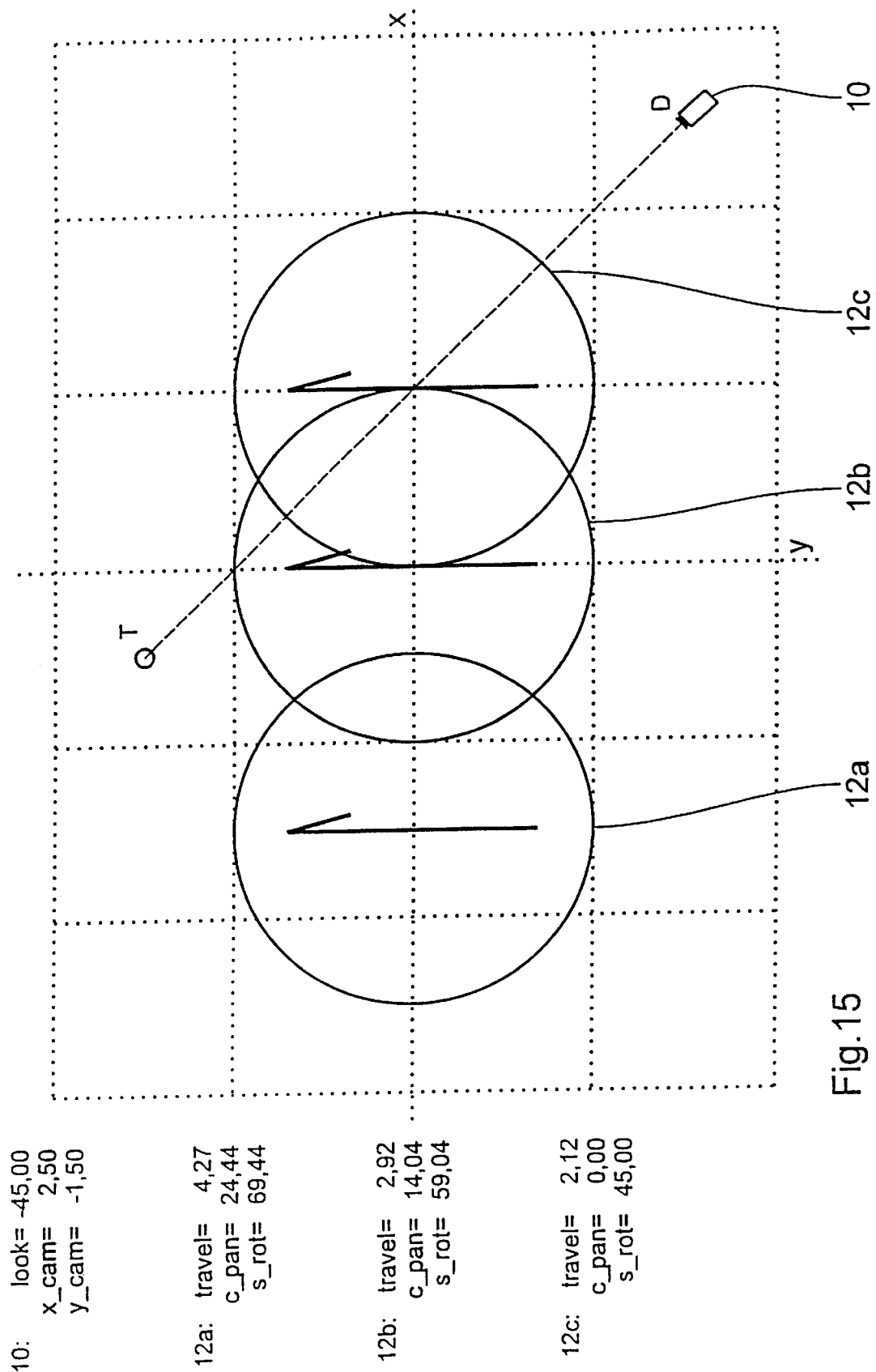
Figure 16A:
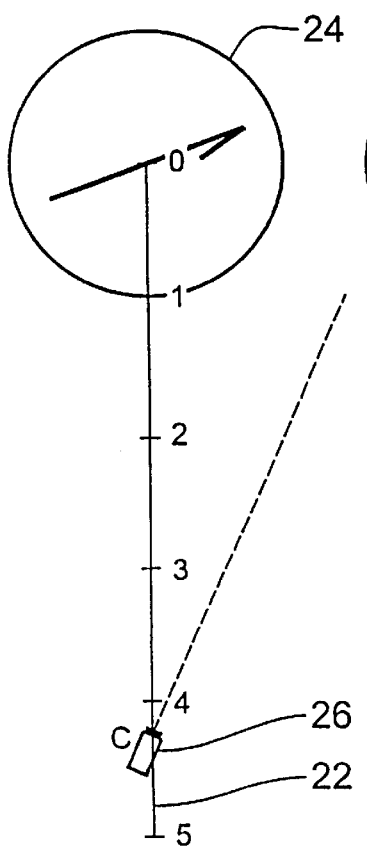
Figure 16B:
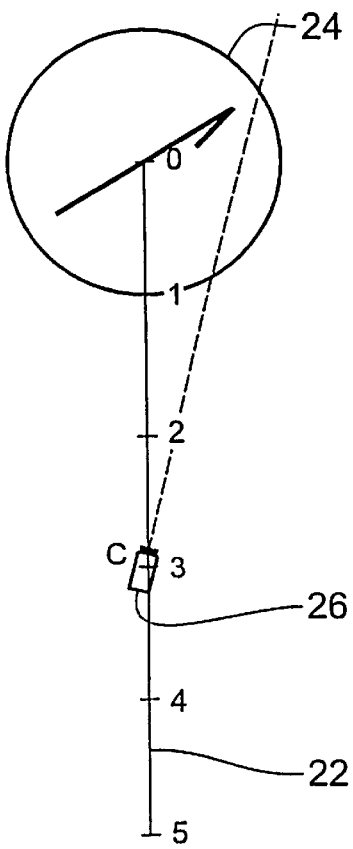
Figure 16C:
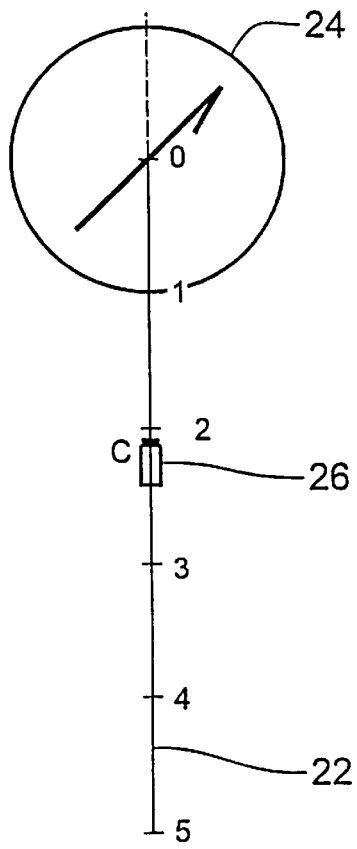
Figure 17:
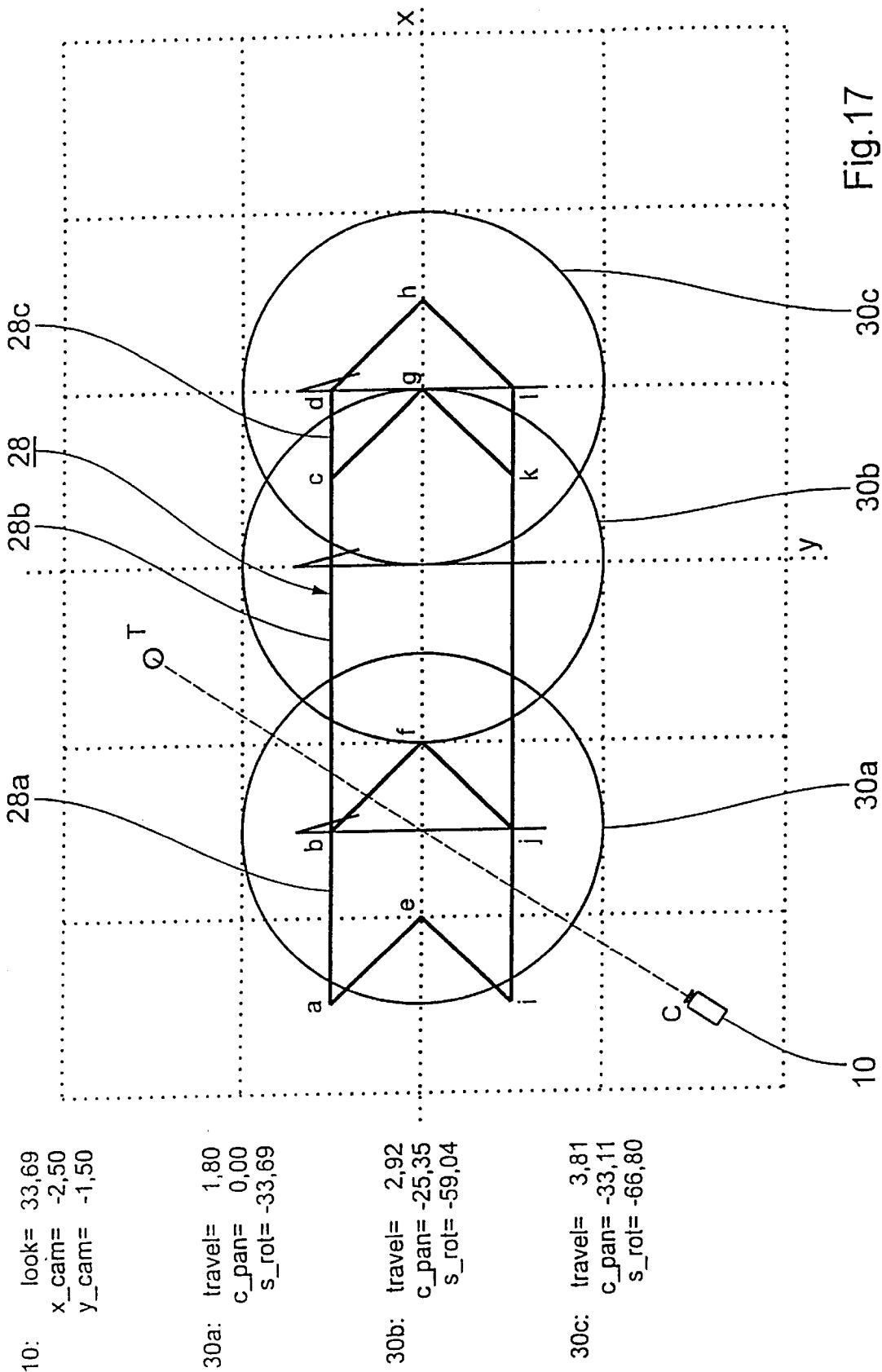
Figure 18:
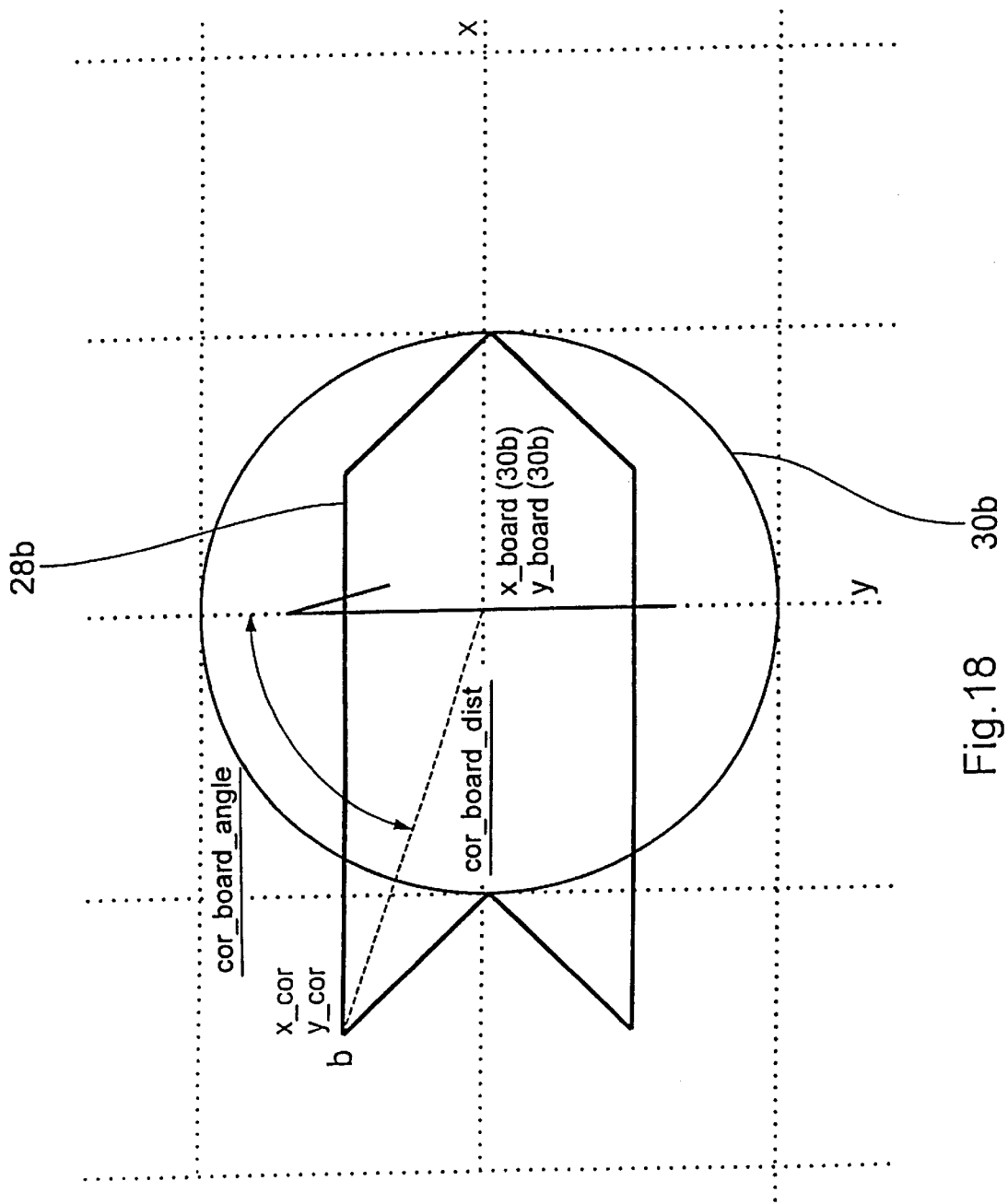
Figure 19:
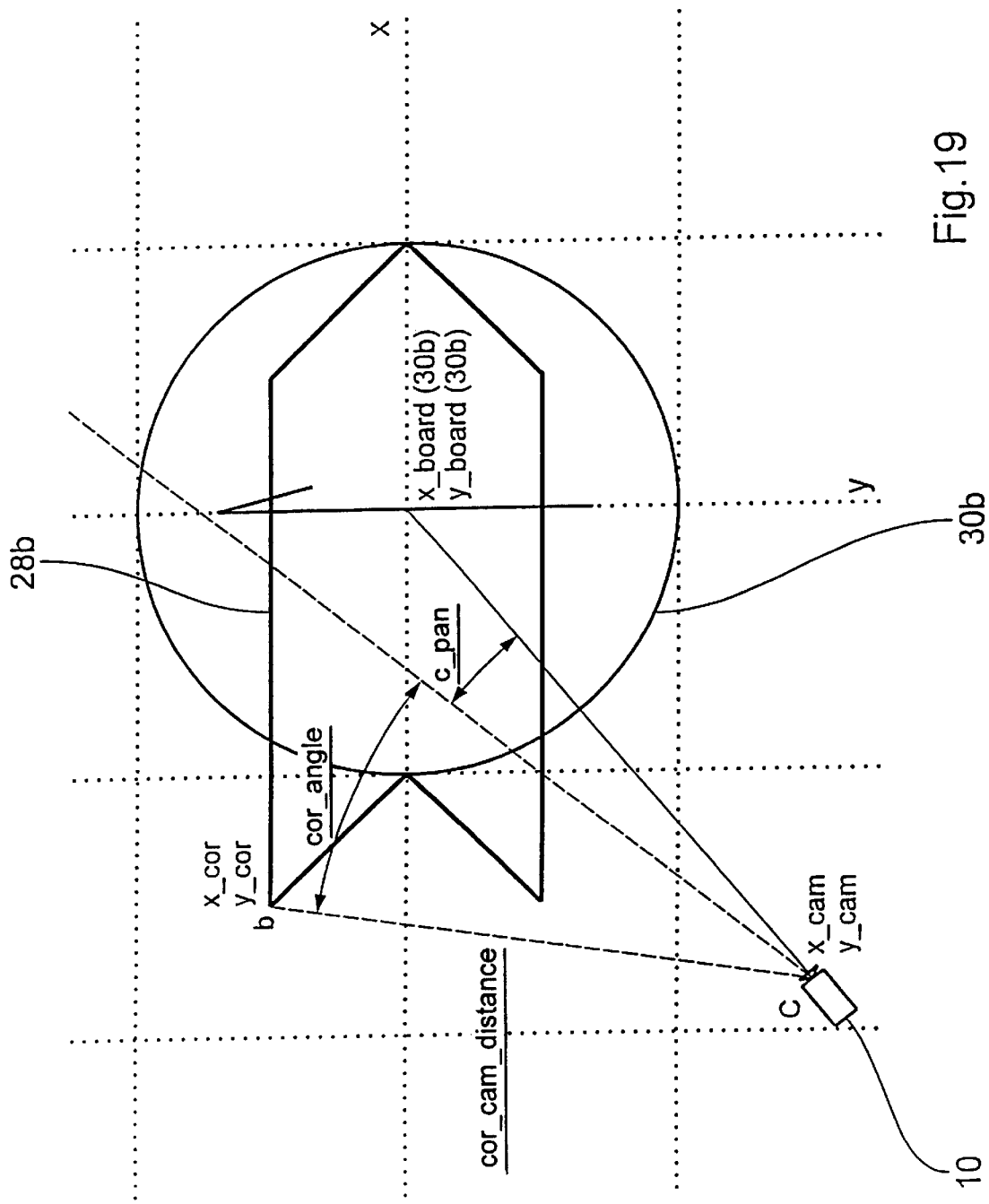
Figure 20:
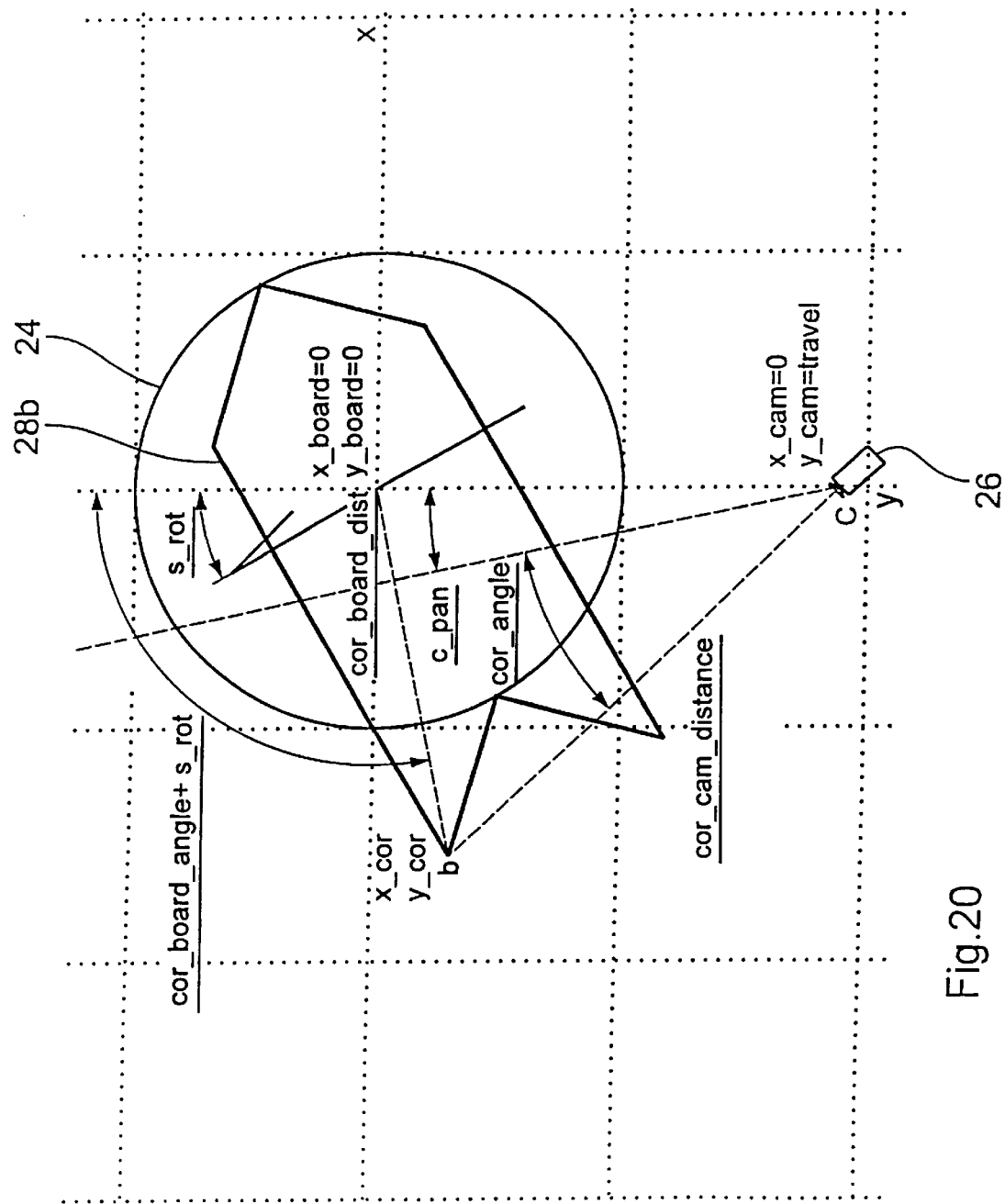
Figure 21:
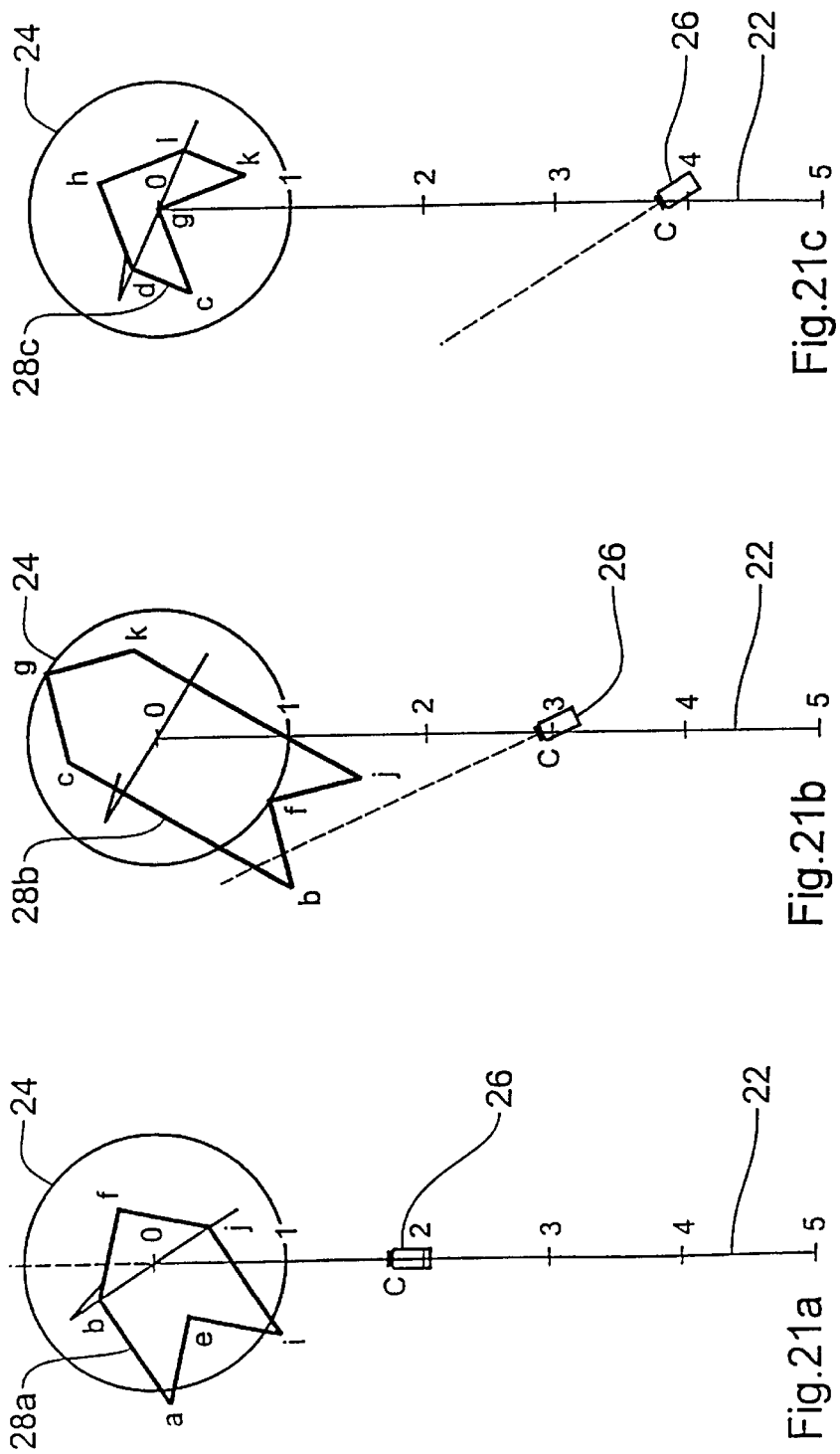
Figure 22:
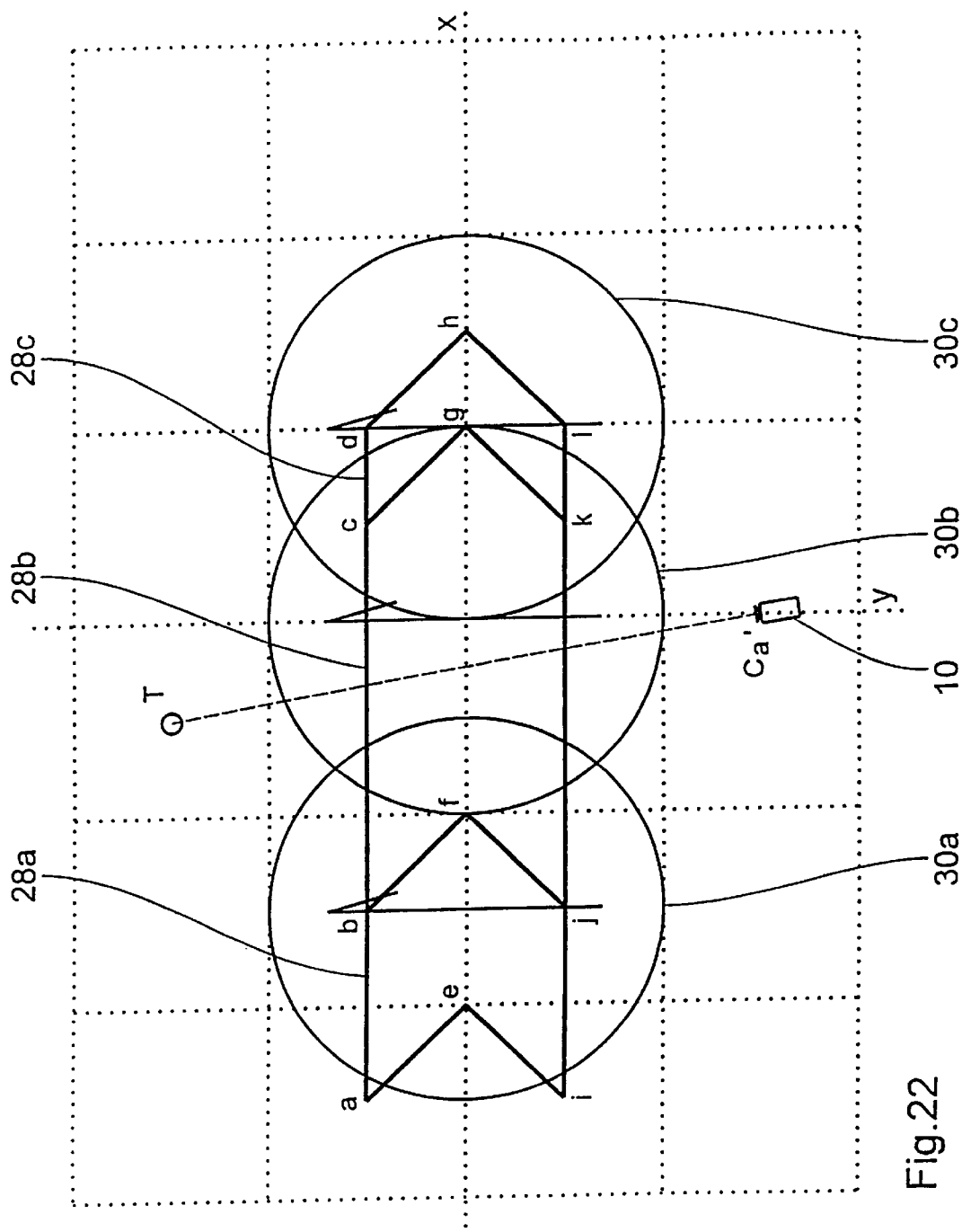
Figure 23C:
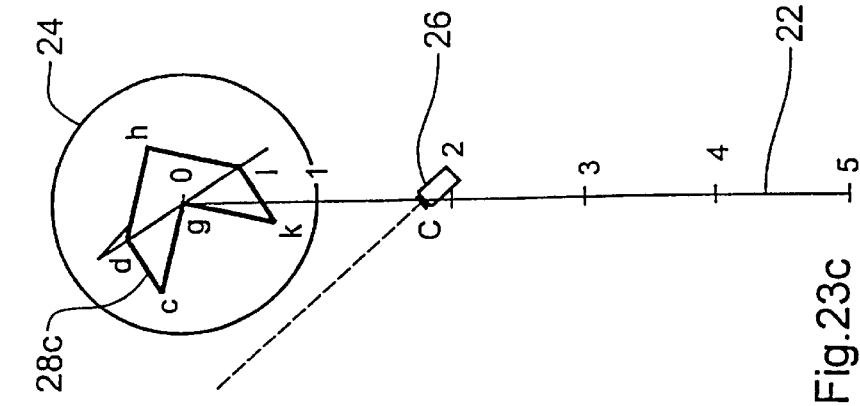
Figure 23B:
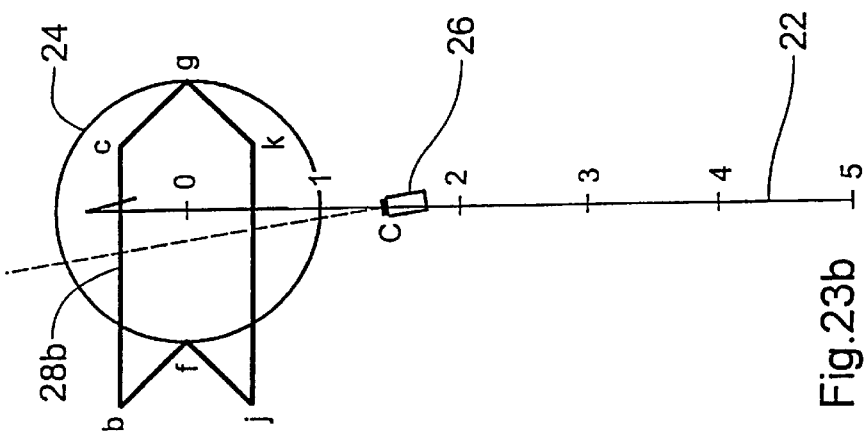
Figure 23A:
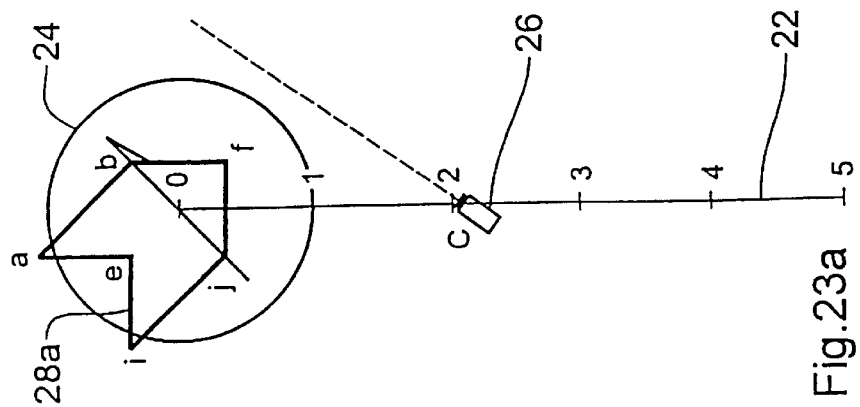
Figure 24:
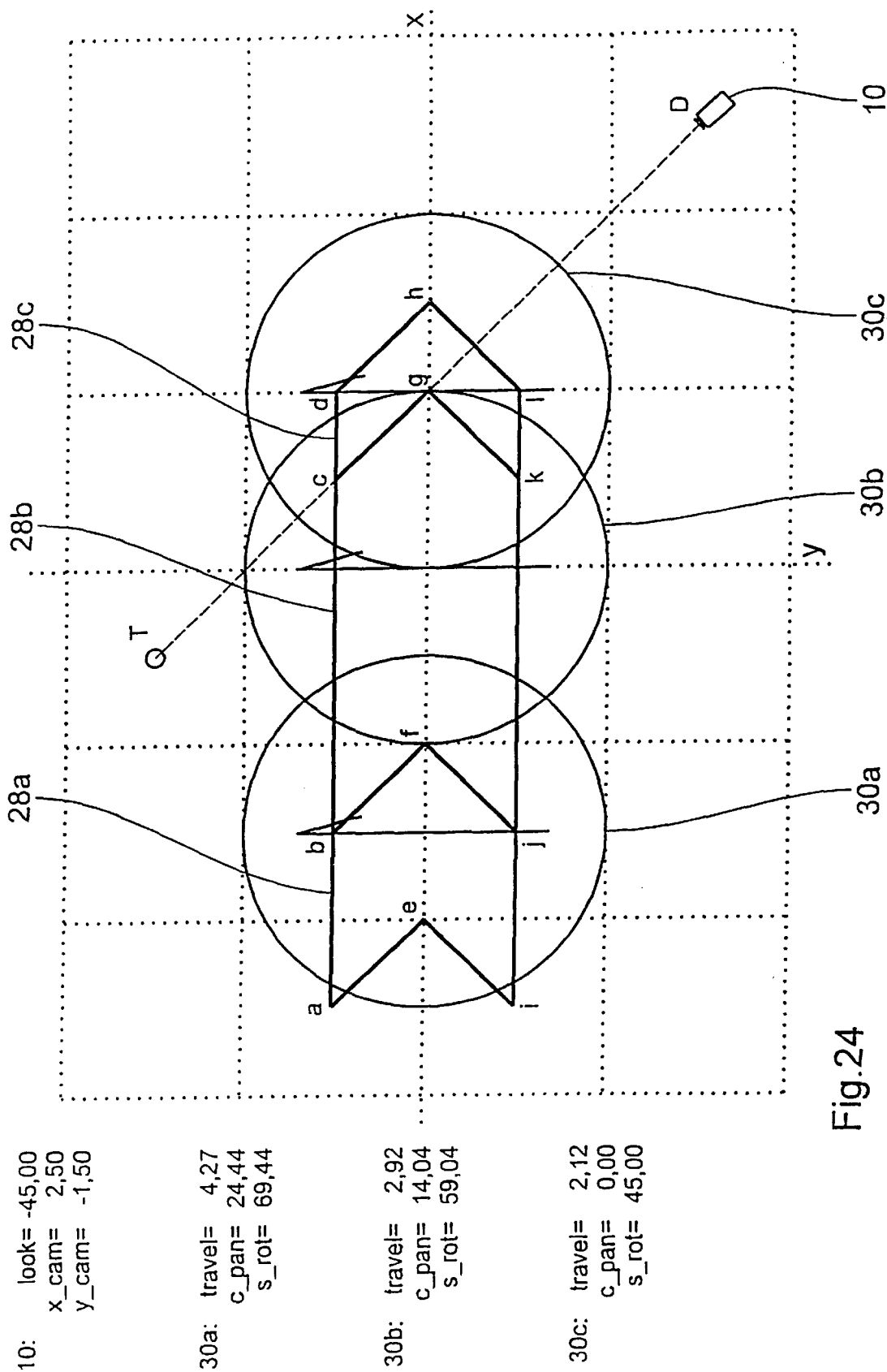
Figure 25C:
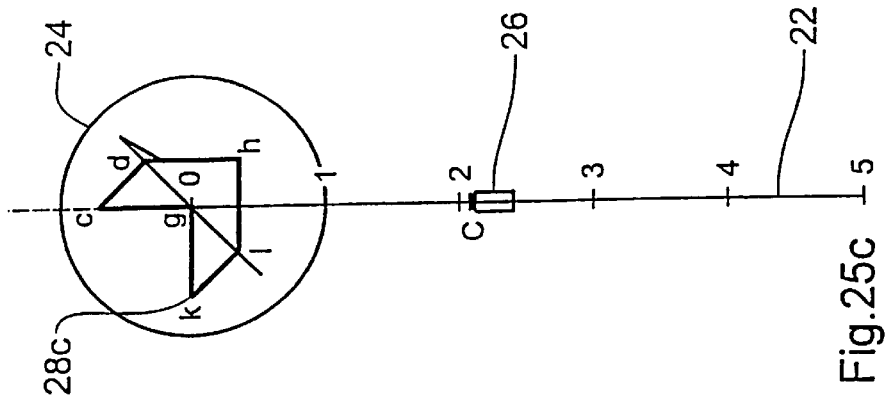
Figure 25B:
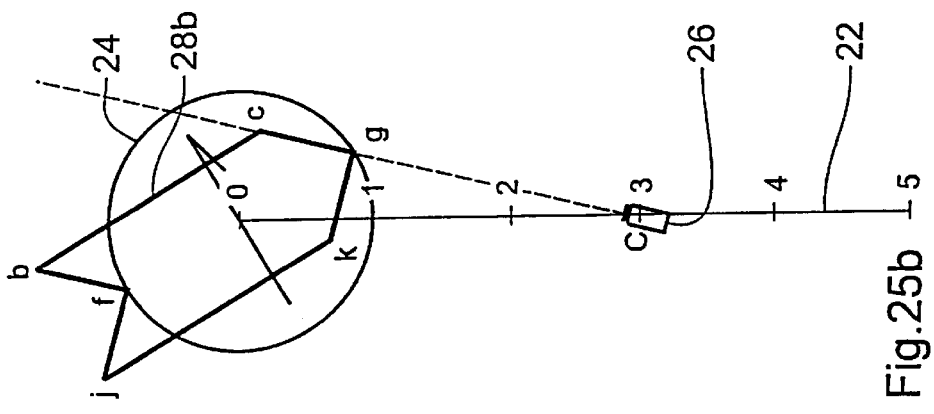
Figure 25A:
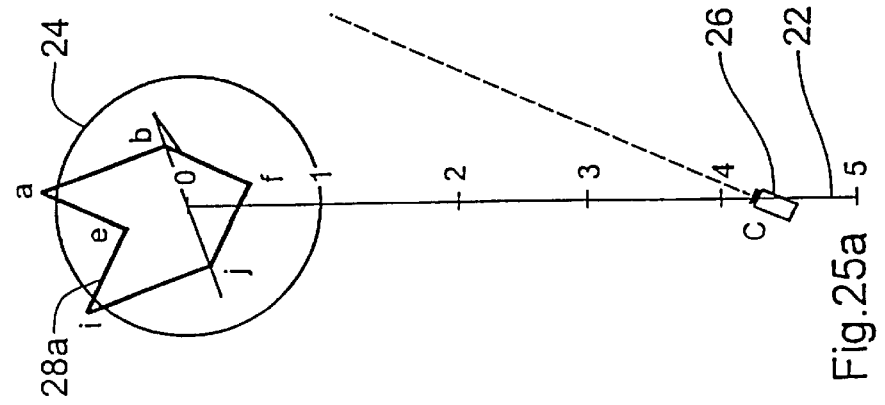
Figure 26:
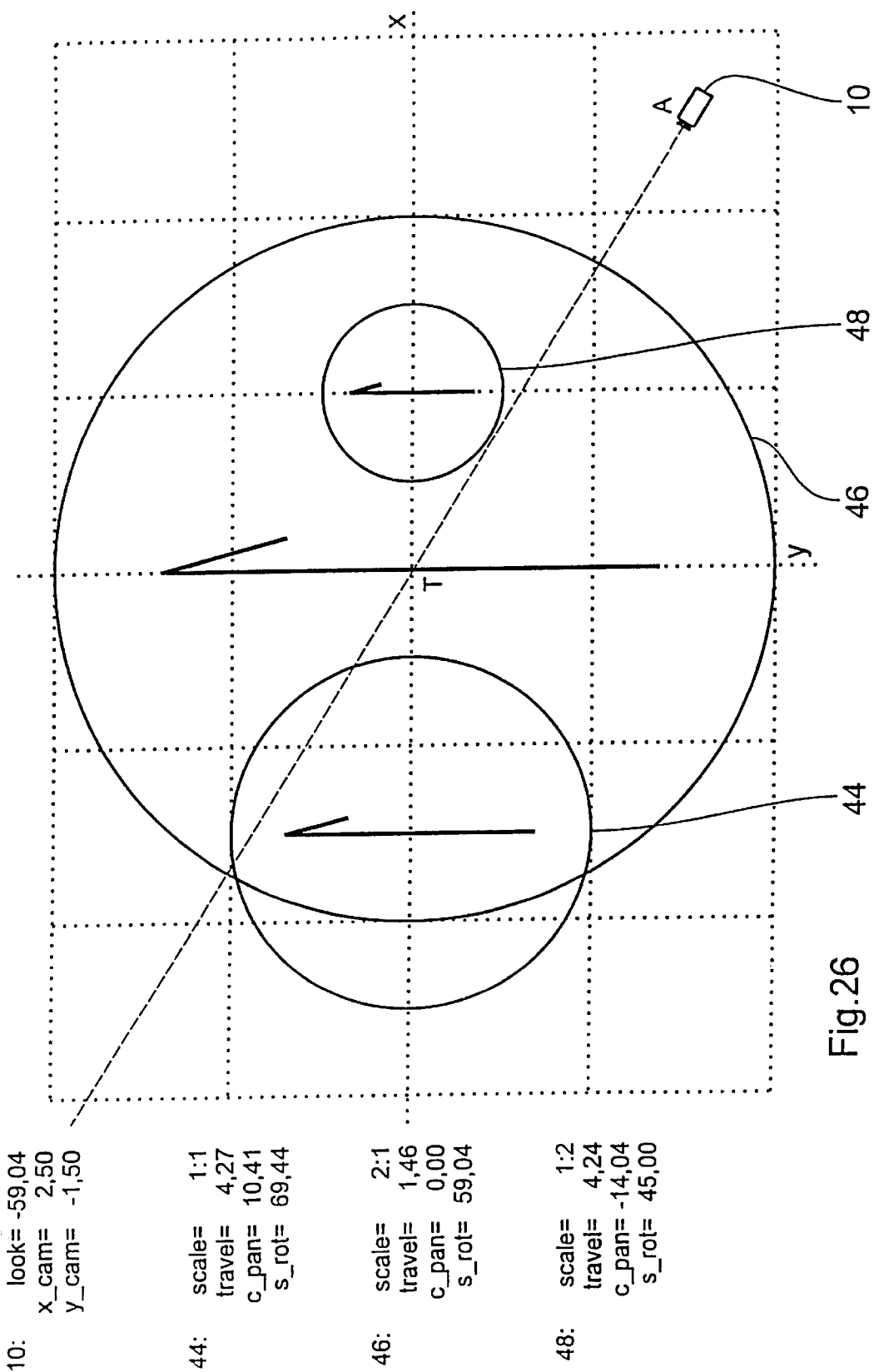
Figure 27C:
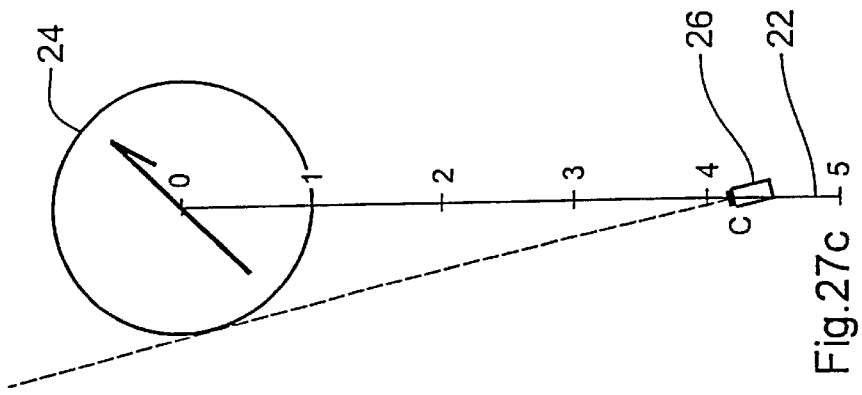
Figure 27B:
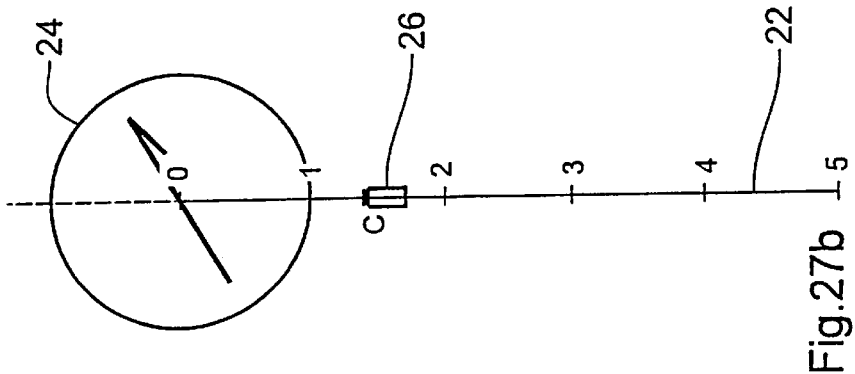
Figure 27A:
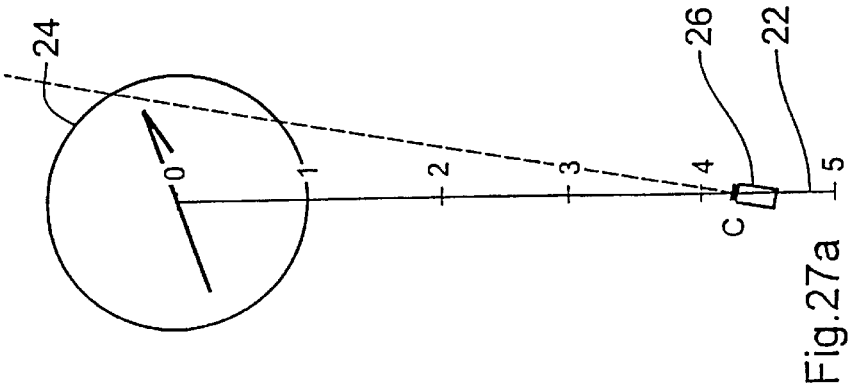
Figure 28:
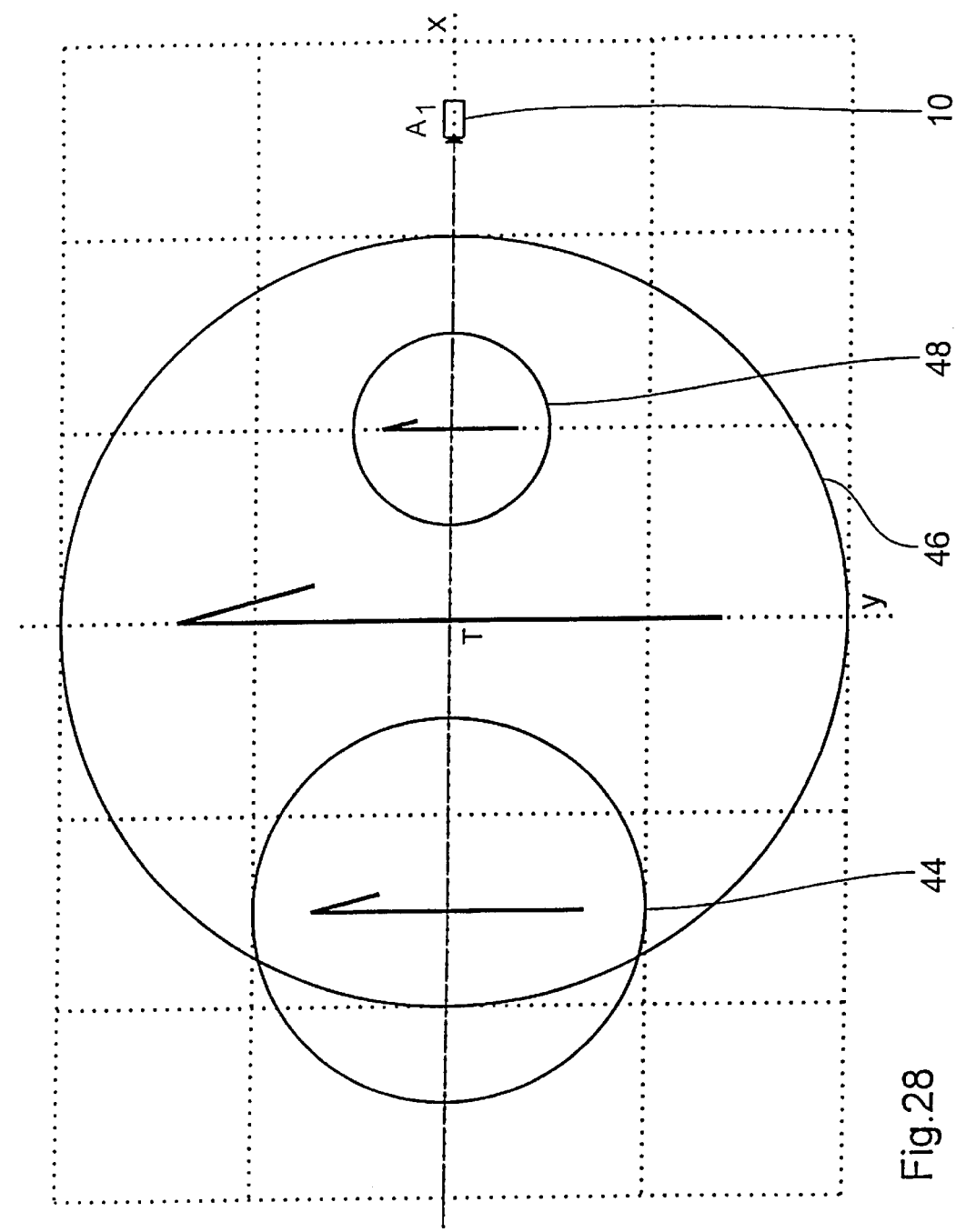
Figure 29C:
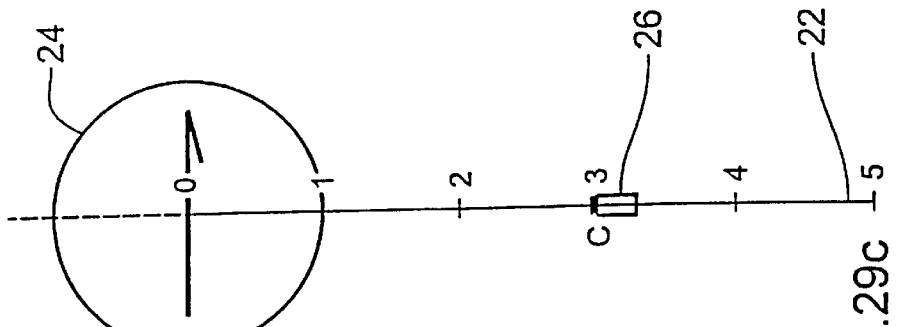
Figure 29B:
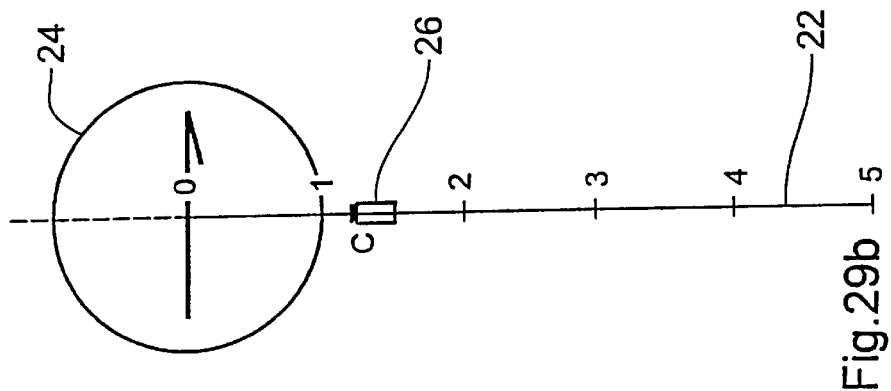
Figure 29A:
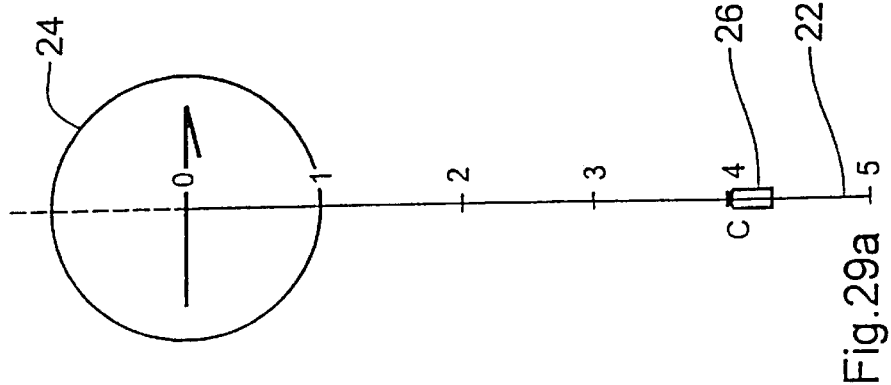
Figure 32:
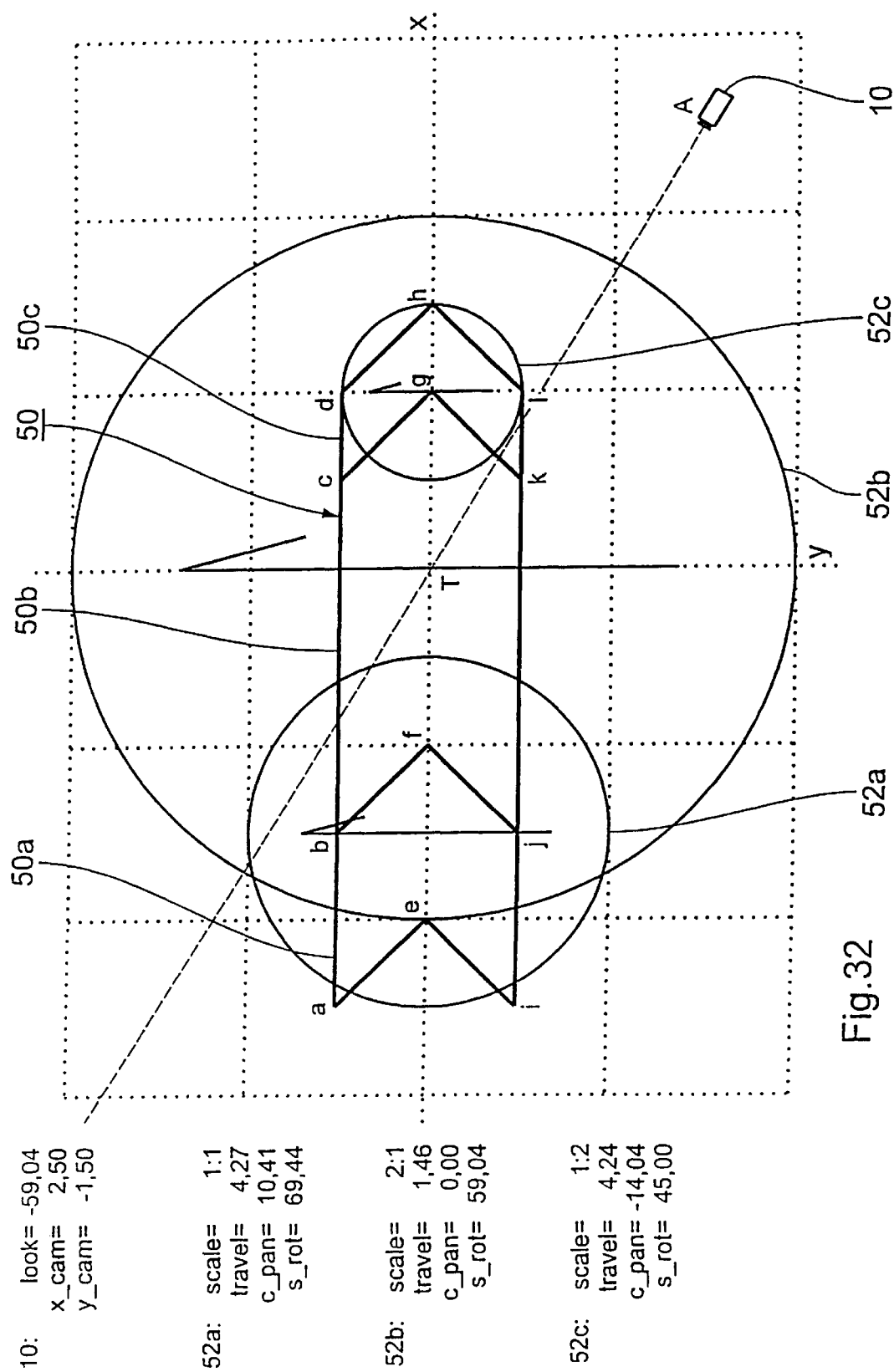
Figure 33C:
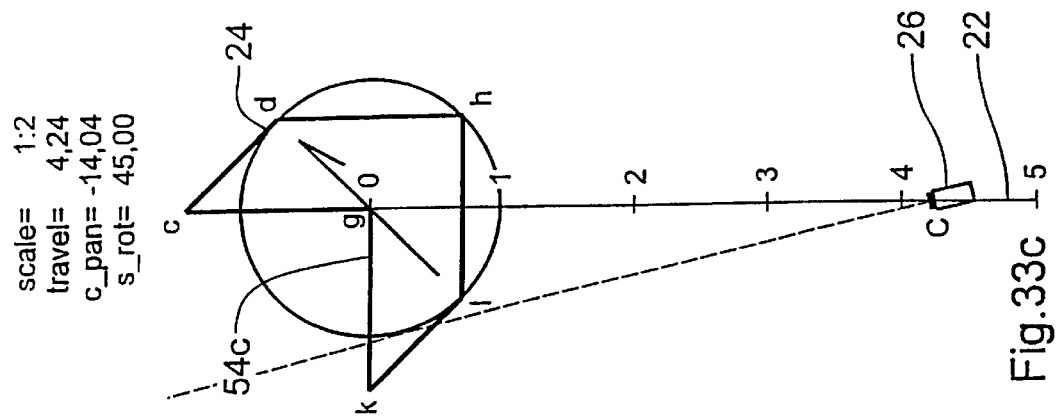
Figure 33B:
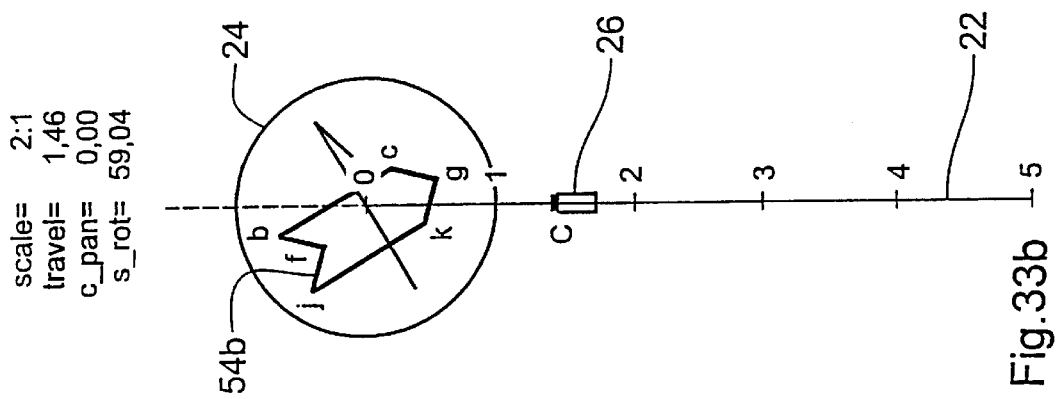
Figure 33A:
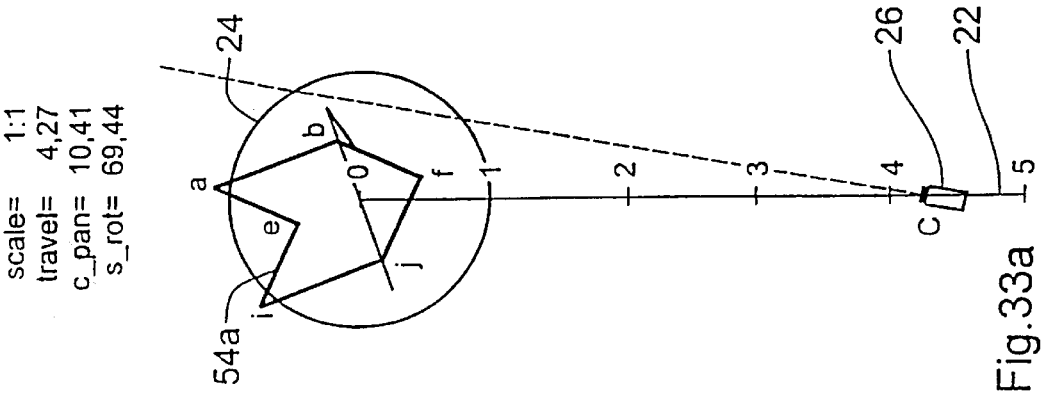
Figure 34:
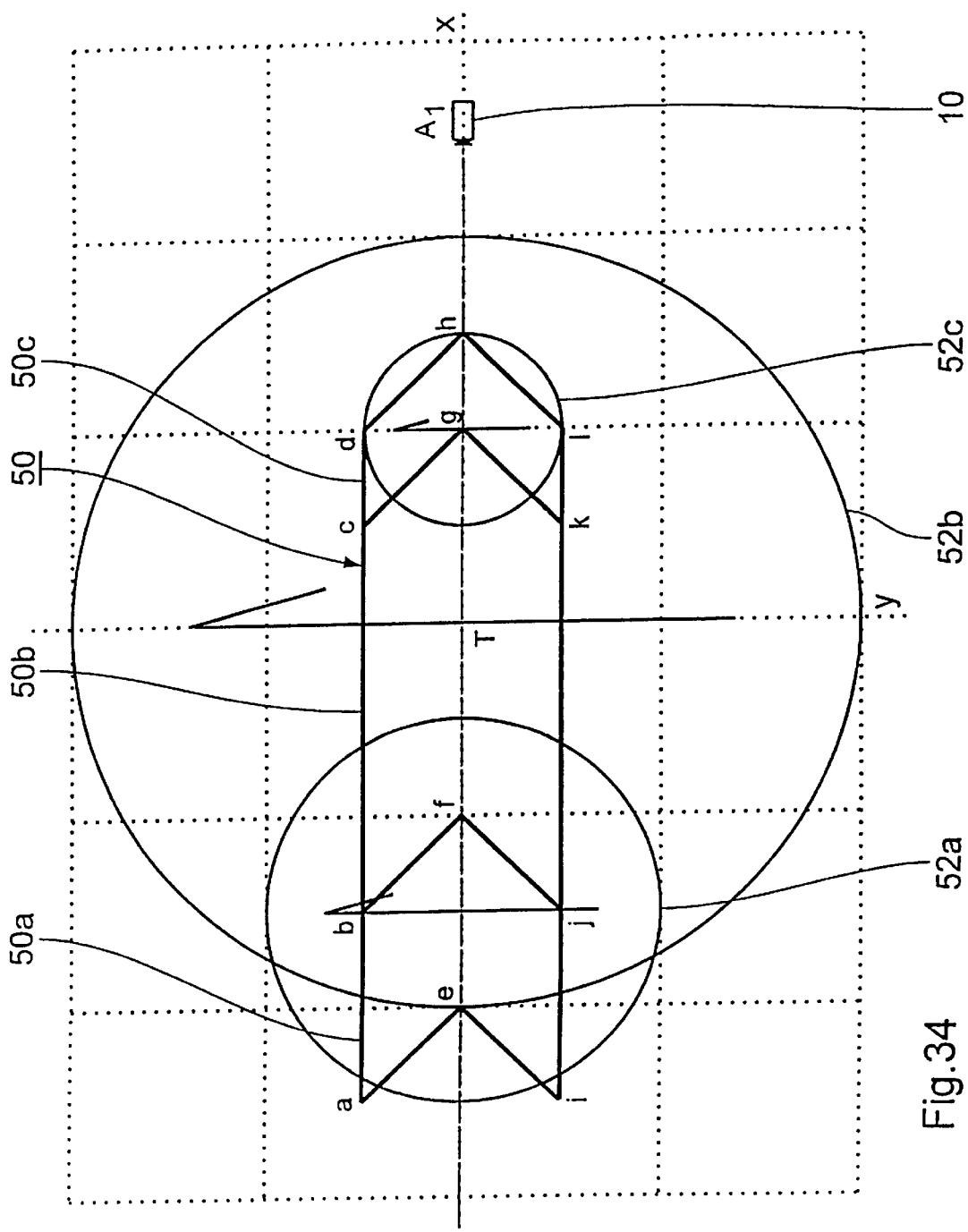
Figure 35:
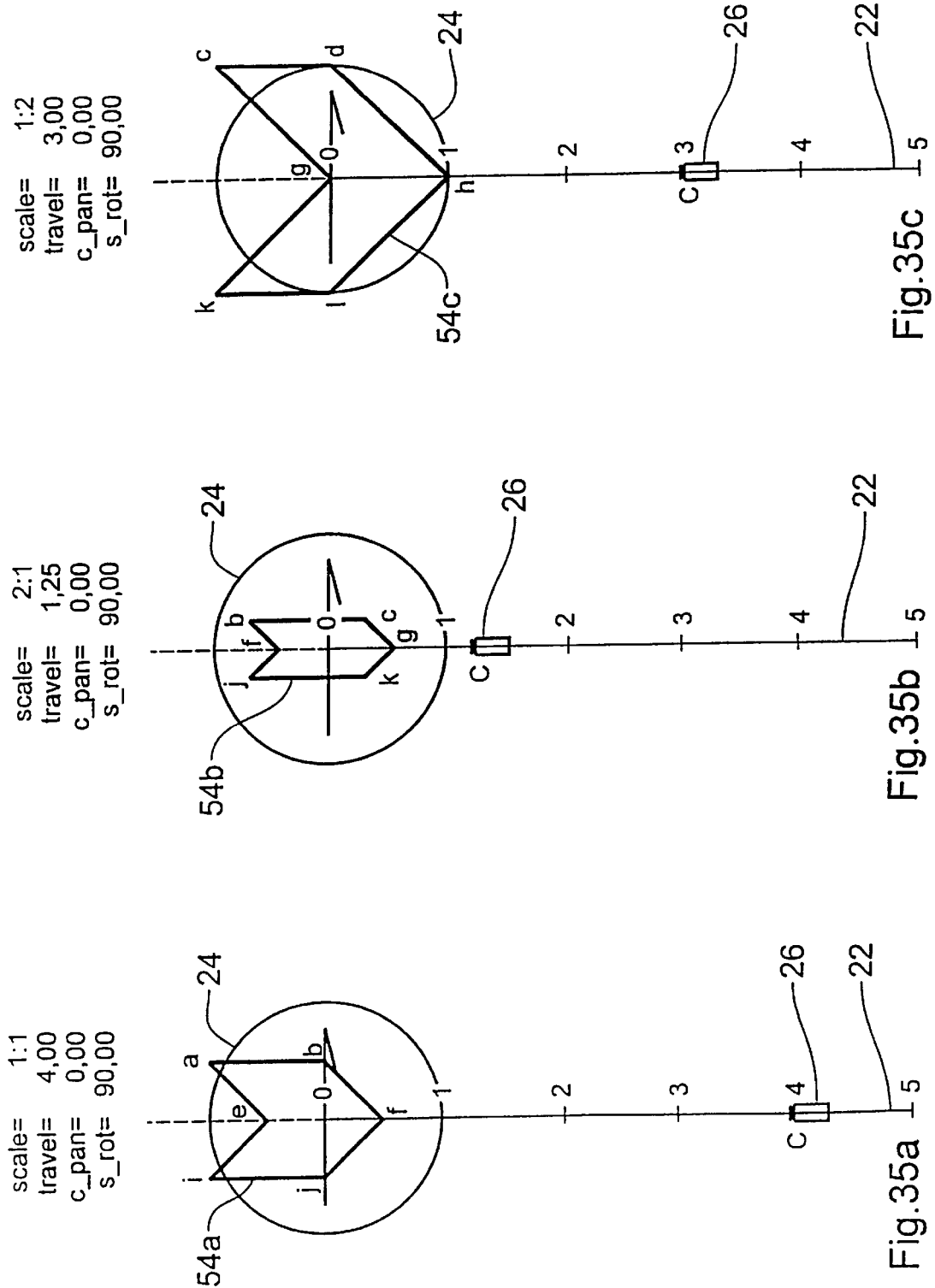
Figure 36:
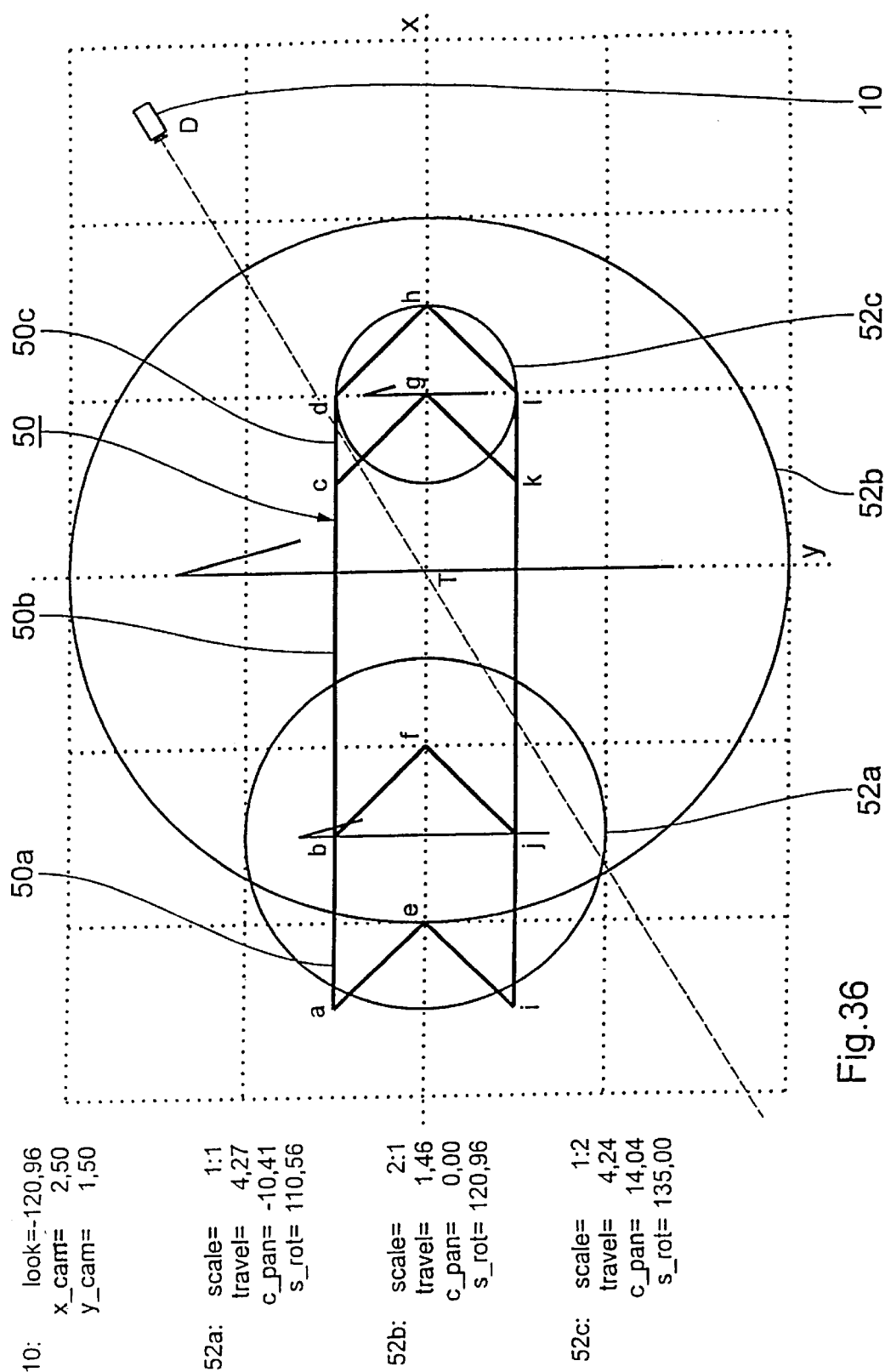
Figure 37C:
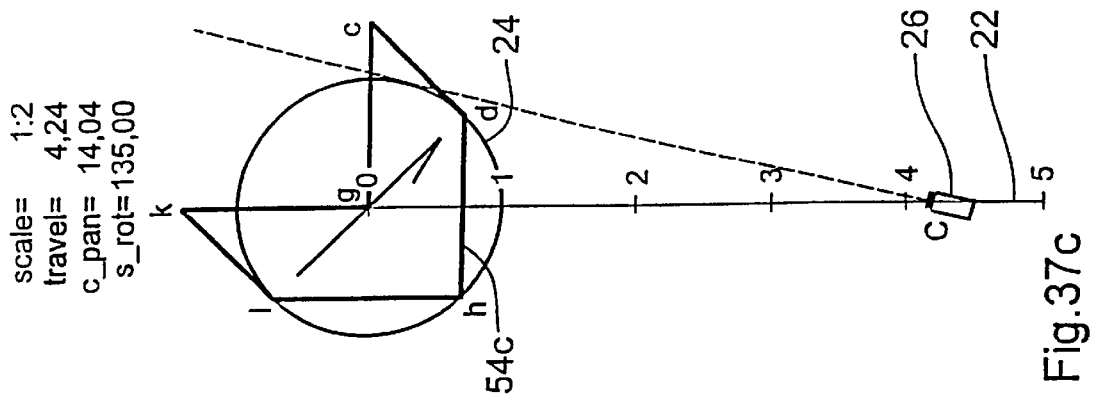
Figure 37B:
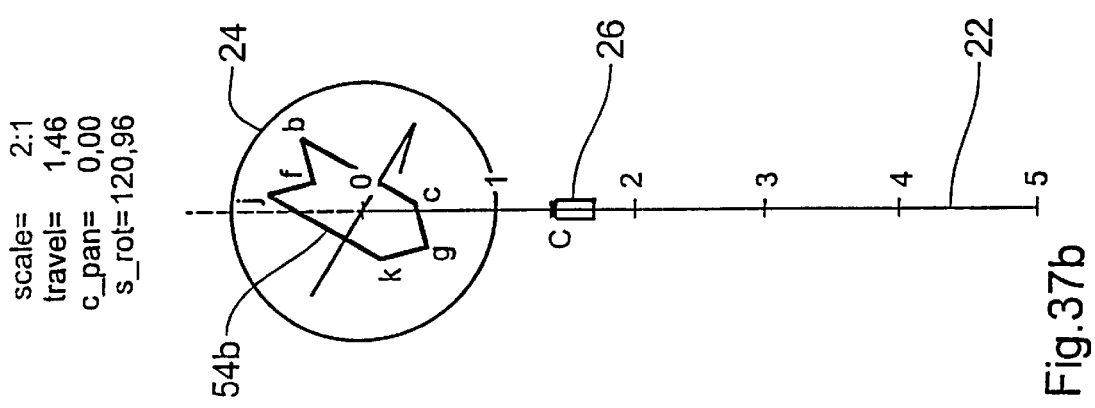
Figure 37A:
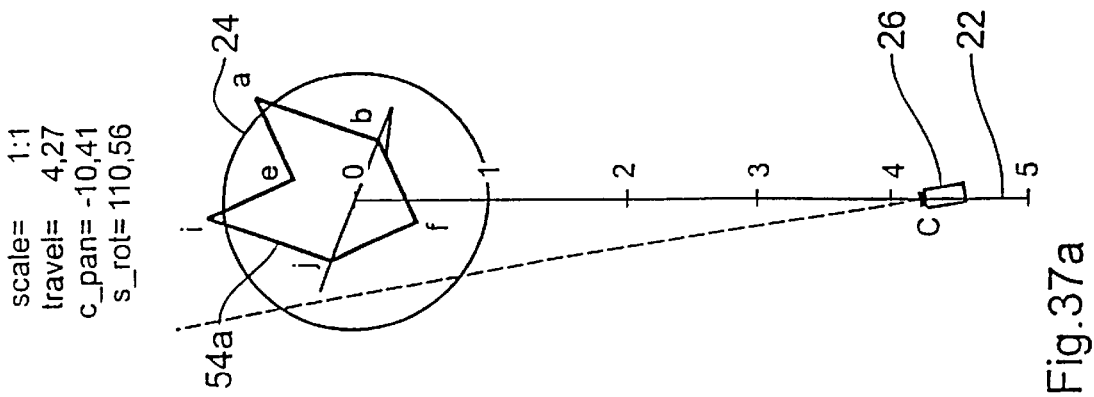
Figure 38:
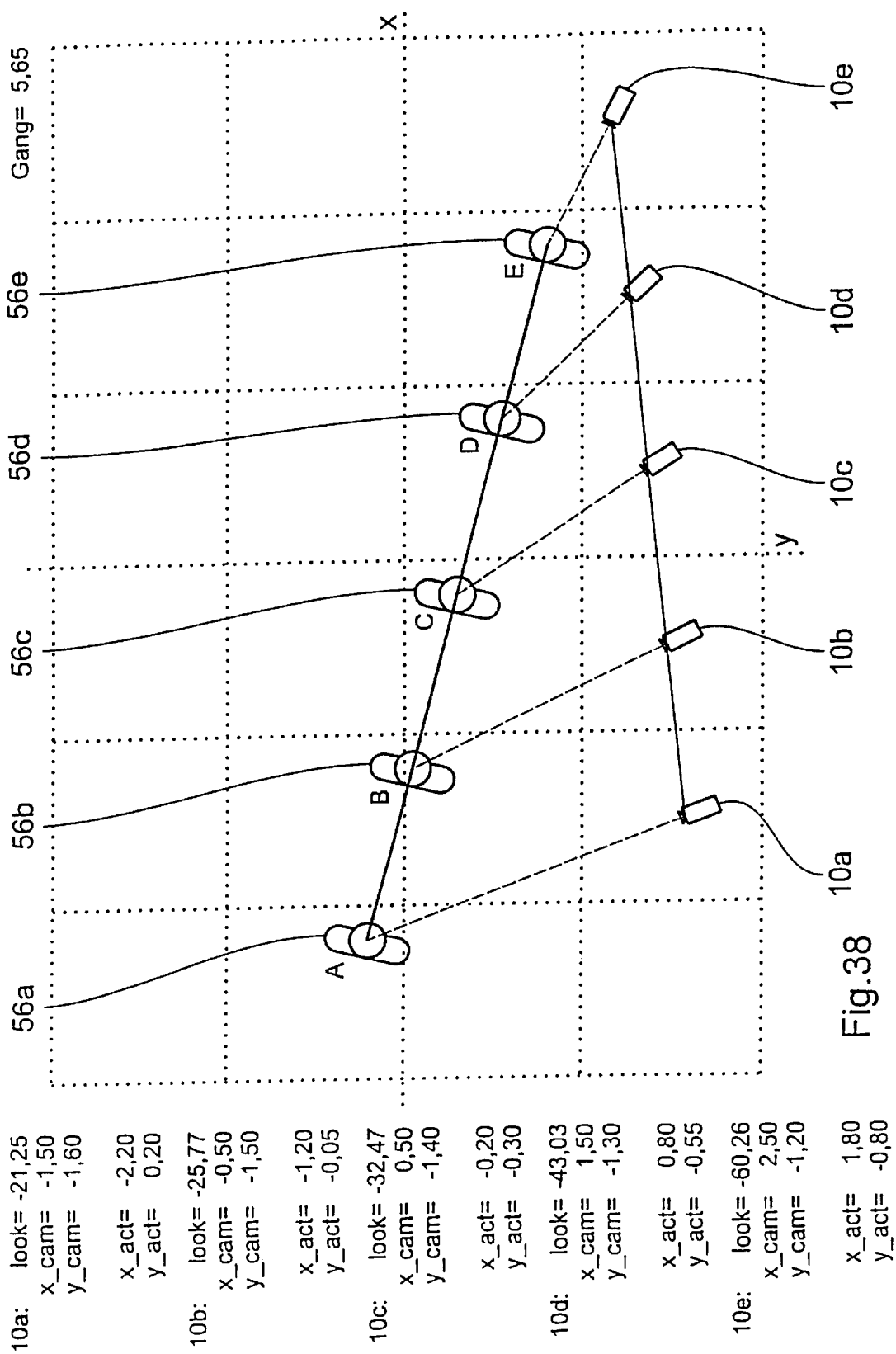
Figure 44:
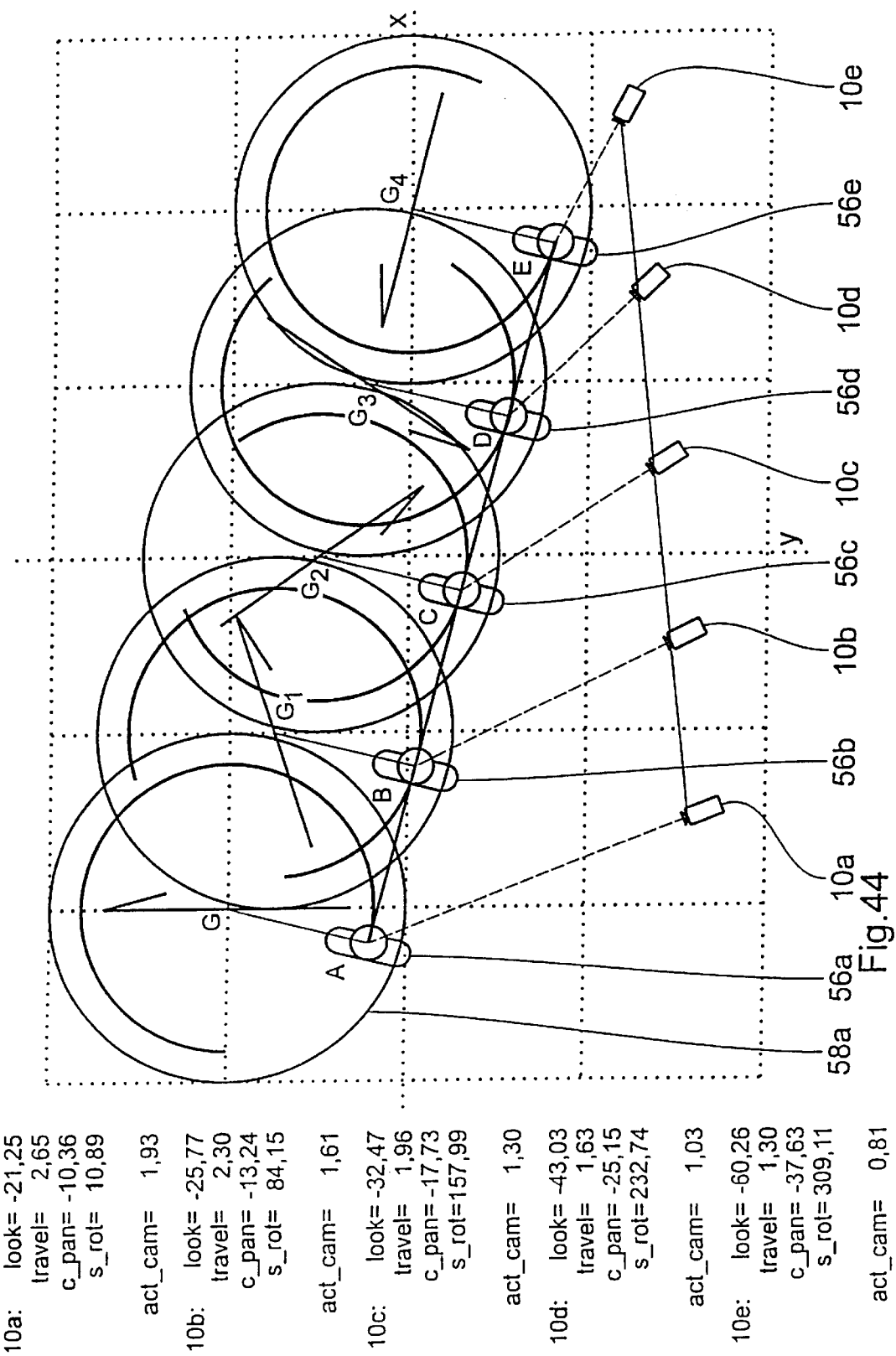
Figure 45:
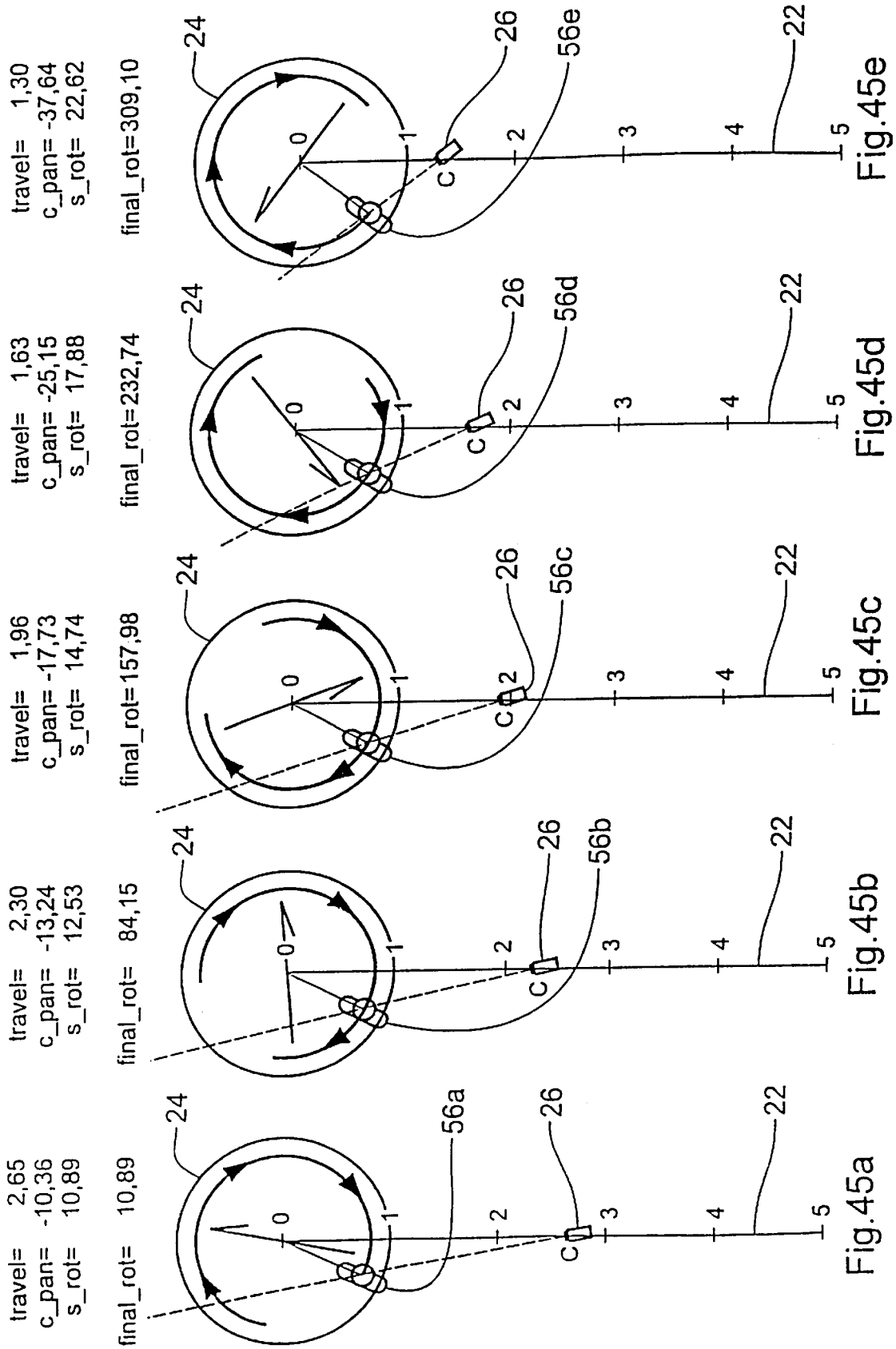
Figure 46:
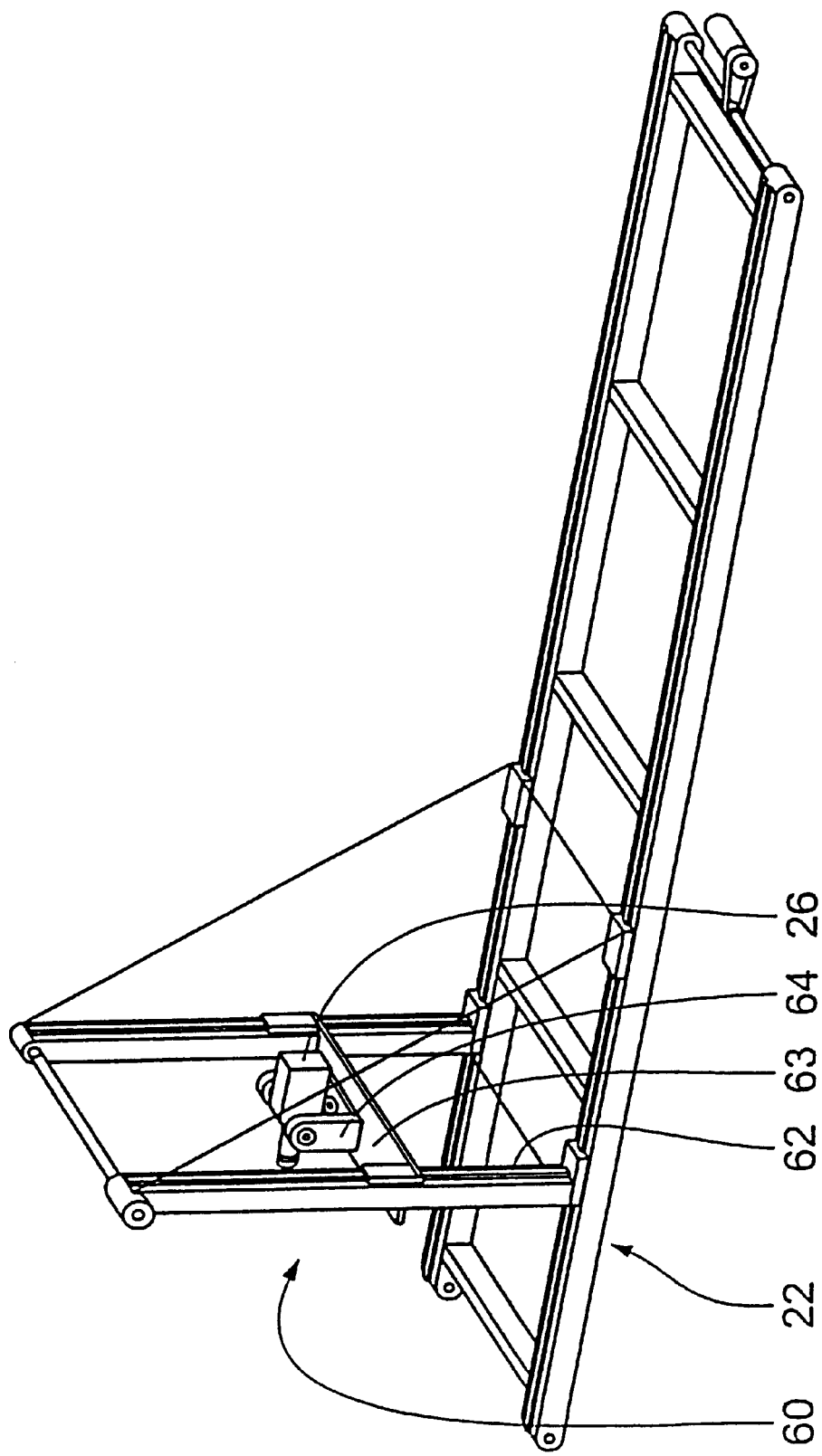
Figure 47:
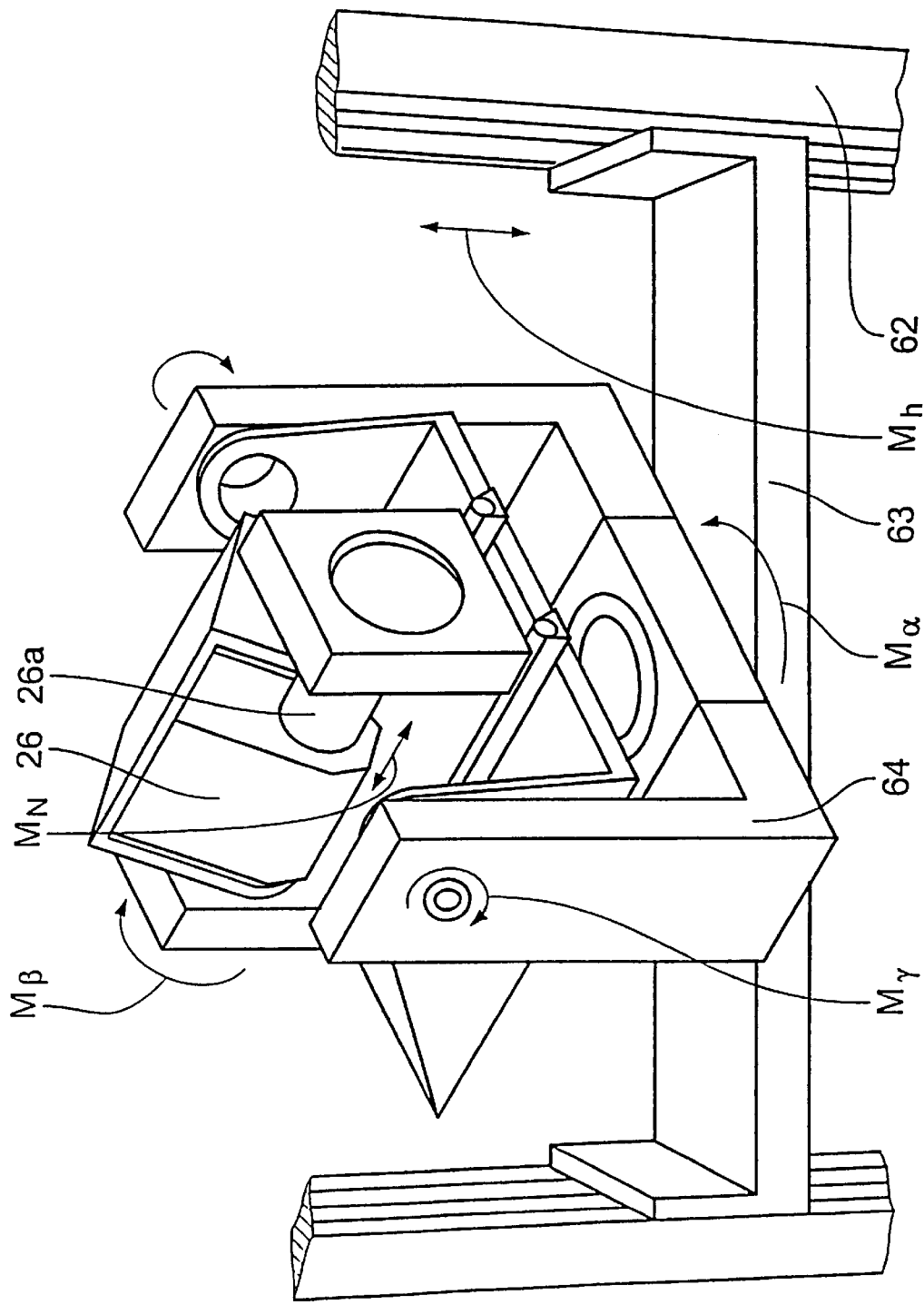
Figure 48:
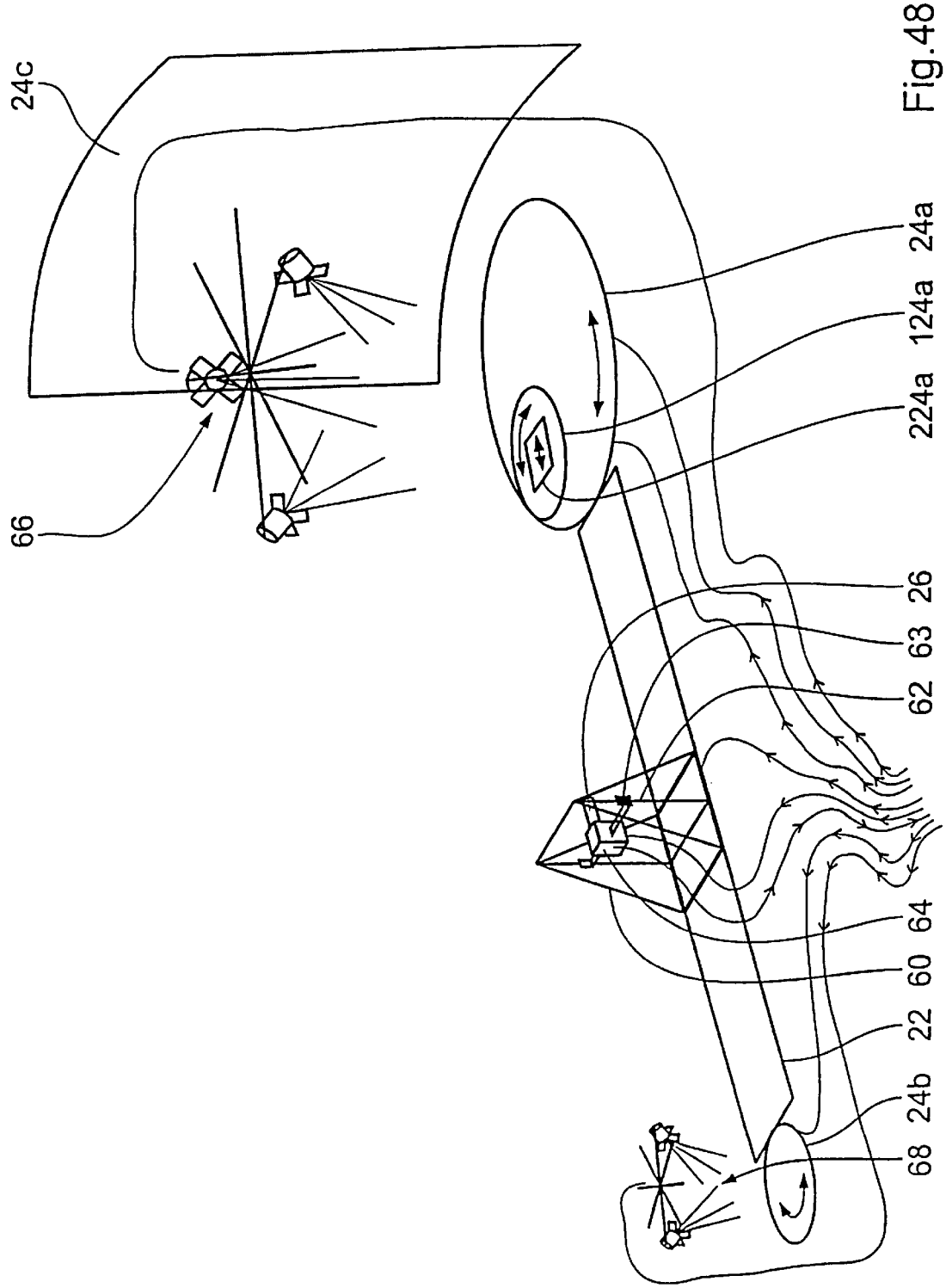
Figure 49:
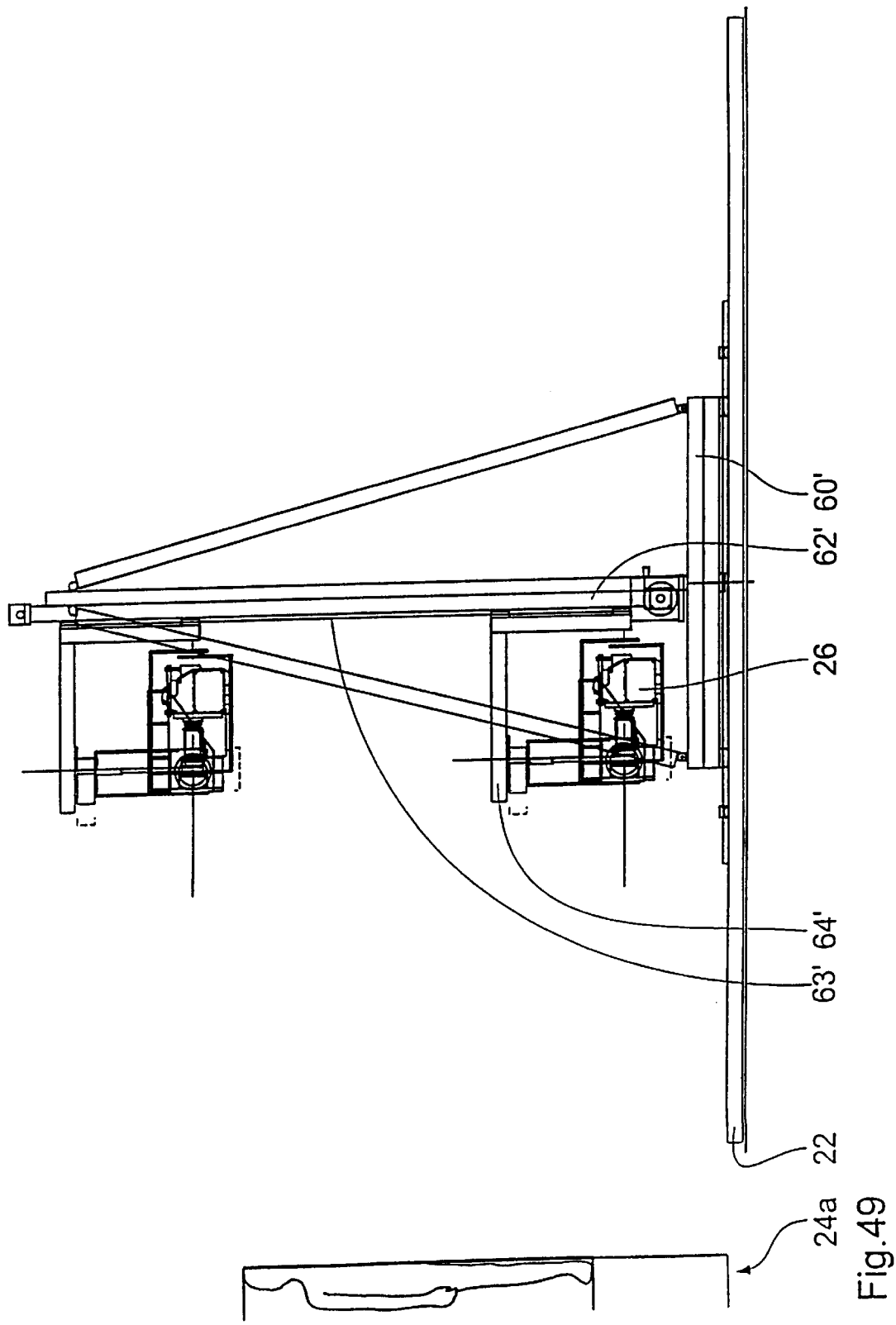
Figure 50:
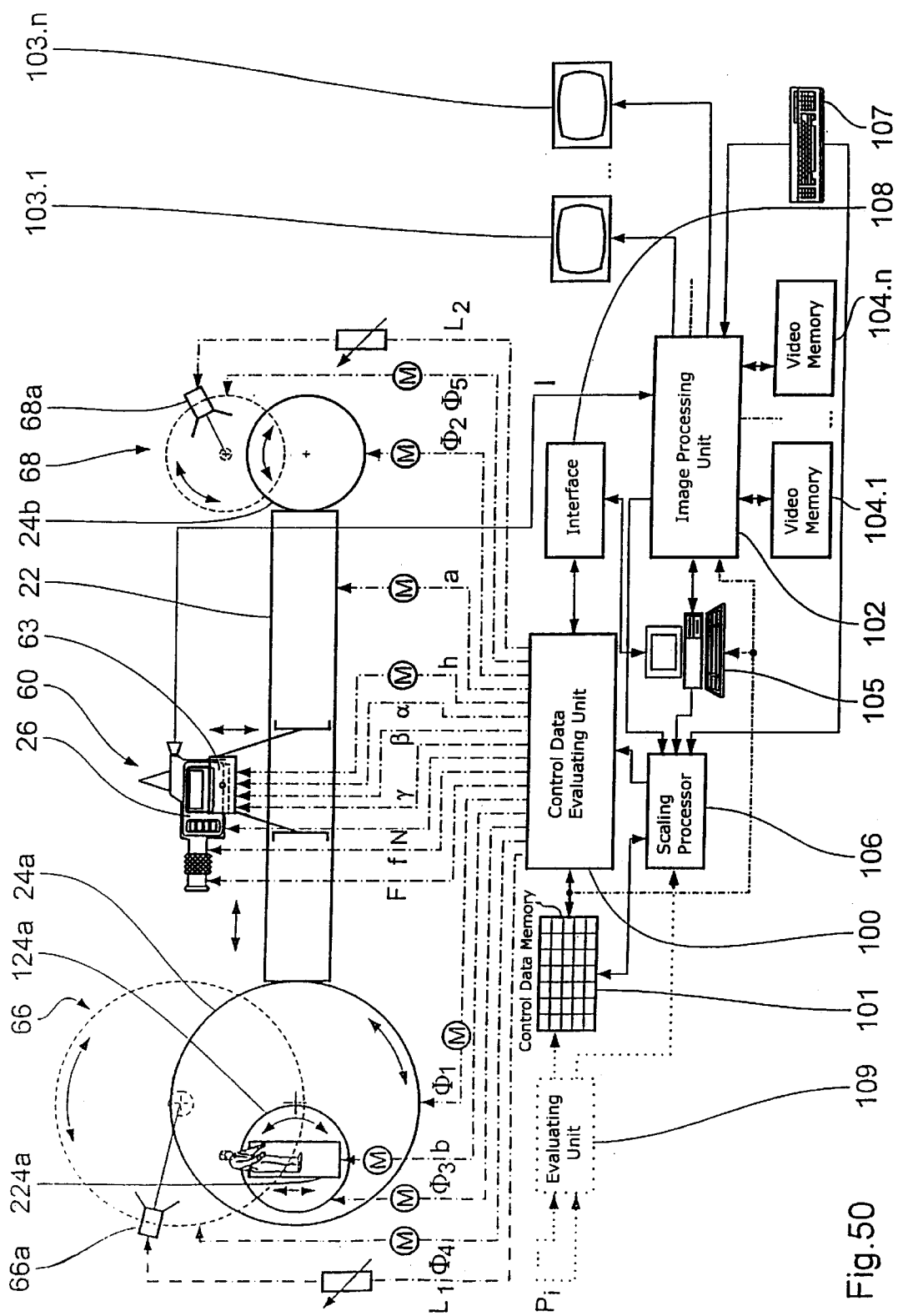

FIGS. 6a to 6e are schematic diagrams representing the spatial and angular relationships between five camera locations and an object according to an embodiment of the invention which provide the same photograph images as represented in FIG. 5, FIG. 7 is a schematic diagram representing the spatial and angular relationships between five camera locations curving around an object for providing photograph images according to conventional photography, FIGS. 8a to 8e are schematic diagrams representing the spatial and angular relationships between five camera locations and an object according to an embodiment of the invention which provide the same photograph images as represented in FIG. 7, FIG. 9 is a schematic diagram representing the spatial and angular relationships between five camera locations encircling an object and the object for providing photograph images according to conventional photography, FIGS. 10a to 10e are schematic diagrams representing the spatial and angular relationships between five camera locations and an object according to an embodiment of the invention which provide the same photograph images as represented in FIG. 9, FIG. 11 is a schematic diagram representing the spatial and angular relationships between a camera location and three objects for providing photograph images according to conventional photography, FIGS. 12a to 12c are schematic diagrams representing the spatial and angular relationships between three camera locations and an object according to the invention which will provide photograph images which, when combined, will form the same photograph image as represented in FIG. 11, FIG. 13 is a schematic diagram representing the spatial and angular relationships between a camera location and three objects for providing photograph images according to conventional photography, FIGS. 14a to 14c are schematic diagrams representing the spatial and angular relationships between three camera locations and an object according to the invention which will provide photograph images which, when combined, will form the same photograph image as represented in FIG. 13, FIG. 15 is a schematic diagram representing the spatial and angular relationships between a camera location and three objects for providing photograph images according to conventional photography, FIGS. 16a to 16c are schematic diagrams representing the spatial and angular relationships between three camera locations and an object according to the invention which will provide photograph images which, when combined, will form the same photograph image as represented in FIG. 15, FIG. 17 is a schematic diagram representing the spatial and angular relationships between a camera location and three sections for providing photograph images according to conventional photography, FIGS. 18, 19 and 20 are each schematic diagrams of a section illustrating the definition of terms describing the spatial and angular relationship between a Section and a camera location, FIGS. 21a to 21c are schematic diagrams representing three different spatial and angular relationships between a camera location and a section according to an embodiment of the invention which will provide photograph images which, when combined, will form the same photograph image as represented in FIG. 17, FIG. 22 is a schematic diagram representing the spatial and angular relationships between a camera location and three sections for providing photograph images according to conventional photography, FIGS. 23a to 23c are schematic diagrams representing three different spatial and angular relationships between a camera location and a section according to an embodiment of the invention which will provide photograph images which, when combined, will form the same photograph image as represented in FIG. 22, FIG. 24 is a schematic diagram representing the spatial and angular relationships between a camera location and three sections for providing photograph images according to conventional photography, FIGS. 25a to 25c are schematic diagrams representing three different spatial and angular relationships between a camera location and a section according to an embodiment of the invention which will provide photograph images which, when combined, will form the same photograph image as represented in FIG. 24, FIG. 26 is a schematic diagram representing the spatial and angular relationships between a camera location and three objects of different sizes for providing photograph images according to conventional photography, FIGS. 27a to 27c are schematic diagrams representing three different spatial and angular relationships between a camera location and an object according to an embodiment of the invention which will provide photograph images which, when combined, will form the same photograph image as represented in FIG. 26, FIG. 28 is a schematic diagram representing the spatial and angular relationships between a camera location and three objects of different sizes for providing photograph images according to conventional photography, FIGS. 29a to 29c are schematic diagrams representing three different spatial and angular relationships between a camera location and an object according to an embodiment of the invention which will provide photograph images which, when combined, will form the same photograph image as represented in FIG. 28, FIG. 30 is a schematic diagram representing the spatial and angular relationships between a camera location and three objects of different sizes for providing photograph images according to conventional photography, FIGS. 31a to 31c are schematic diagrams representing three different spatial and angular relationships between a camera location and an object according to the invention which will provide photograph images which, when combined, will form the same photograph image as represented in FIG. 30, FIG. 32 is a schematic diagram representing the spatial and angular relationships between a camera location and three sections for providing photograph images according to conventional photography, FIGS. 33a to 33c are schematic diagrams representing three different spatial and angular relationships between a camera location and three sections of different sizes according to an embodiment of the invention which will provide photograph images which, when combined, will form the same photograph image as represented in FIG. 32, FIG. 34 is a schematic diagram representing the spatial and angular relationships between a camera location and three sections for providing photograph images according to conventional photography, FIGS. 35a to 35c are schematic diagrams representing three different spatial and angular relationships between a camera location and three sections of different sizes according to an embodiment of the invention which will provide photograph images which, when combined, will form the same photograph image as represented in FIG. 34, FIG. 36 is a schematic diagram representing the spatial and angular relationships between a camera location and three sections for providing photograph images according to conventional photography, FIGS. 37a to 37c are schematic diagrams representing three different spatial and angular relationships between a camera location and three sections of different sizes according to an embodiment of the invention which will provide photograph images which, when combined, will form the same photograph image as represented in FIG. 36, FIG. 38 is a schematic diagram representing the spatial and angular relationships between an actor "walking" along a straight line and a following camera at five different camera-actor spatial relations, FIGS. 39–43 are schematic diagrams representing the actor walking around a circular board which is moving along the straight line AE illustrated in FIG. 38, at each of the locations depicted in FIG. 38, respectively, FIG. 44 is a composite of FIGS. 39–43, FIG. 45 is a schematic diagram representing five different spatial and angular relationships between a camera location and an actor according to an embodiment of the invention which will provide photograph images corresponding to the images which can be taken in the positions represented in FIG. 38, FIG. 46 is an elevated view of a motion control device according to an embodiment of the invention, FIG. 47 is an elevated view of a camera portion or camera mount portion, respectively, of the motion control device according to an embodiment of the invention, FIG. 48 is a schematic (elevated) view of an arrangement according to the invention including two rotating stages and lighting for each stage, FIG. 49 is a side elevated view of a motion control device modified with respect to FIG. 46, and FIG. 50 is a block diagram of an embodiment of the motion control device.

To better understand the invention, it is preferable to make a differentiation between the movement of a camera in space and the picture image resulting from this movement. The actual camera movement (a 3-D movement in reality) will be called a "physical move".

Our experience tells us that a specific picture can be a result of only one specific "physical move", and existing motion control systems are based on this assumption. However, the present invention is based on the observation that a specific picture can be the result of a different and much simpler "physical move" in space, than our experience in reality would suggest. The present invention, the motion simulation control, transforms ("translates") a motion of the camera in the X-Y plane into motion along the Y axis (straight travel forward and backward), camera pan (side to side), and rotation of the photographed object on a rotating stage or turntable.

This is accomplished with the use of three independent "machines" which each perform one of the simplest mechanical motions, i.e. linear movement or rotation. The first machine is a linear track system, which moves the camera back and forth in the Y-direction. The second machine is a camera head or mount, respectively, which pans or rotates the camera about an axis which is perpendicular to the X-Y plane. The third machine is the rotatable stage, which also rotates about an axis which is perpendicular to the X-Y plane. In operation, the object to be photographed is placed on the rotatable stage, and the stage, camera head and linear track system are driven in a coordinated manner so that the movement of these three machines together simulates the conventional movement of a camera relative to an object.

To better understand the invention, it is helpful to establish a related vocabulary. The Cartesian plot in FIG. 1 represents a bird's eye view of a photographing situation according to conventional photography. The center of this plot is the point B.

The camera 10 is located at point C having X and Y coordinates of x_cam=–2.5, y_cam=–1.5. Located in the middle of the plot, centered at point B, is a round board 12 with its center having X and Y coordinates of x_board=0, y_board=0. The board has an arrow pointing in the north direction (i.e., in the direction of the Y axis). The north direction will be used as a reference to describe the values of all the angles of a "physical move". The north direction has the value 0°.

The camera 10 "looks" at target point T, having X and Y coordinates of x_target=–0.5, y_target=1.5. The angle between the north direction and the line between the camera 10 (point C) and point T is called the "camera look" angle 14. In FIG. 1, the "camera look" angle 14 has a value of 33.69° (look=33.69°). The distance between the camera 10 (point C) and the center of the board 12 (point B) is called the "camera travel" distance 16, and has a value of 2.92 graph units (travel=2.92).

The angle between the direction of the arrow and the line between the camera 10 (point C) and the center point of board 12 (point B) is called the "set rotation" angle 18 (s_rot), and has a value of –59.04° (s_rot=–59.04°).

The angular difference between the angle of the "set rotation" and the angle of the "camera look" is called the "camera pan" 20 (c_pan), and has a value of –25.35° (c_pan=–25.35°).

The values of the "camera travel" 16, the "camera pan" 20 and the "set rotation" 18 are collectively called the "conditions", and they describe the spatial and angular relationship between the camera 10 and the board 12 in FIG. 1.

FIG. 2 is a schematic of the same photographic image represented in FIG. 1, but generated by the motion simulation control of the invention. As shown in FIG. 2, the motion simulation control includes a linear track 22, represented by a straight numbered line, and a round rotating stage 24 represented by a round circle. As can be seen from FIG. 2, the rotating stage 24 depicts the same arrow illustrated in FIG. 1. The center of the rotating stage is the reference for the camera position and has a value of 0 on the track 22. The motion simulation control also has a camera 26, which moves along the linear track 22 and which pivots or rotates in the same plane as the rotating stage 24.

Comparing FIG. 2 with FIG. 1, we see that all of the "conditions" established in FIG. 1 are realized in FIG. 2 by the motion simulation control's arrangement between the camera 26 and the rotating stage 24. In FIG. 2, the camera 26 has the same distance from the center of the rotating stage 24 (i.e., travel=2.92) as the camera 10 in FIG. 1 from the center of the board 12. Also, in FIG. 2 the camera 26 pans to the left from the center of the rotating stage 24 at the same angle (c_pan=25.35) as the camera in FIG. 1 pans to the left from the center of the board 12. Likewise, the rotating stage 24 in FIG. 2 rotates to the same angular position relative to the camera 26 as the board 12 in FIG. 1 (s_rot=–59.04°). The angle of this rotation in FIG. 2 is indicated by the arrow 18 on the rotating stage 24.

In FIG. 3, we see a camera 10a corresponding to camera 10 in FIG. 1, and a second camera 10b (point D) which has a different location in the Cartesian plot as camera 10a, but which "looks" at the same point in space (point T). New "conditions" are established for camera 10b in FIG. 3.

FIGS. 4a and 4b illustrate the positions of the camera 26 relative to the stage 24 according to the invention, in order to "simulate" the camera positions of FIG. 3. From FIG. 4a, we can see that the camera 26 and rotating stage 24 of the invention are rotated to provide an arrangement between the camera 26 and the rotating stage 24 which fulfills all of the "conditions" for camera 10a established in FIG. 2. Similarly, as shown in FIG. 4b, the camera 26 and the rotating stage 24 of the invention can be rotated to provide an arrangement between the camera 26 and 25 the rotating stage 24 which fulfills all of the "conditions" for camera 10b established in FIG. 3. In this example, it is not necessary to move the camera along the linear track 22, because the "travel" distance, i.e., the distance from the camera at points C and D to the center B of the board 12 in FIG. 3, is the same for both camera locations.

From analyzing FIGS. 1–4, the conclusion can be drawn that if the motion simulation control can fulfill all of the conditions of conventional photography for camera 10a and camera 10b, the cameras being located in two different points of the X-Y plane (at point C and point D), then the motion simulation control system can fulfill the conditions of any camera located on any point on the X-Y plane used by conventional photography.

Based on this assumption, it will next be discussed what happens when a camera travels in the X-Y plane. FIG. 5, depicts a physical move of a camera 10 along a straight line according to conventional photography, where the camera 10 travels from point C to point D. As it travels, the camera 10 turns to always observe the same point T. The 5 represented camera locations, 10a, 10b, 10c, 10d, and 10e show 5 phases of the "camera motion". In the drawing, the conditions for these 5 phases are established. The distance of the camera travel is 5 graph units (distance=5.0).

FIGS. 6a–6e depict how the motion simulation control "translates" the straight travel and the camera-to-object relationship illustrated in FIG. 5 into a different kind of motion or relation, respectively. As can be seen in FIGS. 6a–6e, for each position of the camera 10 shown in FIG. 5, the motion simulation control provides an alternate camera position relative to the stage 24 which creates the same photographic image. For example, FIG. 6a illustrates how the camera 26 and the stage 24 can be rotated to provide the same conditions as the camera location 10a in FIG. 5. To provide the same conditions as the camera location 10b in FIG. 5, the camera 26 embodying the invention is moved closer to the stage 24, and both the camera 26 and the stage 24 are rotated accordingly. A similar procedure is performed to recreate the conditions for the camera locations 10c–10e, as are illustrated in FIGS. 6c–6e.

From this, it will be understood that if the motion simulation control can fulfill the conditions established in FIG. 5 for each of the five camera positions which represent five phases of the travel, then it can fulfill the conditions for all other phases of the travel. The conclusion that can be reached is that the camera 26, moved by the motion simulation control, observes the rotating stage 24 in the same way as the camera 10 observes the board 12.

Observing FIG. 5 and FIGS. 6a–6e, we can see the basic difference between the two kinds of motion, the original "physical motion" ("PM distance") and the motion effected or translated by the motion simulation control. The travel of the camera 10 shown in FIG. 5 occurs on the X axis. The travel executed by the motion simulation control, however, occurs only on the Y axis, along the linear track 22, as shown in FIGS. 6a–6e. One advantage of using the motion simulation control in this example is that the total travel of the camera 26 on the Y axis shown in FIGS. 6a–6e (MCS distance=2.82 graph units), executed in a forward and backward direction, is much shorter than the travel on the X axis executed continuously in one direction by the camera in FIG. 5 (PM distance=5.0 graphs units). The entire range of movement in the Y-axis direction (i.e., the travel maximum value minus the travel minimum value will be called the "weg". In FIG. 6a–6e, the weg value is 1.42 (i.e., position at 10a or 10e minus position at 10c, 2.92−1.5). FIGS. 6a–6e show that the motion on the X axis is completely eliminated. The difference between travel on the Y axis (MCS distance) and travel on the X axis (PM distance) shows that the camera moved by the motion simulation control travels much slower than the camera had to be moved during the original travel. This decrease in the speed of the camera travel is very important for the quality of the photographed motion, producing less jitter.

FIG. 7 depicts five locations 10a' to 10e' of a camera in reality, as the camera makes a motion on a curved path about point T. The various conditions of each camera location can be seen from FIG. 7. In FIG. 7, the travel distance is 5.55 graph units.

FIGS. 8a to 8e illustrate how the same motion is translated by the motion simulation control according to an embodiment of the invention. FIGS. 8a–8e depict five different locations of the camera 26 of the motion simulation control, each Figure corresponding to a position shown in FIG. 7. Each of the camera 26 positions shown in FIGS. 8a–8e, along with the relative rotation angles of the camera 26 and the stage 24, provide the same set of conditions for its corresponding camera position in FIG. 7. Accordingly, it will be understood that the camera positions illustrated in FIGS. 8a–Se will provide the same photographic images as the camera positions illustrated in FIG. 7. In analyzing these two drawings, the conclusion is reached that the motion simulation control "translates" a curved camera motion in the X-Y plane to a linear, one dimensional camera movement along the Y axis. FIGS. 8a–8e demonstrate (as in FIGS. 6a to 6e) that camera motion along the X axis is completely eliminated by the motion simulation control.

FIG. 9 depicts five locations 10a" to 10e" of a camera representing the points of a circular motion around a board 12 (where travel distance=9.77 graph units). The camera is "looking" at target point T, (x_target=−0.5, y_target=0.5). As with the previously discussed examples, all conditions for each camera location depicted in FIG. 9 can be fulfilled by the motion simulation control's arrangement between the camera 26 and the rotating stage 24, as is shown in FIGS. 10a to 10e. It is interesting to note that in this example, the "MCS distance"=0. This means that the camera 26 of the invention does not travel at all, but instead simply rotates about its axis.

Building upon the basic principles of the invention discussed above, the operation of the invention wail now be discussed in more detail. In conventional photography, the camera moves and photographs the static "world". All physical work necessary to travel over a distance and to change the angles of the "look" are solely performed by the camera. The static "world" photographed by the camera does not have a clear reference. It exists with an infinite amount of visual elements. This complexity and lack of a reference in the photographed "world" causes problems in the production of multicomposite images as well as in the construction of computer generated images.

The present invention is based on the idea that the camera performs only part of a motion in space and can photograph only part of the "world" (i.e. that part which exists on the rotating stage). This part of the "world", through its own rotation, participates in the execution of a motion along with the camera. The "world" is not static and its infinite amount of visual elements to be photographed are limited to the visual elements existing on the rotating stage. The motion simulation control synthesizes a new motion in space between the camera and a chosen point in the "world". About this point, the (limited) real world rotates. The center of this rotation becomes a clear reference for the motion, the location of the photographed objects and the composition of the image.

Referring back to FIG. 9, the depicted camera 10 moves in a circular motion around the board 12 and remains the same distance from the center of the board 12 as it travels. The travel executed by the motion simulation control represents the change in the distance between the center of the board 12 and the camera 10. This is the reason why the camera 26 of the invention represented in FIGS. 10a–10e does not travel at all. The entire distance of the camera's travel in FIG. 9 (PM distance=9.77) is translated into by the rotation of the stage 24 and camera 26 in FIGS. 10a–10e.

The different relationships between the three movements described as conditions can be produced by forward and backward travel of the camera, camera pan and rotation of the stage, which can imitate any two-dimensional camera notion in space. The results are correct images of a chosen part of the "world" which exists on the rotating stage. The forward and backward travel of the camera, camera pan and rotation of the stage form the three basic channels of the motion simulation control. The synchronized work of these three channels form a virtual "vehicle" which can execute any motion in space. The motion of the vehicle depends on the varying percentages of work performed by these three channels.

The operation of the motion simulation control will now be explained in greater detail with reference to FIGS. 11–25. Here it can be seen that the whole image of the "world" can be built from separate images of the parts existing on different boards.

FIGS. 11, 13, and 15 schematically show the same linear travel of camera 10 which was described in FIG. 5. To simplify the description, however, only three phases of the camera motion are shown (at points C, Ca', and D). In these Figures there are three boards (12a, 12b, and 12c) located in different places on the X-Y plane. In each of FIGS. 11, 13, and 15, conditions are established between the camera 10, the boards 12a, 12b and 12c, and the target point T for each camera location.

FIGS. 12a–12c, 14a–14c and 16a–16C illustrate how the motion simulation control, through different arrangements between the camera and the rotating stage, can fulfill all of the conditions established in FIGS. 11, 13 and 15. For example, FIGS. 12a–12c depict three different angular and spatial relationships between the rotating stage 24 and the camera 26. The first relationship, depicted in FIG. 12a, recreates the conditions between the camera 10 and the board 12a shown in FIG. 11. Similarly, the relationship shown in FIG. 12b represents the same conditions that exist between the camera 10 and the board 12b in FIG. 11. Finally, the relationship depicted in FIG. 12c corresponds with the relationship between the camera 10 and the board 12c in FIG. 11.

In a similar fashion, the three different camera-stage relationships shown in FIGS. 14a–14c correspond to the relationships between the camera 10 and each of the three boards, labeled 12a, 12b, and 12c depicted in FIG. 13. Additionally, the three different camera-stage relationships shown in FIGS. 16a–16c correspond to the relationships between the camera 10 and each of the three boards 12a, 12b, and 12c depicted in FIG. 15. From these examples, it will again be understood that by means of the invention one can recreate the photographic image of each of three objects by simply rotating the camera 26 and stage 24 and by moving the camera 26 relative to the stage 24 along a linear track 22.

Up until now, the examples of the invention discussed have only been made with reference to a board with a two-dimensional arrow. However, as will now be explained, the present invention can also be used with two- or three-dimensional objects.

FIG. 17 illustrates a long arrow-like object 28 (with points a, d, h, l, i, e) built from three smaller Sections 28a, 28b, and 28c (formed of points a, b, f, j, i, e, points b, c, g k j, and f, and points c, d, h, l, k, and g, respectively). Each Section rests on a different circular board 30a, 30b, and 30c, respectively, and each of the boards includes an arrow pointing in the north direction (i.e., the Y-axis direction).

FIGS. 18, 19 and 20 depict the section conditions which can be used to mathematically describe the spatial and angular relationships between the camera and every corner of each section. These drawings explain the mathematical vocabulary used for section conditions (based on the "corner b"). For example, FIG. 18 illustrates the corner-to-board distance (cor_board_dist) 32 between the center of the board (x_board, y_board) and corner b of the object (x_cor, y_cor), and the corner-board angle (cor-board-angle) 34 between the direction of the arrow and a line running from the center of the board 30b to the corner b of the object.

FIG. 19 illustrates the camera pan (c_pan) 36, i.e., the angle between a line running from the center of the board 30b to the camera 10 and a line running in the direction that the camera 10 is pointing (i.e., toward the target point T). FIG. 19 also shows the corner-to-camera distance (cor_cam_distance) 38 between the camera 10 and the corner b, and the corner angle (cor_angle) 40 between a line running from the corner b to the camera 10 and a line running in the direction that the camera 10 is pointing. Further, FIG. 19 illustrates the set rotation (s_rot) 42, i.e., the angle between the direction that the camera 10 is pointing and the direction of the arrow.

Lastly, FIG. 20 shows how each of the section conditions has an equivalent when section 28b is placed on the rotating stage 24 of the invention. The same vocabulary depicted in FIGS. 17–19 will be used later for the discussion of "scale section conditions".

As noted before, FIG. 17 shows how three sections, 28a, 28b, and 28c rest on three circular boards, 30a, 30b, and 30c to present a conventional photographic image to camera 10 when camera 10 is located at point C. In FIGS. 21a, 21b, and 21c, individual sections 28a, 28b, and 28c are illustrated resting on the rotating stage 24 of the invention in the identical position, relative to the camera 26, as these sections on the boards 30a, 30b, and 30c do in FIG. 17, respectively. FIG. 22 shows the relationship between the sections 28a, 28b, and 28c when camera 10 is in a different location, at point Ca', relative to these sections. Again, FIGS. 23a, 23b, and 23c illustrate that, when the sections are placed on the rotating stage 24 of the invention, and the stage 24 and camera 26 are rotated and distanced appropriately, the sections are in the identical position, relative to the camera 26, as the sections depicted in FIG. 22. FIG. 24 illustrates the relationships between the sections on the boards 30a, 30b, and 30c and the camera 10 when the camera 10 is in yet a third location at point D. FIGS. 25a, 25b, and 25c illustrate how these relationships can be created by placing the sections on the rotating stage 24 of the invention, and then rotating the camera 26 and the stage 24, and moving the camera 26 relative to the stage 24.

The reference for the location of every section in FIGS. 17, 22, and 24 is the center of every board and the north direction, which is indicated by the arrow on every board. As noted before, FIGS. 21a, 21b, and 21c depict three separate relationships between the camera 26 and a section as shown in FIG. 17. The first relationship depicted in FIG. 21a, simulates the conditions between the camera 10 and section 28a shown in FIG. 17. Likewise, the relationship shown in FIG. 21b, simulates the conditions between the camera 10 and section 28b shown in FIG. 17. Finally, the third relationship shown in FIG. 21c, represents the conditions between the camera 10 and section 28c shown in FIG. 17. From FIGS. 21a–c, 23a–c and 25a–c, it can be seen that the motion simulation control simultaneous positioning arrangement between the camera 26 and the rotating stage 24, can fulfill all of the section conditions depicted in FIGS. 17, 22 and 24 for three-dimensional objects. (It will be understood that, since both the object and the camera view have height, the camera photographs the move in three dimensions.)

It will be easily understood that if each section on the rotating stage is photographed separately, the three resulting separate images of the sections can be superimposed, or combined, onto each other to produce a final image. If the three separate images produced by the relationships shown in FIGS. 21a, 21b, and 21c are superimposed on each other, then the resulting final image will be identical to the image depicted in FIG. 17. Likewise, if the three separate relationships depicted in FIGS. 23a, 23b, and 23c are used to produce three separate images, and these three separate images are combined to produce a final image, that final image will be identical to the image described in FIG. 22. Lastly, if the three separate relationships shown in FIGS. 25a, 25b, and 25c are used to produce three separate images, and these three images are superimposed onto each other, the final image produced will be identical to the image resulting from the relationship depicted in FIG. 24. This demonstrates that separate images of separate sections can be superimposed, combined, to form an image of the larger object.

Since three separate images of the sections representing different locations on the X-Y plane (different parts of the "world") can be connected in one cohesive image of an object, then several conclusions can be drawn.

First, the whole image of the "world" can be built by superimposing, or combining separate images of the small parts of the "world", which exist on rotating stages. Second, the chosen parts of the "world" can be located in any area of the X-Y plane. There is no limit to the amount of such chosen parts whose images can be superimposed onto each other. Third, an image of an object, which rests on the rotating stage, is visually connected (synchronized) with a superimposed image of another object resting on the surface of a different rotating stage. Fourth, the dimension of the surface of the rotating stage theoretically has no limit. In FIGS. 17, 22, and 24, the corners of the sections on the boards 30a and 30b extend outside the perimeter of the boards. In FIGS. 21a, 21b, 23a, 23b, 25a, and 25b, we see that even though the corners of the sections extend outside the perimeter of the rotating stage, all the section conditions are still fulfilled. The dimensions of the surface of the rotating stage are only dictated by the dimensions of the film studio.

Finally, the construction of existing motion control systems is based on the assumption that all components of a picture are photographed with the same repetitive motions (scaled up or scaled down depending on the scale of the components) and that the camera has to execute a physical move to attain these motions. The construction of the present invention is based on a different assumption. All components of the picture are photographed with different motions, i.e., a desired combined image sequence is divided into separate image sequences (components) for filming using the present invention. The result is an image identical to that taken during a conventional physical move, but the conventional motion is never really executed in space by the camera.

The biggest problem in the production of multi-composite images is the problem of scale. When different components of an image have different scales (size), it is very difficult to make them "fit". This problem is caused by two major factors.

The first is that the physical move of the camera has to be scaled up or scaled down depending on the scales of the components. The scaling up or down of a non-linear physical move creates different physical conditions (wherein different values of kinetic energy are of importance) for the motors and the construction of the motion control system. The results are different image "jitters" for the different components. The second factor is the lack of clear reference for the location in space of the photographed components (i.e., where to place an object in relationship to the camera).

The present invention solves these problems. During a conventional physical move, the jitter of a picture appears when the camera is changing its X-Y-Z position in space in a non-linear manner, since jitter in camera takes is mainly caused by centrifugal forces. Jitter does not exist (or is so minute that it is not detectable in the picture) when a physical move is purely linear in nature. Because the motion simulation control transforms a non-linear movement to linear movement, the jitter problem is solved (assuming that the tracks used in the motion simulation control are nearly or perfectly straight).

The full solution to the problems caused by scale can be seen from considering FIGS. 26, 28 and 30. These Figures depict three phases of straight travel for camera 10. The camera travels from point A (having coordinates x_cam=2.5, y_cam=−1.5 in FIG. 26) to point A1 (having coordinates x_cam=2.5, y_cam=0 in FIG. 28) to point D (having coordinates x_cam=2.5, y_cam=1.5 in FIG. 30) and observes target point T, which is located in the center of the Cartesian plot. In these Figures, there are three boards of different sizes, 44, 46, and 48, representing three different scales. Each of these boards has an arrow pointing in the north direction, which will be used as a reference again.

The reference for the scale is the radius of the board. In the discussed examples, when the radius of the rotating stage 24 of the invention is 1 graph unit, the radius of the board, in scale 1:1, has the value of 1 graph unit (RADIUS=1.0), in scale 2:1, has the value of 2 graph units (RADIUS=2.0) and in scale 1:2, has the value of 0.5 graph unit (RADIUS=0.5). The different scales of the boards only effect the camera's travel according to the following formula: "scaled travel"= travel * RADIUS. In other words, and as can be seen from FIG. 26, the actual or "scaled travel" shown in FIG. 26 is converted to travel for the invention by dividing the "scaled travel" by the radius. Applying this formula to the conditions shown in FIGS. 26, 28 and 30, "scale conditions" can be established for every phase of the camera 10 movement relative to each of the three boards.

For example, FIGS. 27a–27c show three relationships between the camera 26 and the rotating stage 24 according to the invention. The relationship in FIG. 27a will produce the same image as the scale conditions created by the relationship between the camera 10 and board 44 in FIG. 26. That is, the travel between the camera 26 and the stage 24 in FIG. 27a will produce the same scale as the scaled travel between the camera 10 and board 44 in FIG. 26.

Similarly, the relationship depicted in FIG. 27c will produce the same image as the scale conditions between the camera 10 and board 46 depicted in FIG. 26. Likewise, the relationship depicted in FIG. 27c will produce the same image as the scale conditions between the camera 10 and board 48 in FIG. 26.

In a similar fashion, the relationships depicted in FIGS. 29a–29c correspond to the scale conditions depicted in FIG.

28, while the relationships shown in FIGS. 32a–31c will produce the same images for each individual board as the scale conditions depicted in FIG. 30. From FIGS. 27a–27c, 29a–29c, and 31a–31c, it can be seen that by arranging the camera 26 and the rotating stage 24, the motion simulation control can fulfill all of the scale conditions established from FIGS. 26, 28 and 30.

The scaling feature of the present invention can be applied to three-dimensional objects as well. In FIGS. 32, 34 and 36, is shown a long arrow-like object 50, which is built from three smaller sections 50a, 50b, and 50c. Every section rests on a different board, 52a, 52b, or 52c. It is important to note that FIGS. 32, 34 and 36 show the desired visual result: one object composed from three sections representing different scales. The dimension of every section can be established by its relationship to the radius of every board. In FIG. 32, 34 and 36 are established additional scale section conditions which describe the relationship between the camera and each corner of every section.

In FIGS. 33a–33c, 35a–35c, and 37a–37c, individual sections 54a, 54b, and 54c are illustrated corresponding to sections 50a, 50b, and 50c, respectively, resting on the rotating stage 24 in the identical position relative to the camera 26 as the sections in FIGS. 32, 34 and 36. The reference for the location of every section is the center of the rotating stage 24 and the direction of the arrow on the stage 24. The reference for the dimension of every section is its relationship to the radius of the rotating stage 24. FIGS. 33a–33c, 35a–35c, and 37a–37c demonstrate that the motion simulation control, through the arrangement between the camera 26 and the rotating stage 24, can fulfill the scale section conditions shown in FIGS. 32, 34, and 36.

If each section on the rotating stage as depicted in FIGS. 33a–33c is photographed separately and the three images of the sections depicted in each of the Figures are superimposed onto each other, the final image will be identical to the image described in FIG. 32. In the same fashion, if each section on the rotating stage as depicted in FIGS. 35a–35c is photographed separately and the three images are superimposed onto each other, the final image will be identical to the image described in FIG. 34, while if each section depicted in FIGS. 37a–37c is photographed separately and the three images of the sections depicted in FIG. 37a–37c are superimposed onto each other, the final image will be identical to the image described in FIG. 36. This shows that the superimposed images of sections, which represent different scales, will form the image of the long arrow-like object.

If three separate images of the sections and different scales and different locations on the X-Y plane can be connected in a cohesive image of one object, then the following conclusions can be drawn:

First, the whole image of the "world" can be formed by superimposing, or combining separate images of the small parts of the "world" which represent different scales. There is no limit to the amount of the scales which can be applied. Also, every part of the "world" can be composed from components representing different scales. The division of the "world" into small parts i.e., division of a desired combined image sequence ("world") into separate image sequences (parts), allows for the composition of images ad infinitum. During the travel of the camera, "new" parts are entering and "old" parts are leaving the frame (the steady overlap of the parts). There are no limitations to the dimensions of the photographed "world".

However, a problem could arise with conventional photography when moving objects have to be transported over a distance which would exceed the surface of the rotating stage, i.e., an actor walking in front of a traveling camera. The present invention in an embodiment solves this problem, as will be explained.

FIG. 38 is a schematic view of an actor 56 walking from point A to point E as a camera 10 tracks his movement. For clarity, each position of camera 10 relative to the actor 56 will be referred to by the point at which the actor is located for that image. For example, when the actor is at point A, the actor location and associated camera location will be identified as 56a and 10a, respectively. The distance between point A and point E is called the "walk" and has the value of 5.65 graph units in FIG. 38.

Figure 39:
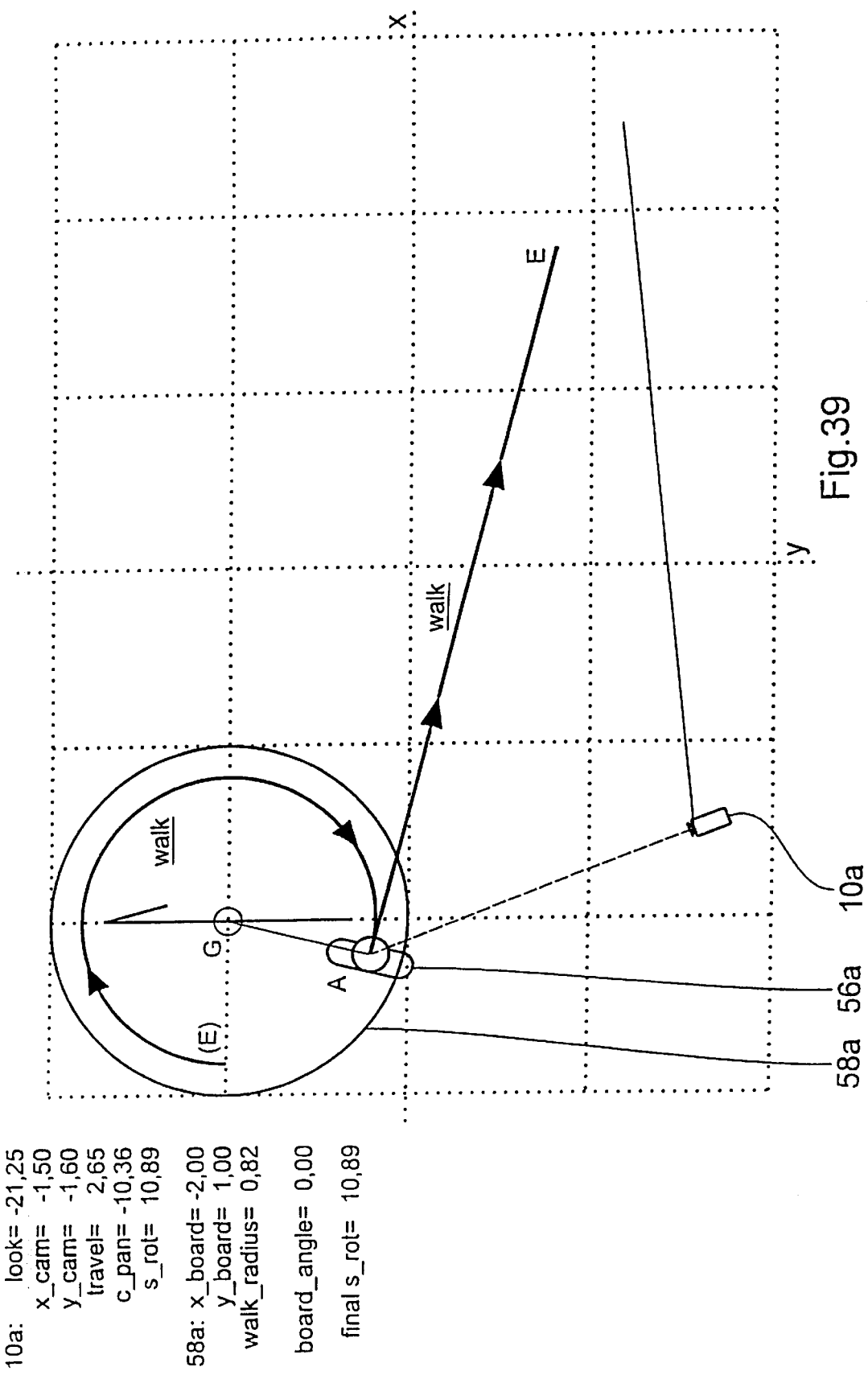
Figure 40:
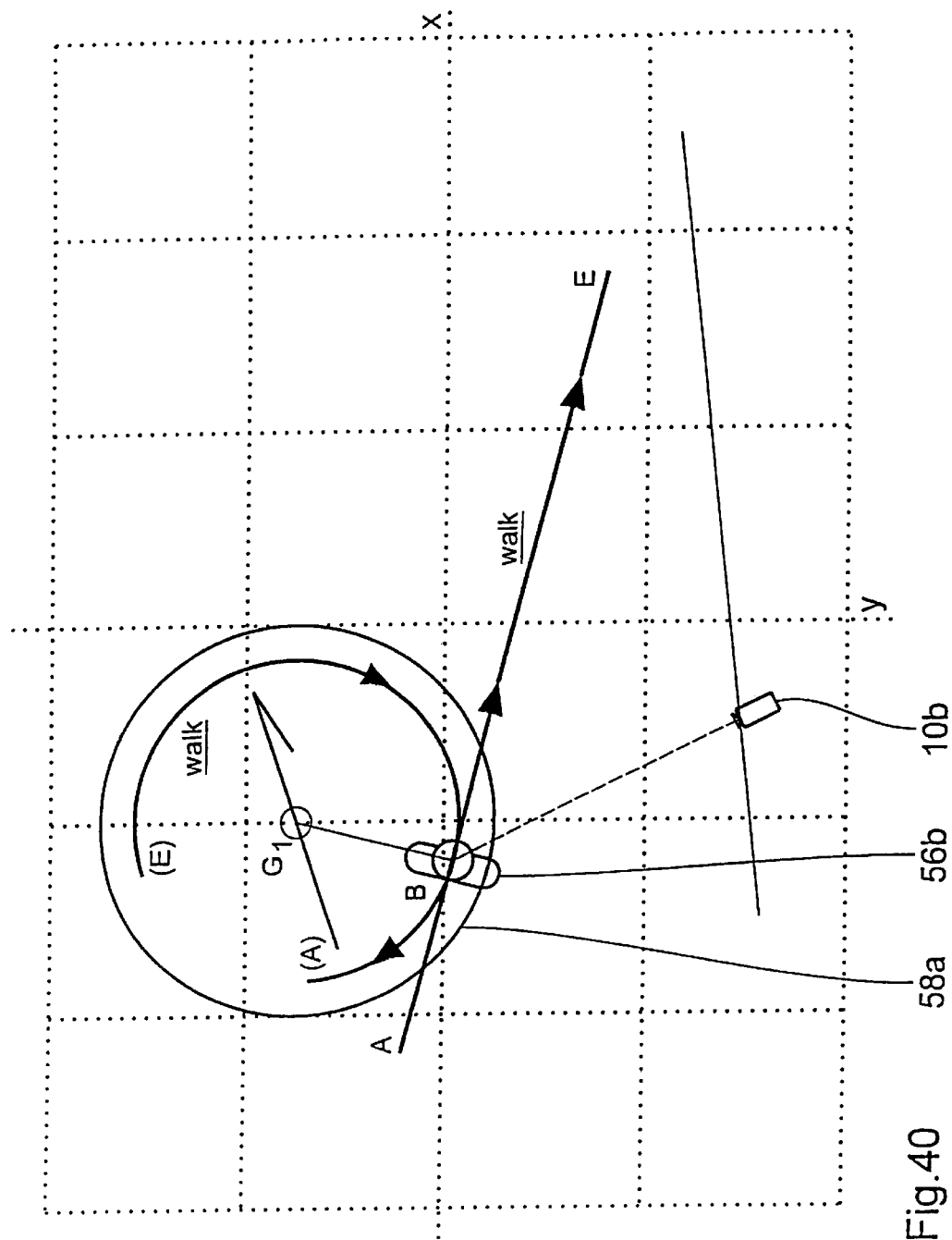
Figure 41:
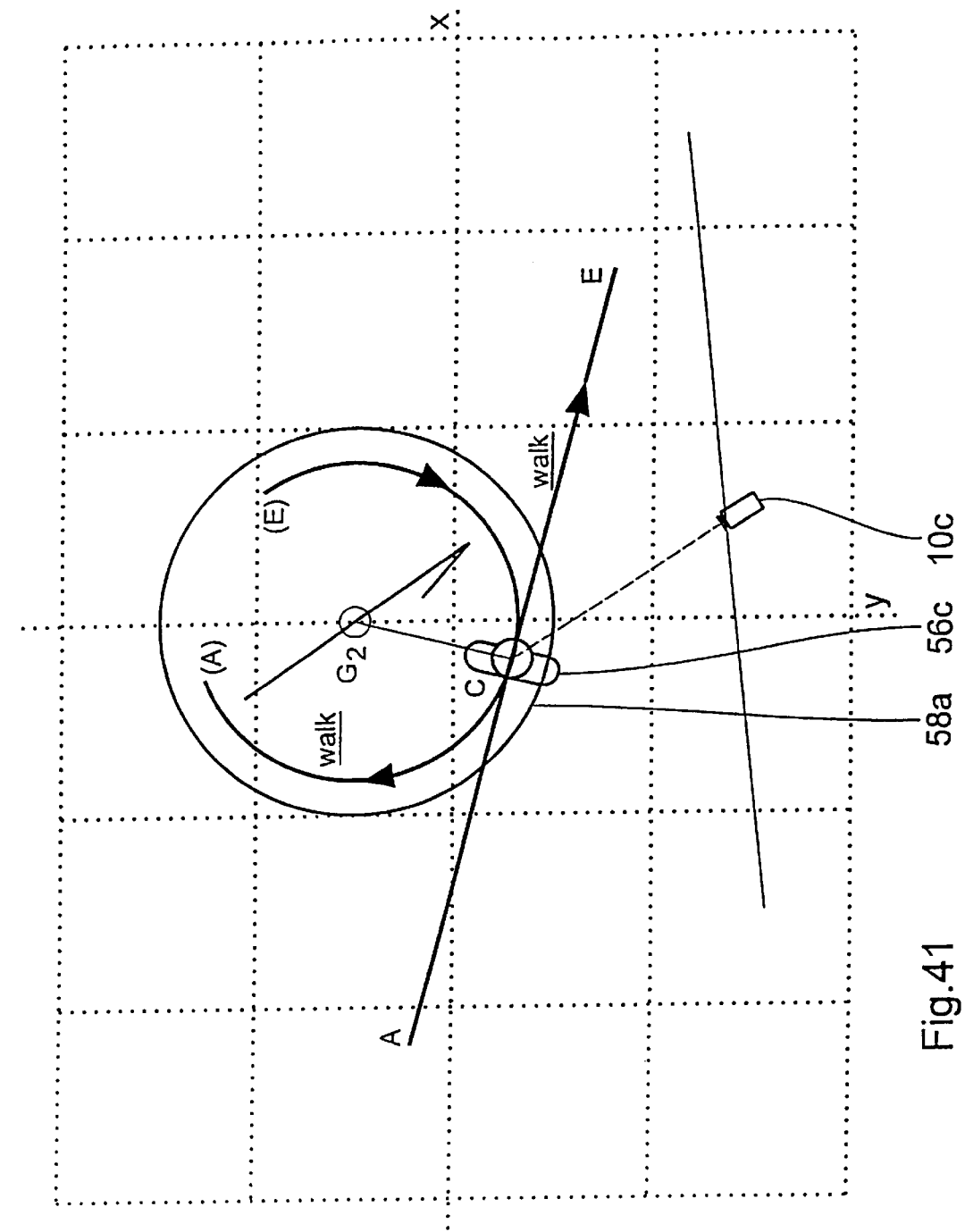
Figure 42:
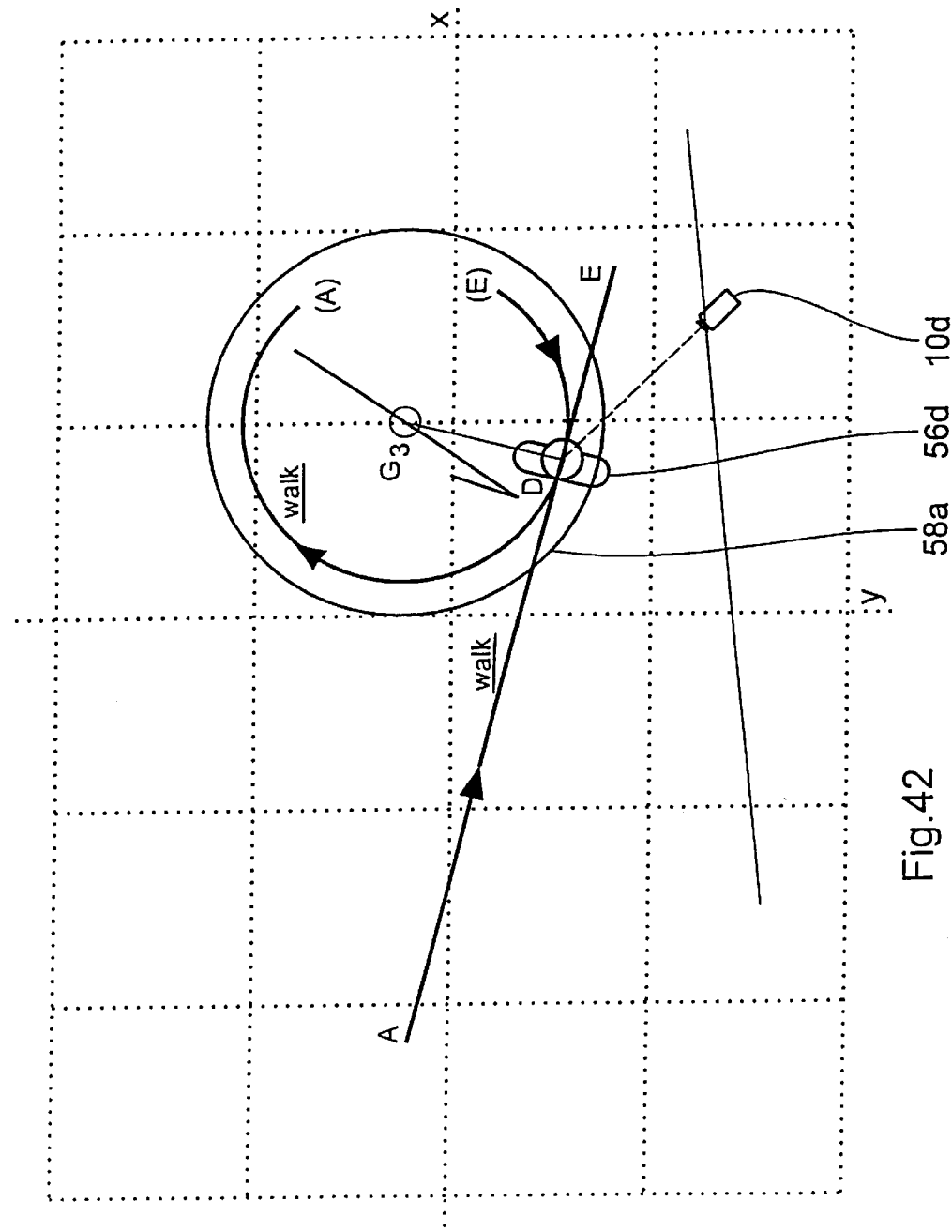
Figure 43:
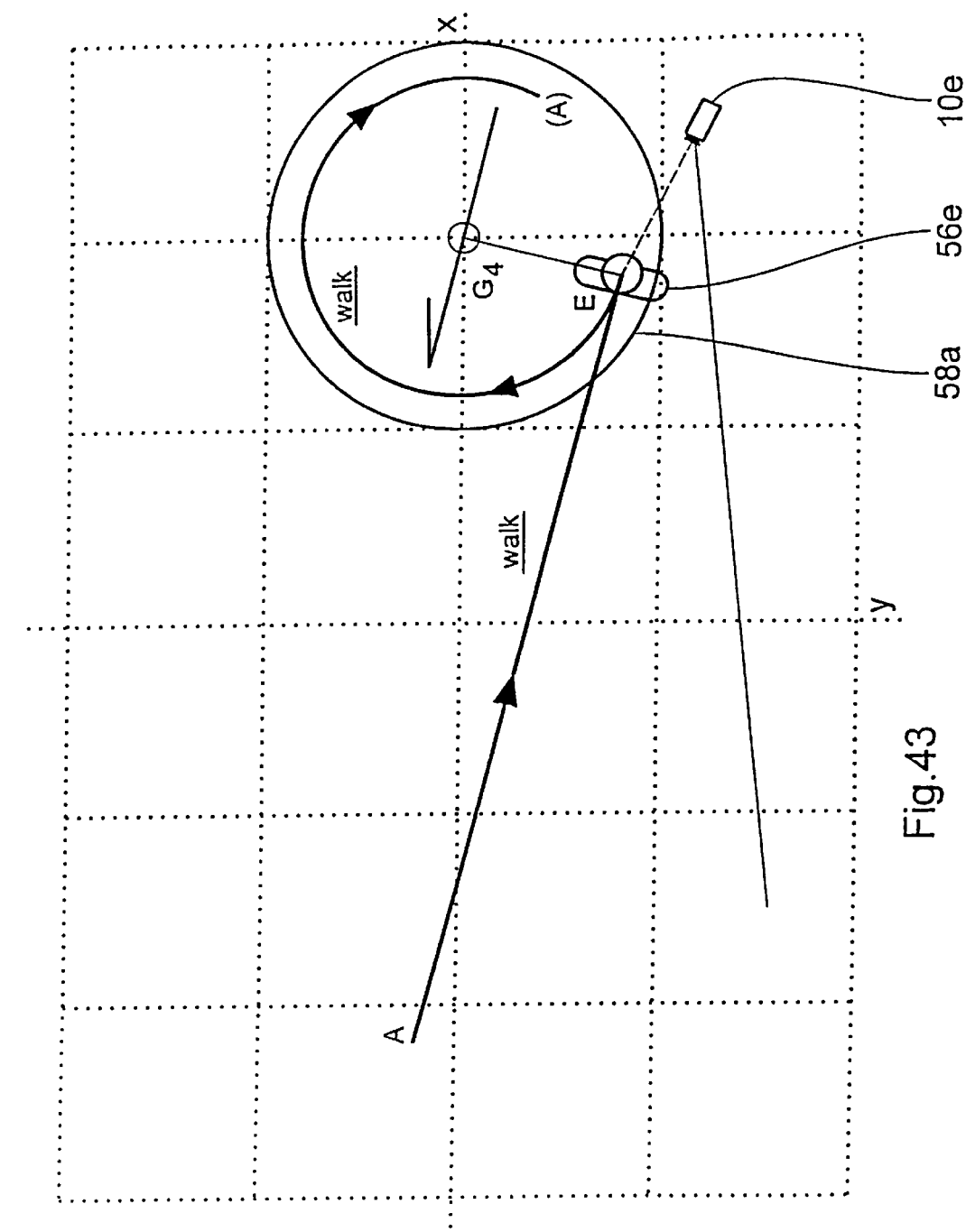

FIG. 39 depicts a board 58a whose center is located on point G. The actor 56 is standing on the board 58a at point A (the angle GAE=90°). The distance of the "walk" AE can be translated to the curved line AE on the board 58a. The length of the curved line AE is equal to the distance of the "walk". The curved line AE is a part of the circumference of a circle whose radius is equal to the distance between the actor (point A) and the center of the board (point G). This radius (in the example) has the value of 0.82 graph units (walk radius=0.82).

Imagine that the board can "move" on the X-Y plane (from point A to point E) in synchronism with the traveling camera 10, and can rotate clockwise. The actor walks counter clockwise on the board 58a (as if the actor were walking on a treadmill). FIGS. 39–44 show five phases of the "moving" board for points A–E, and "walk conditions" are established for every phase. During the "walk" function, the rotation of the board ("final s_rot") is the sum of two rotations: (1) the rotation from the original conditions (the angle between the center of the board and the camera position, i.e., s_rot); and (2) the rotation of the board translating the distance of the walk (board-angle). FIG. 44 is a summarizing view of the whole motion.

FIGS. 45a–45e show the arrangement according to an embodiment of the invention between the camera 26, the rotating stage 24, and the walking actor 56, which fulfills all of the walk conditions established in FIGS. 39–43, respectively. The conclusion is drawn that any distance and any direction of the walk can be performed using the motion simulation control. In the previous description, no mention was made of the Z axis (height). The elevation of the camera does not participate in the function of the "vehicle", thus it can be freely designed. Its only limitation is the level to which the camera 26 of the invention can be raised above the surface of the rotating stage. This level is limited by the dimension of the film studio (ceiling) and the practicality (size) of the construction of the motion simulation control.

This limitation of height only applies to photographed components whose images are influenced by the force of gravity (animate objects, fire, water etc . . .). All components which are not influenced by the force of gravity (inanimate objects, architectural models, stones, furniture etc . . . ) can be photographed in different positions (sideways or upside down). After rotating the camera sideways, the Z axis exchanges with the X axis. The components which are in the sideways position appear to be in a normal position. The "vehicle" can now "move" in the ZY plane. It can "move" up and down along an infinite length of a vertical wall. After rotating the camera upside down, objects in an upside down position appear normal. The "vehicle" can "move" under an infinite ceiling. The height, however, like "camera travel" has to be scaled down or scaled up, depending on the scale of a photographed component.

FIGS. 46–49, are drawings of the construction of the device of the motion simulation control.

The overall construction, as illustrated in FIG. 48, contains a large rotating stage 24a for photographing human beings and objects in scale 1:1, a small turntable 24b for photographing models and miniatures in small scales, and a horizontal linear track 22 which can be set up on the floor or hung from under the ceiling. Preferably, one end of the track 22 faces the center of the rotating stage 24a and the other end faces the center of the small turntable 24b. A tower-like structure 60 travels along this horizontal track 22. The tower 60 is illustrated in more detail in FIG. 46. The tower 60 holds a vertical linear track 62. Along the vertical track travels a carriage 64 which holds a camera head or mount 64, respectively.

Mounted inside the camera head 64 is the camera 26. The camera head 64 has several motors which can execute the camera pan, the camera tilt, the camera rotation (sideways and upside down), zoom, focus, and nodal point adjustment. The camera is mounted in the nodal point position (the vertex of all angles inside the lens). The nodal point position has to be steadily adjusted according to the position of the zoom (the nodal point depends on the focal length of the lens). The X-Y-Z location of the nodal point represents the X-Y-Z location of the camera position.

The forward and backward motion of the tower 60, along the horizontal linear track 22, executes the "condition" of camera travel. The reference for the camera travel (travel=0) is the center of the rotating stage.

The up and down motion of the carriage with the camera head on the vertical linear track 63 executes the height adjustment of the camera 26. The reference for the height (level=0) is the position when the nodal point is on the same level as the surface of the rotating stage 24a.

The side to side motion of the camera 26 (pan inside the camera head) executes the "condition" of camera pan. The reference for the pan (c_pan=0) is the center of the rotating stage 24a.

The remaining camera functions (zoom, focus, tilt and rotation) do not participate in the functions of the "vehicle" and can be freely designed. The tower can be turned 180 degrees to face the center of the small turntable 24b. The center and the level of the surface of the turntable 24b become the reference for the camera travel, pan and rotation (the values=0). The turntable 24b may be used for photographing miniatures and models. The separation of the large stage 24a and the small turntable 24b is for practical reasons. When working with miniatures and models, different lighting conditions are needed than when working with actors— what is a consequence of the small depth of focus caused by the shorter distance between the camera and photographed components.

The rotation of the rotating stage 24a or the small turntable 24b executes the "condition" of set rotation (s_rot).

The camera support 64 with the camera 26 is shown in FIG. 47 in more detail; herein especially the several motion possibilities $M_\alpha$ (rotation about a vertical axis through the camera=horizontal camera pan), $M_\beta$ (rotation about a first horizontal axis which is identical to the optical axis of the camera), (rotation about a second horizontal axis, perpendicular to the optical axis of the camera=vertical camera pan), $M_h$ (vertical shift of the camera) and $M_N$ (nodal point adjust) can be recognized.

An additional part of the motion control system are rotating lighting grids 66, 68. These grids hang above the rotating stage and turntable and rotate in synchronism with the stage 24a and turntable 24b, respectively. The rotation of the lights produces the same changes of lighting on the photographed components which occurs in the "world" during a conventional move.

FIG. 49 shows an embodiment of the apparatus for moving the camera 26 which apparatus is modified with respect to the apparatus shown in FIG. 46 in elevated view. The reference numerals correspond to those in FIGS. 46 to 48 wherein an "'" has been added to the numerals for differently designed components.

FIG. 50 in the manner of a block diagram shows the essential functional units of an embodiment of the motion control system for translating a resulting image sequence depicting apparent movement of the camera, with respect to the filmed object, in three-dimensional space into linear movement of the camera along a two-dimensional plane in more detail, showing the signal connections and in detail the several control signals for the system as well.

The main functional components of the depicted system are a control data evaluating unit 100 with a control data memory 101 being connected to the input as well as to the output of the former, and an image processing unit 102 at the output of which plural monitors 103.1 to 103.n and at the input as well as the output thereof plural video memories or recorders 104.1 to 104.n, respectively, are arranged (wherein in the Figure two devices of each kind are shown).

The outputs of the control data evaluating unit 100 and the control data memory 101 are, furthermore, connected to an input of the image processing unit 102 and the input of a computer graphics unit 105, the in- and outputs of the latter also being connected to the image processing unit 102. Inputs of the control data evaluating unit 100 and the control data memory 101 are connected to an input unit 107, an output of the image processing unit 102 and an output of the computer graphics unit 105 by means of a scaling processor 106. The control data evaluating unit 100 and the computer graphics unit 105 are immediately bidirectionally connected with one another by means of an interface 108.

As shown by means of broken lines bearing a direction arrow on both ends in the Figures, the control data evaluating unit 100 is connected to (not specifically enumerated) actuators of the components of the motion and lighting arrangement by means of which the several control steps can be carried out. It both works as an interface for those components. Preferably, sensors (which are not shown in the Figure) are connected with the actors, the sensors being able to sense the actuator positions vice versa. The registration of the current parameters of the apparatus, however, alternatively can be carried out such that all settings (including those of the camera mount 64 and the camera 26 in the case of manual control) are input by means of the central input unit 107 and the current values of the control signals in their time dependence are immediately transmitted from the evaluating unit 100 into the control data memory 101.

Specifically, in the Example of translating a desired image sequence depicting apparent movement of the camera in three-dimensional space into linear camera movement along a two-dimensional plane, the following control signals are used, i.e. input by manual control or evaluated, and transmitted to the corresponding actuators and optionally the memory areas of the memory 101:

As can be seen on the left side of the Figure, a control signal $L_1$ for the luminance of the lamp 66a of the lighting means 66 of the rotating stage 24a is transmitted to a luminance regulator (e.g. a thyristor control) being arranged at the input of the lamp 66a, and by means of this regulator the luminance of the lamp is adjusted. By means of a sensor at the luminance regulator or a separate photo-sensor the current luminance can be sensed; however, as mentioned above; the control signal $L_1$ can immediately be stored. A control signal $\Phi_4$ for adjusting the rotational angle of the lamp 66a above the rotating stage 24a is transmitted to a motor (e.g. step motor) being arranged at the lighting means 66 and for rotating the lamp 66a. In a similar manner—as can be seen on the right side of the Figure—the luminance and the rotational angle of the lamp 68a of the lighting means 68 being provided for the turntable 24b are controlled by using a luminance control signal $L_2$ and a rotation angle control signal $\Phi_5$.

The rotation of the rotating stage 24a is controlled by a rotating angle control signal $\Phi_1$ which is transmitted to a motor driving the rotating stage. A rotation of the rotating board 124a being arranged on or in the rotating stage 24a, respectively, is controlled by a rotating angle control signal $\Phi_3$ and carried out by a separate motor, and a motion of the travelling belt 224a on the rotating board 124a is controlled by a position control signal b and carried out by means of a separate travelling belt motor. For each of the rotating stage 24a, the rotating board 124a and the travelling belt 224a a corresponding sensor for sensing the time dependent position can be provided—for the above mentioned signals, however, the immediate transmission from the evaluating unit 100 into the memory 101 is to be preferred since a control of the components 24a, 24b, 66, 68, 124a and 224a in a manual way just has to be considered for special cases. In analogy to the control of the rotating stage 24a, the turntable 24b is controlled by a rotating angle control signal $\Phi_2$ which is transmitted to a separate motor being arranged at the turntable 24b.

The above mentioned control signals and control functions are related to the motion, especially rotation, of objects in relation to the camera 26 and the object lighting which together form one of the essential elements of the process for producing an image sequence. The other essential element, namely, (two-dimensional) motion, pans and adjustments of the camera are carried out in the following way:

A position control signal a for predetermining the distance between camera and object is transmitted to a motor (a conventional electric motor or a linear motor) being arranged at the rail track 22, and a further position control signal h for predetermining the height of the camera position above the level of the rotating stage 24a or the turntable 24b, respectively, is transmitted to a motor being provided at the camera tower 60. The signals a and h (even in the case of manual control) effectively are taken into the memory 101 from the evaluating unit 100.

Finally, the control of the camera mount 64 and the camera 26 is executed by rotating angle control signals α, β and γ (corresponding to the rotations of the camera mount about three axes referred to as $M_\alpha$, $M_\beta$ and $M_\gamma$ in FIG. 47), the position control signal N (for the longitudinal adjustment of the camera position in the camera mount, referred to as $M_N$ in FIG. 47) which are transmitted to corresponding motors (not shown in the Figures) in the camera mount and the zoom (focus length adjusting) signal f and the focussing signal F which are transmitted to the camera 26 itself. In the case of a central control of the camera mount and the camera even those signals can be brought to the control signal memory 101 immediately from the control unit 100.

The apparatus is, however, more variably applicable if sensors for the last-mentioned control or adjustment steps, respectively, are provided to sense the current position and adjustment of the camera. Those sensors (not shown in the Figures) which can be conventional electrical or photooptical position or angle sensors enable the registration of the adjustment parameters even in case of a manual camera control. Such manual control will be practised in many practical cases, at least during the production of one or some image sequence(s), e.g. for the preparation of an initial control data set which can be used for later takes or (as explained below) for the image processing.

Position, angle or further adjustment signals—shown in the left part of the Figure as input signals $P_i$ (without specifying their origin)—which have been sensed by means of sensors in the apparatus are transmitted to inputs of a (multi-channel) evaluating unit 109 from where they can be taken into the memory 101 or transmitted to the scaling processor 106. The optional character of this embodiment is expressed by the dotted lines.

For calculating simultaneous positioning data and data for lighting parameters in translating a desired image sequence depicting apparent movement of the camera, with respect to the filmed object, in three-dimensional space into linear movement of the camera along a two-dimensional plane, the control data evaluating unit 100 specifically can be embodied as fast microcomputer system in a conventional manner, the installed software enabling the execution of the mathematical transformations of the motion coordinates of the motions of camera and object relative to one another (explained in other parts of the specification) during a specific camera travel to be shown and a parallel (quasi multi-channel) processing of a record data set input for preparing the individual control data for those components of the apparatus which have to be controlled to produce a specific image sequence. This means that e.g. following to the input of time dependent path coordinates of a (virtual) relative motion of camera and object and an (also virtual) camera pan (desired image sequence) an evaluation of a complete control data set (simultaneous positioning data) for mechanically effecting the simultaneous positioning and automatically effecting the changes in lighting, i.e. really carrying out the motions of camera, rotating stage and lighting means will be carried out, and those means are controlled by this data set completely automatically.

As already mentioned above, furthermore, it is possible to use this apparatus to produce images under manual control, to sense the motions or adjustments, respectively, of the components and to store the corresponding data. Lateron, by using these unique simultaneous positionng data for filming a first object, the recording process can be automatically repeated or optionally the primary data can be scaled and/or processed in another way, and on the basis of the thus obtained secondary unique simultaneous positioning data a modified motion can be executed for separately filming a second object in the same desired image sequence.

Exemplary, a manually controlled take or filming, respectively, of an object on a rotating stage 24a can deliver the data for automatically producing an exactly synchronized take of a second (e.g. essentially smaller) object on the turntable 24b and additionally for the superposition or mixing, respectively, of both image sequences with different scales. For this, the control data first are transformed in accordance with the real sizes of the object in the scaling processor 106 for controlling the second taking or filming, and lateron for controlling the mixing process in the image processing unit 102 a second scaling data set can be provided. Of course, in this way plural image sequences—in a completely automatic manner or partly manually controlled—can be produced, stored in the video memories 104.1 to 104.n and processed under control using the monitors 103.1 to 103.n.

In a similar manner, by means of the interface 108 a cooperation of the image producing apparatus with the computer graphics unit 105 can be brought about which cooperation enables a pre-synchronizing of the image and computer graphics sequences (or vice versa) and an essentially perfect mixing of both without perceptible asynchronism or jitter. Even in this process a scaling by means of the scaling processor 106 is possible.

The control data memory 101 is embodied as a random access, multi-channel write-read-memory. In the embodiment according to FIG. 50 it has a direct connection to the scaling unit 106 what opens the possibility to transform a stored data set independently of the evaluating unit to other geometrical relations and to re-store it in its scaled form, thus, allowing for the calculation of data for dividing a desired combined image sequence into a plurality of separate image sequences of objects to be filmed. These separate image sequences may be filmed and combined as described above.

The image processing unit 102 can be a conventional up-to-date studio device which has interfaces for connecting the evaluating unit 100, the computer graphics unit 105 and the scaling unit 106. The unit 106, furthermore, can comprise plural stages of "matte" and "ultimatte"-units what requires that the monitors and recorders or image memories, respectively, are hierarchically connected.

The invention is not limited to the above-mentioned preferred embodiment. In the contrary, a number of other embodiments is possible which use the explained solution even in essentially deviating embodiments. E.g. the above-explained functional units especially can be integrated into a processor system and/or specific functional units can be embodied by means of software.

Motion simulation control can be controlled by computer software. Such software has—in an generalizing view—essentially the following six functions:

1. The design of the "world" (the locations and scales of the components), i.e., the relative position and scale of the plurality of separate items in this "world";
2. The design of the physical move of the camera (including the velocity);
3. (possibly) The reception of data from a CG software about the "world" and "physical move" designed in a CG environment. (Based on the CG data, visual parts of the "world" can be photographed by the motion control simulator);
4. The translation of a conventional physical move to the "vehicle" based on the location of a chosen point of the "world" (for the mathematics for the conditions, see attached appendix A);
5. The communication of the "vehicle" data to the motors of the motion simulation control; and
6. (possibly) The communication of the "world" and "vehicle" data to a CG software (based on the "vehicle" data, visual parts of the "world" can be generated by a CG software).

In the foregoing description, the problem which exists in the construction of computer generated images was discussed. These problems are caused by the complexity of the image of the "world" which comprises an infinite amount of visual information. The principles of the motion control simulator should be applied to the construction of the CG image. The subject of mathematical calculations should not be the whole image of the "world". The "world" is divided into small parts which have different X-Y-Z locations (in the same way that a CG screen is divided into small pixels). With the invention, the image of a small part of the "world" is the subject for the mathematical calculation. The principles of the above mentioned "vehicle" are applied in these calculations. The location of the CG "camera" in the X axis should be translated to the Y axis, pan and rotation of the part. Superimposed images of the small parts will form the correct and very complex image of the whole "world".

APPENDIX A

The Mathematics for the "conditions"

Data:

1. Camera position:

x_cam
    y_cam
2. Camera look:

a. Target
       target_x
       target_y
       look = arc tan ((target_x − cam_x)/(target_y − cam_y))
    b. Look (°)
       Look
    c. Board
       board_x
       board_y Conditions:

$$\text{travel} = \sqrt{(\text{board\_x} - \text{cam\_x})^2 + (\text{board\_y} - \text{cam\_y})^2}$$

s_rot: = −arc tan ((board_x − cam_x)/(board_y − cam_y))
c_pan = S_rot + look

APPENDIX B

List of Tables

Table 1 is a listing of some of the spatial and angular relationships depicted in FIGS. 17, 22 and 24.

Table 2 is a listing of some of the spatial and angular relationships depicted in FIG. 17.

Table 3 is a listing of some of the spatial and angular relationships depicted in FIG. 21.

Table 4 is a listing of some of the spatial and angular relationships depicted in FIG. 22.

Table 5 is a listing of some of the spatial and angular relationships depicted in FIG. 23.

Table 6 is a listing of some of the spatial and angular relationships depicted in FIG. 24.

Table 7 is a listing of some of the spatial and angular relationships depicted in FIG. 25.

Table 8 is a listing of some of the spatial and angular relationships depicted in FIGS. 32, 34 and 36.

Table 9 is a listing of some of the spatial and angular relationships depicted in FIG. 32.

Table 10 is a listing of some of the spatial and angular relationships depicted in FIG. 33. Table 11 is a listing of some of the spatial and angular relationships depicted in FIG. 34.

Table 12 is a listing of some of the spatial and angular relationships depicted in FIG. 35.

Table 13 is a listing of some of the spatial and angular relationships depicted in FIG. 36, Table 14 is a listing of some of the spatial and angular relationships depicted in FIG. 37.

What is claimed is:

1. Apparatus for producing a photographic image sequence showing an apparent movement of a camera with respect to a filmed object, in xyz space, including an unlimited x-axis component, without actual movement of the camera along the x-axis, comprising
    (a) a camera fixed on a mount, which camera is rotatable with respect to the mount in a panning action about a z-axis running through a nodal point of the camera,
    (b) a horizontal platform for supporting an object to be filmed, said platform being rotatable about a z-axis running through a center of the platform, the z-axis of the camera rotation and the z-axis of the platform defining a yz plane,
    (c) a linear track means of defined length for guiding movement of the camera mount along a y-axis lying in the yz plane, and
    (d) means for translating a resulting image sequence showing apparent movement of the camera with respect to the object to be filmed in xyz space, having an unlimited x-axis component, into synchronized simultaneous positioning instructions over a time sequence, for the following three elements:
        (a) panning action rotation of the camera,
        (b) rotation of the platform and
        (c) a linear position of the camera mount along the linear track means in the y-direction only,
    without actual movement of the camera mount along the x-axis.

2. The apparatus of claim 1, wherein the z-axes of the camera mount and the platform, and the y-axis of the linear track means, are all fixed within the yz plane.

3. The apparatus of claim 1, further comprising means for calculating simultaneous positioning data for movement of the camera within the yz plane, based on a resulting image sequence based on an apparent visual movement of the camera with respect to a filmed object in xyz space.

4. The apparatus of claim 3, further comprising means for mechanically effecting the simultaneous positioning based on the calculated data.

5. The apparatus of claim 3, further comprising means for calculating first simultaneous positioning data for filming a first object in a combined image sequence, and second simultaneous positioning data, different from first positioning data, for separately filming a second object in the combined image sequence, such that the separate image sequences of the first and second objects are combinable to create the combined image sequence as an apparent unified visual movement of the camera with respect to each of the filmed objects in xyz space, wherein the first and second objects occupy separate points in xyz space within the combined image sequence.

6. The apparatus of claim 5, further comprising means for calculating data for dividing the combined image sequence in unlimited xyz space into a plurality of separate objects to be filmed, so as to enable separate filming of each separate object to provide a plurality of separate image sequences.

7. The apparatus of claim 6, further comprising means for combining the separate image sequences to create the combined image sequence.

8. The apparatus of claim 6, further comprising means for calculating data for the relative position and scale of a plurality of separate objects which make up the combined image sequence.

9. The apparatus of claim 1, further comprising a luminance-controllable lighting means, means for calculating data for lighting parameters for a separate image sequence comprising part of a combined image sequence, and means for automatically effecting changes in lighting during filming the separate image sequence.

10. The apparatus of claim 1, wherein the means for translating a resulting image sequence into synchronized simultaneous positioning instructions over a time sequence comprises computer processing means for calculating the panning action rotation (c_pan), rotational position (s_rot), and linear position (travel), based on the following formulas:

$$travel = scale \ x^{-2} \quad (1)$$

$$s\_rot = -arc \ \tan((board\_x - cam\_x)/(board\_y - cam\_y)) \quad (2)$$

$$c\_pan = s\_rot + look, \quad (3)$$

wherein x_cam and y_cam define coordinates for an apparent camera location in the x-y plane for aiming the focal point of the camera at an apparent target point in relation to the object to be filmed, the apparent target point having coordinates target_x and target_y, look is defined as an apparent degree of pan of the camera between the apparent target point and the y-axis, wherein look=arc tan ((target_x−cam x)/(target_y_−cam_y)), and board_x and board_y define coordinates in the x-y plane on the rotating platform for location of the object to filmed.

11. A method for producing a photographic image sequence showing an apparent movement of a camera with respect to a filmed object, in xyz space, including an unlimited x-axis component, without actual movement of the camera along the x-axis, comprising choosing a resulting image sequence comprising an apparent unlimited movement of a camera in the direction of the x-axis with respect to a filmed object, and synchronizing simultaneous positioning, over a time sequence, of the following:
    (a) panning action rotation of a camera about a z-axis running through a nodal point thereof,
    (b) rotational position of a support bearing an object to be filmed, with respect to a z-axis running through the support, wherein the z-axes of the camera and the support define a yz plane, and
    (c) a linear position of the camera along the y-axis, so as to translate linear movement of the camera along the y-axis to create the resulting image sequence showing apparent unlimited movement of the camera with respect to a filmed object, in xyz space, including an unlimited x-axis component, without actual movement of the camera in the x-axis direction.

12. The method of claim 11, further comprising calculating simultaneous positioning data for movement of the camera within the yz plane, based on a resulting apparent visual movement of the camera with respect to a filmed object in xyz space.

13. The method of claim 12, further comprising calculating first simultaneous positioning data for filming a first object in a combined image sequence, and second simultaneous positioning data, different from said first positioning data, for separately filming a second object in the combined image sequence, and combining the separate image sequences of the first and second objects to create the combined image sequence as an apparent unified visual movement of the camera with respect to each of the filmed objects in xyz space, wherein the first and second objects occupy separate points in xyz space within the combined image sequence.

14. The method of claim 13, further comprising calculating data for dividing the combined image sequence in unlimited xyz space into a plurality of separate objects to be filmed, so that each separate object is filmed separately to provide a plurality of separate image sequences.

15. The apparatus of claim 14, further comprising calculating data for the relative position and scale of a plurality of separate items which make up a desired combined image.

16. The method of claim 13, further comprising combining the separate image sequences to create the desired combined image sequence.

17. The method of claim 11, further comprising mechanically effecting the simultaneous positioning based on the calculated data.

18. The method of claim 11, wherein the step of translating a resulting image sequence into synchronized simultaneous positioning instructions over a time sequence comprises calculating the panning action rotation (c_pan), rotational position (s_rot), and linear position (travel), based on the following formulas:

$$travel = scale\ x^{-2} \tag{1}$$

$$s\_rot = -arc\tan((board\_x - cam\_x)/(board\_y - cam\_y)) \tag{2}$$

$$c\_pan = s\_rot + look, \tag{3}$$

wherein x_cam and y_cam define coordinates for an apparent camera location in the x-y plane for aiming the focal point of the camera at an apparent target point in relation to the object to be filmed, the apparent target point having coordinates target_x and target_y, look is defined as an apparent degree of pan of the camera between the apparent target point and the y-axis, wherein look = arc tan ((target_x − cam_x)/(target_y − cam_y)), and board_x and board_y define coordinates in the x-y plane on the rotating platform for location of the object to filmed.

* * * * *